US009976028B2

(12) United States Patent
Ravichandran et al.

(10) Patent No.: US 9,976,028 B2
(45) Date of Patent: May 22, 2018

(54) CURABLE COATING COMPOSITIONS OF SILANE FUNCTIONAL POLYMERS

(71) Applicant: KING INDUSTRIES, Norwalk, CT (US)

(72) Inventors: Ramanathan Ravichandran, Suffern, NY (US); John Florio, Norwalk, CT (US); Bing Hsieh, Ridgefield, CT (US); David P. Switala, Middletown, CT (US)

(73) Assignee: King Industries, Norwalk, CT (US)

( * ) Notice: Subject to any disclaimer, the term of this patent is extended or adjusted under 35 U.S.C. 154(b) by 93 days.

(21) Appl. No.: 15/049,846

(22) Filed: Feb. 22, 2016

(65) Prior Publication Data
US 2016/0244606 A1    Aug. 25, 2016

Related U.S. Application Data

(60) Provisional application No. 62/119,693, filed on Feb. 23, 2015.

(51) Int. Cl.
| | |
|---|---|
| *C08L 67/00* | (2006.01) |
| *C09J 167/00* | (2006.01) |
| *C08K 5/17* | (2006.01) |
| *C08K 5/29* | (2006.01) |
| *C08K 3/28* | (2006.01) |
| *C08K 5/5419* | (2006.01) |
| *C08L 77/04* | (2006.01) |
| *C08L 77/12* | (2006.01) |
| *C08K 5/00* | (2006.01) |

(52) U.S. Cl.
CPC ............... *C08L 67/00* (2013.01); *C08K 3/28* (2013.01); *C08K 5/175* (2013.01); *C08K 5/29* (2013.01); *C08K 5/5419* (2013.01); *C08L 77/04* (2013.01); *C08L 77/12* (2013.01); *C09J 167/00* (2013.01); *C08G 2261/76* (2013.01); *C08K 5/0091* (2013.01)

(58) Field of Classification Search
CPC .................................................. C08K 5/0091
See application file for complete search history.

(56) References Cited

U.S. PATENT DOCUMENTS

| | | |
|---|---|---|
| 3,278,457 A | 10/1966 | Milgrom |
| 3,278,458 A | 10/1966 | Belner |
| 3,278,459 A | 10/1966 | Herold |
| 3,404,109 A | 10/1968 | Milgrom |
| 3,427,256 A | 2/1969 | Milgrom |
| 3,427,334 A | 2/1969 | Belner |
| 3,427,335 A | 2/1969 | Herold |
| 3,627,722 A | 12/1971 | Seiter |
| 3,632,557 A | 1/1972 | Brode et al. |
| 3,711,445 A | 1/1973 | Chu et al. |
| 3,786,081 A | 1/1974 | Oppenlaender et al. |
| 3,971,751 A | 7/1976 | Isayama et al. |
| 4,006,124 A | 2/1977 | Welte et al. |
| 4,067,844 A | 1/1978 | Barron et al. |
| 4,293,597 A | 10/1981 | Bessmer et al. |
| 4,345,053 A | 8/1982 | Rizk et al. |
| 4,355,188 A | 10/1982 | Herold et al. |
| 4,366,307 A | 12/1982 | Singh et al. |
| 4,374,237 A | 2/1983 | Berger et al. |
| 4,461,867 A | 7/1984 | Surprenant |
| 4,481,367 A | 11/1984 | Knopf |
| 4,625,012 A | 11/1986 | Rizk et al. |
| 4,645,816 A | 2/1987 | Pohl et al. |

(Continued)

FOREIGN PATENT DOCUMENTS

| | | |
|---|---|---|
| EP | 0676403 A1 | 10/1995 |
| EP | 0831108 A1 | 3/1998 |

(Continued)

OTHER PUBLICATIONS

Wang et al.; "Controlled/'Living' Radical Polymerization. Atom Transfer Radical Polymerization in the Presence of Transition-Metal Complexes"; Journal of American Chemistry; vol. 117; Feb. 1995; p. 5614.

International Search Report dated Jun. 3, 2016 from corresponding International Patent Application No. PCT/US2016/018916, 3 pages.

Written Opinion dated Jun. 3, 2016 from corresponding International Patent Application No. PCT/US2016/018916, 10 pages.

*Primary Examiner* — Michael Pepitone
(74) *Attorney, Agent, or Firm* — Ohlandt, Greeley, Ruggiero & Perle, L.L.P.

(57) ABSTRACT

There is a tin-free curable composition having (A) one or more organic polymers having a reactive-silicon-containing group, wherein at least one polymer has a main chain skeleton selected from the group consisting of polyoxyalkylene polymers, saturated hydrocarbon polymers, and (meth) acrylic acid ester polymers; (B) from 0.001 to 20 parts by weight for 100 parts by weight of the organic polymer(s) (A) of a silanol condensation catalyst consisting of one or more metal amidine complexes and one or more amine carboxylate salts, (C) a crosslinker or chain extender chosen from an alkoxysilane, an alkoxysiloxane, an oximosilane, an oximosiloxane, an epoxysilane, an epoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane, an alkoxycarbamatosiloxane, and combinations of two or more thereof; and (D) at least one adhesion promoter chosen from a silane or siloxane other than the compounds listed under (C). There is also a cured polymer formed from the tin-free curable composition.

74 Claims, No Drawings

(56) References Cited

U.S. PATENT DOCUMENTS

| | | | |
|---|---|---|---|
| 4,960,844 A | 10/1990 | Singh | |
| 4,985,491 A | 1/1991 | Reisch | |
| 5,068,304 A | 11/1991 | Higuchi et al. | |
| 5,364,955 A | 11/1994 | Zwiener et al. | |
| 5,623,044 A | 4/1997 | Chiao | |
| 5,756,751 A | 5/1998 | Schmalstieg et al. | |
| 5,852,137 A | 12/1998 | Hsieh et al. | |
| 5,919,888 A | 7/1999 | Lawrey et al. | |
| 5,945,466 A | 8/1999 | Ikeno et al. | |
| 5,985,991 A | 11/1999 | Beljanski et al. | |
| 5,990,257 A | 11/1999 | Johnston et al. | |
| 6,046,270 A | 4/2000 | Roesler et al. | |
| 6,197,912 B1 | 3/2001 | Huang et al. | |
| 6,207,794 B1 | 3/2001 | Yamasaki et al. | |
| 6,303,731 B1 | 10/2001 | Carlson et al. | |
| 6,310,170 B1 | 10/2001 | Johnston et al. | |
| 6,359,101 B1 | 3/2002 | O'Connor et al. | |
| 6,515,164 B1 | 2/2003 | Bolte et al. | |
| 6,696,383 B1 | 2/2004 | Le-Khac et al. | |
| 6,833,423 B2 | 12/2004 | Roesler et al. | |
| 6,919,293 B1 | 7/2005 | Ooms et al. | |
| 7,365,145 B2 | 4/2008 | Yang et al. | |
| 7,485,729 B2 | 2/2009 | Hsieh et al. | |
| 7,527,838 B2 | 5/2009 | Correia | |
| 7,569,653 B2 | 8/2009 | Landon | |
| 2002/0198352 A1 | 12/2002 | Tanaka et al. | |
| 2004/0122253 A1 | 6/2004 | Smith et al. | |
| 2005/0020706 A1 | 1/2005 | Kollbach et al. | |
| 2009/0156737 A1 | 6/2009 | Schindler et al. | |
| 2010/0041810 A1* | 2/2010 | Wakabayashi | C08K 3/16 524/425 |
| 2011/0046304 A1 | 2/2011 | Maliverney | |
| 2011/0098420 A1 | 4/2011 | Takizawa et al. | |
| 2012/0065308 A1 | 3/2012 | Sumi et al. | |
| 2015/0005443 A1 | 1/2015 | Byrne | |

FOREIGN PATENT DOCUMENTS

| | | |
|---|---|---|
| EP | 1178150 A1 | 2/2002 |
| JP | 46-27250 B1 | 8/1971 |
| JP | 54-6096 A | 1/1979 |
| JP | 55-13767 A | 1/1980 |
| JP | 57-164123 A | 10/1982 |
| JP | 58-29818 A | 2/1983 |
| JP | 58-109529 A | 6/1983 |
| JP | 59-15336 B2 | 4/1984 |
| JP | 59-78223 A | 5/1984 |
| JP | 59-122541 | 7/1984 |
| JP | 59-168014 | 9/1984 |
| JP | 59-168014 A | 9/1984 |
| JP | 60-228516 | 11/1985 |
| JP | 60-228517 | 11/1985 |
| JP | 61-133201 A | 6/1986 |
| JP | 61-197631 A | 9/1986 |
| JP | 61-215622 A | 9/1986 |
| JP | 61-215623 A | 9/1986 |
| JP | 61-218632 A | 9/1986 |
| JP | 62-13430 A | 1/1987 |
| JP | 63-6041 A | 1/1988 |
| JP | 63-112642 A | 5/1988 |
| JP | 63-254149 A | 10/1988 |
| JP | 64-22904 A | 1/1989 |
| JP | 1-168764 A | 7/1989 |
| JP | 1-197509 A | 8/1989 |
| JP | 3-47825 A | 2/1991 |
| JP | 31-4068 B2 | 2/1991 |
| JP | 3-72527 A | 3/1991 |
| JP | 45-5444 B2 | 9/1992 |
| JP | 46-9659 B2 | 11/1992 |
| JP | 5-17521 A | 1/1993 |
| JP | 5-70531 A | 3/1993 |
| JP | 5-117519 A | 5/1993 |
| JP | 6-172631 A | 6/1994 |
| JP | 6-211879 A | 8/1994 |
| JP | 6-211922 A | 8/1994 |
| JP | 6-279693 A | 10/1994 |
| JP | 7-53882 A | 2/1995 |
| JP | 7-258534 A | 10/1995 |
| JP | 7-108928 B2 | 11/1995 |
| JP | 8-53528 A | 2/1996 |
| JP | 2539445 B2 | 7/1996 |
| JP | 8-231707 A | 9/1996 |
| JP | 9-272714 A | 10/1997 |
| JP | 10-53637 A | 2/1998 |
| JP | 10-204144 A | 8/1998 |
| JP | 10-273512 A | 10/1998 |
| JP | 2873395 B2 | 1/1999 |
| JP | 11-60724 A | 3/1999 |
| JP | 11-100427 A | 4/1999 |
| JP | 11-116763 A | 4/1999 |
| JP | 11-241029 A | 9/1999 |
| JP | 11-279249 A | 10/1999 |
| JP | 11-302527 A | 11/1999 |
| JP | 11-349916 | 12/1999 |
| JP | 2000-119365 A | 4/2000 |
| JP | 2000-169544 A | 6/2000 |
| JP | 2000-169545 A | 6/2000 |
| JP | 2000-186176 A | 7/2000 |
| JP | 2001-181532 A | 7/2001 |
| JP | 2001-207157 A | 7/2001 |
| JP | 2001-323040 A | 11/2001 |
| JP | 2002-155145 A | 5/2002 |
| JP | 3313360 B1 | 5/2002 |
| JP | 2002-212415 A | 7/2002 |
| JP | 2002-249538 A | 9/2002 |
| JP | 2003-508561 A | 3/2003 |
| JP | 2003-155389 A | 5/2003 |
| WO | 03/018658 A1 | 3/2003 |
| WO | 03/059981 A1 | 7/2003 |
| WO | 2010/146253 A1 | 12/2010 |
| WO | 2012/122098 A1 | 9/2012 |
| WO | 2013/106193 A1 | 7/2013 |
| WO | WO 2013106193 A9 * | 1/2014 ........... C09D 183/04 |

* cited by examiner

CURABLE COATING COMPOSITIONS OF SILANE FUNCTIONAL POLYMERS

CROSS-REFERENCE TO A RELATED APPLICATION

This application claims priority to U.S. Provisional Application Ser. No. 62/119,693, filed Feb. 23, 2015, which is incorporated herein in its entirety.

BACKGROUND

1. Field of the Disclosure

The present disclosure relates to a curable composition comprising one or more polymers having a silicon-containing group which has a hydroxyl group or hydrolyzable group bonded to a silicon atom and can form a siloxane bond to be crosslinked (said silicon-containing group may be referred to as a "reactive-silicon-containing group" hereinafter).

2. Description of the Related Art

It has been known that organic polymers, with at least one reactive silicon group can polymerize with the formation of siloxane bond by hydrolysis and/or condensation reactions aided by moisture and suitable catalysts even at room temperature, whereby the polymers are crosslinked to give a fully cured product.

Among these polymers having a reactive silicon group, polymers wherein the main chain skeleton thereof is a polyoxyalkylene polymer or polyisobutylene polymer are well known and these polymers are already produced industrially, and are widely used in sealants, adhesives and paints. The curable composition used in sealants, adhesives, or the like, are required to have various desirable attributes such as curability, adhesiveness, and mechanical property.

Polymers having reactive terminal silyl groups or compositions comprising such polymers can be hydrolyzed and condensed in the presence of water and organometallic catalysts. Suitable known catalysts for curable compositions include organometallic compounds employing metals such as Sn, and Ti. Organotin compounds such as, for example, dibutyltin dilaurate (DBTDL), and dibutyltin bis(acetylacetonate) are widely used as condensation cure catalysts to accelerate the moisture assisted curing of a number of different polyorganosiloxanes and non-silicone polymers having reactive terminal silyl groups such as room temperature vulcanizing (RTV) formulations including RTV-1 and RTV-2 formulations. Environmental regulatory agencies and directives, however, have increased or are expected to increase restrictions on the use of organotin compounds in formulated products. For example, while formulations with greater than 0.5 wt. % dibutyltin presently require labeling as toxic with reproductive 1B classification, dibutyltin-containing formulations are proposed to be completely phased out in consumer applications during next several years.

Alternative organotin compounds such as dioctyltin compounds and dimethyltin compounds are only short-term remedies, as these organotin compounds may also be regulated in the future. It would be beneficial to identify non-tin metal catalysts that accelerate the condensation curing of moisture curable silicones and non-silicones. Desirably, substitutes for organotin catalysts should exhibit properties similar to organotin compounds in terms of curing, storage, and appearance. Non-tin catalysts should also initiate the condensation reaction of the selected polymers and complete this reaction at the surface and in the bulk within a desired time frame.

The use of zinc complexes as catalysts in condensation curable silicone compositions has been described. For example, U.S. Patent Publication Nos. 2011/0046304 and 2009/0156737; WO 2010/146253; and EP 1178150 describe the use of zinc compounds for silyl condensation cure chemistry.

U.S. Pat. No. 5,985,991 broadly claims the use of various metals in a generic list of metal acetylacetonates consisting of Cu, Cr, Al, Zn, Ti, and Zr to improve the oil resistance of RTV silicone composition which comprises metal salt of carboxylic acid as a condensation cure catalyst.

U.S. Pat. No. 5,945,466 broadly claims a generic list of organic metal compounds containing Sn, Ti, Zr, Pd, Zn, Co, Mn and Al as metallic element, as curing catalyst for room temperature curable organopolysiloxane composition which contains organosilane or its hydrolyzed product among other components.

U.S. Pat. No. 7,365,145 generically claims, a generic list of organic dibutyltin, zirconium complex, aluminum chelate, titanium chelate, organic zinc, organic cobalt, and organic nickel as catalysts in moisture curable silylated polymer composition.

U.S. Publication No. 2009/0156737 claims a generic list of Lewis acid compounds of Ti, Zr, Hf, Zn, B, Al as catalysts in polymer blends comprising alkoxy silane terminated polymers and fillers.

U.S. Pat. No. 4,293,597 includes a generic list of metal salts including Pb, Sn, Zr, Sb, Cd, Ba, Ca, and Ti as catalysts in curable silicone rubber compositions that also contains nitrogen-functional silanes.

U.S. Pat. No. 4,461,867 includes a generic list of metal esters also including Sn, Pb, Zr, Sb, Cd, Ba, Ca, Ti, Mn, Zn, Cr, Co, Ni, Al, Ga and Ge as a catalyst in moisture curable RTV-1 silicone compositions.

U.S. Patent Publication No. 2011/0098420 includes a generic list including compounds of Pt, Pd, Pb, Sn, Zn, Ti and Zr, as dehydrogenative condensation reaction catalyst for a curable polysiloxane composition comprising of siloxanes with 2 or more hydrosilyl groups and siloxanes with 2 or more silanol groups.

U.S. Pat. No. 7,527,838 claims a generic list of materials which includes metal catalysts based on Sn, Ti, Zr, Pb, Co, Sb, Mn and Zn, in curable diorganopolysiloxane compositions used for making insulated glass units.

Despite these general teachings, there has not been provided any teachings or catalyst compositions that improve on the catalytic activity exhibited by synergistic mixtures of different metal amidine complexes and carboxylate salts of various amines. Further, there has not been a replacement catalyst for organo-tin compounds that maintains its ability to cure after storage over months in a sealed cartridge, when exposed to humidity or ambient air. It is always a specific requirement for moisture curable compositions to achieve the shortest possible curing times, showing a tack-free surface as well as a curing through the complete bulk in thick section for "One-Part" and "Two-Part" Room-Temperature Vulcanizing (RTV) compositions and provide a reasonable adhesion after cure onto a variety of substrates.

JP-A-5-117519 discloses that the curing performance is abruptly improved by using a carboxylic acid and an amine together, but these compositions suffer from lack of sufficient adhesiveness. In addition, storage stability of such catalysts is undesirable and premature gelation can occur during storage of such compositions.

SUMMARY OF THE DISCLOSURE

Described herein is a catalyst composition comprising a combination of one or more metal amidine complexes with one or more amine carboxylate salts, said composition being effective as a catalyst for reactions of one or more organic polymers having a reactive-silicon-containing group, and a tin free polymer composition comprising said catalyst composition and one or more organic polymers having a reactive-silicon-containing group. The tin free polymer composition of the disclosure exhibits good cure, adhesiveness and storage stability.

Further according to the present invention, there are provided tin-free, curable compositions having silyl-terminated polymers and a non-toxic condensation catalyst based on metal amidine complexes in combination with carboxylate salts of various amines.

In one embodiment, the metal amidine complexes described herein have a metal, an amidine, and a carboxylate. In certain embodiments, the metal amidine carboxylate complexes are metal (II) amidine carboxylate complexes. In a particular embodiment, the metal amidine complex is of the chemical formula M (amidine)$_w$(carboxylate)$_2$, where w is an integer from 1 to 4, for example 2 or 4. In certain embodiments, the metal is zinc, lithium, sodium, magnesium, barium, potassium, calcium, bismuth, cadmium, aluminum, zirconium, hafnium, titanium, lanthanum, vanadium, niobium, tantalum, tellurium, molybdenum, tungsten, or cesium. In a particular embodiment, the metal is zinc. In a particular embodiment, the metal is in the +2 oxidation state.

In certain embodiments, the amidine of the metal amidine complex is an amidine of formulae I-VIII. In some particular embodiments the amidine is of formula (I)-(III), in some particular embodiments the amidine is of formula (IV)-(VIII), and in some particular embodiments amidines of formula (I)-(III) are excluded.

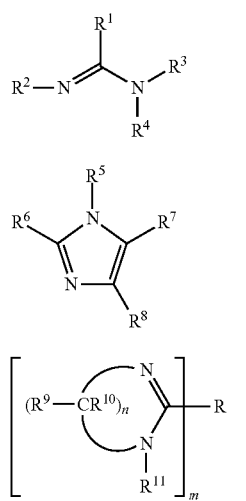

wherein $R^1$ is hydrogen, an organic group attached through a carbon atom, for example, $C_1$-$C_{36}$ alkyl, $C_2$-$C_{25}$ alkyl interrupted by oxygen or sulfur, $C_2$-$C_{24}$ alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl, $C_{13}$-$C_{26}$ polycycloalkyl, $C_7$-$C_9$ phenylalkyl which is unsubstituted or substituted on the phenyl ring by $C_1$-$C_4$ alkyl; an amine group which is optionally substituted; or a hydroxyl group which is optionally etherified with a hydrocarbyl group having up to 8 carbon atoms;

$R^2$ and $R^3$ are each independently hydrogen or an organic group attached through a carbon atom, for example, $C_1$-$C_{25}$ alkyl, $C_2$-$C_{25}$ alkyl interrupted by oxygen or sulfur, $C_2$-$C_{24}$ alkenyl, $C_4$-$C_{15}$ cycloalkyl which is unsubstituted or substituted by $C_1$-$C_4$ allyl and/or carboxyl, $C_5$-$C_{15}$ cycloalkenyl which is unsubstituted or substituted by $C_1$-$C_4$ alkyl and/or carboxyl, $C_{13}$-$C_{26}$ polycycloalkyl, $C_7$-$C_9$ phenylalkyl which is unsubstituted or substituted on the phenyl ring by $C_1$-$C_4$ alkyl, or $R^2$ and $R^3$ are joined to one another by an N=C—N linkage to form a heterocyclic ring with one or more hetero atoms or a fused bicyclic ring with one or more heteroatoms; $R^4$ is hydrogen, an organic group attached through a carbon atom (such as $C_1$-$C_{36}$ alkyl, $C_1$-$C_{36}$ alkyl interrupted by oxygen or sulfur; $C_2$-$C_{24}$ alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, $C_7$-$C_9$ phenylalkyl which is unsubstituted or substituted on the phenyl ring by $C_1$-$C_4$ alkyl) or a hydroxyl group which can be optionally etherified with a hydrocarbyl group having up to 8 carbon atoms; $R^5$, $R^6$, $R^7$, and $R^8$ are independently hydrogen, alkyl, substituted alkyl, hydroxyalkyl, aryl, aralkyl, cycloalkyl, heterocyclics, ether, thioether, halogen, —N(R)$_2$, polyethylene polyamines, nitro groups, keto groups, ester groups, or carbonamide groups optionally alkyl substituted with alkyl, substituted alkyl, hydroxyalkyl, aryl, aralkyl, cycloalkyl, heterocycles, ether, thioether, halogen, —N(R)$_2$, polyethylene polyamines, nitro groups, keto groups or ester groups; $R^9$, $R^{10}$ and $R^{11}$ are independently hydrogen, alkyl, alkenyl or alkoxy of 1 to 36 carbons, cycloalkyl of 6 to 32 carbons, alkylamino of 1 to 36 carbon atoms, cycloalkyl of 5 to 12 carbon atoms, phenyl, hydroxyalkyl, hydroxycycloalkyl of 1 to 20 carbon atoms, methoxyalkyl of 1 to 20 carbon atoms, aralkyl of 7 to 9 carbon atoms wherein the aryl group of the aralkyl is optionally substituted by alkyl of 1 to 36 carbon atoms, ether, thioether, halogen, —N(R")$_2$, polyethylene polyamines, nitro groups, keto groups, ester groups, or carbonamide groups and the alkyl group of the aralkyl is optionally substituted with alkyl, substituted alkyl, hydroxyalkyl, aryl, aralkyl, cycloalkyl, heterocyclics, ether, thioether, halogen, —N(R")$_2$, polyethylene polyamines, nitro groups, keto groups or ester groups, wherein R" of —N(R")$_2$ is alkyl, alkylene, aryl, aralkyl, cycloalkyl or heterocyclic radical, optionally substituted with halogen, nitro, alkyl, alkoxy or amino, and, m=1 or 2 wherein when m=1, R is hydrogen or a plurality of radicals optionally joined by hetero atoms O, N or S; n=2 or 3;

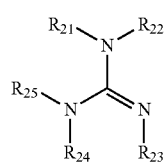

wherein each of $R_{21}$, $R_{22}$, $R_{23}$, $R_{24}$, and $R_{25}$ is hydrogen, (cyclo)alkyl, aryl, aromatic, organometallic, a polymeric structure, or together can form a cycloalkyl, aryl, or an aromatic structure, and wherein $R_{21}$, $R_{22}$, $R_{23}$, $R_{24}$, and $R_{25}$ can be the same or different. As used herein, "(cyclo)alkyl" refers to both alkyl and cycloalkyl. When any of the R groups "together can form a (cyclo)alkyl, aryl, and/or aromatic group" it is meant that any two adjacent R groups may be connected to form a cyclic moiety, such as the rings in structures (V)-(VIII) below.

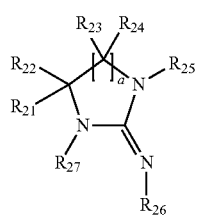

(V)

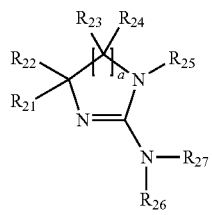

(VI)

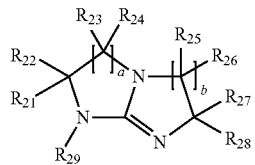

(VII)

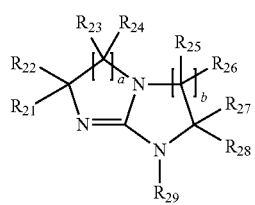

(VIII)

It will be appreciated that in some embodiments, the double bond between the carbon atom and the nitrogen atom that is depicted in structure (IV) may be located between the carbon atom and another nitrogen atom of structure (IV). Accordingly, the various substituents of structure (IV) may be attached to different nitrogens depending on where the double bond is located within the structure.

In certain embodiments, the amidine comprises a cyclic guanidine of structure (IV) wherein two or more R groups of structure (IV) together form one or more rings. In other words, in some embodiments the cyclic guanidine comprises ≥1 ring. For example, the cyclic guanidine can either be a monocyclic guanidine (1 ring) as depicted in structures (V) and/or (VI) below, or the cyclic guanidine can be polycyclic (≥2 rings) as depicted in structures (VII) and (VIII) above.

Each substituent of structures (V) and/or (VI), $R_{21}$-$R_{27}$, can comprise hydrogen, (cyclo)alkyl, aryl, aromatic, organometallic, a polymeric structure, or together can form a cycloalkyl, aryl, or an aromatic structure, and wherein $R_{21}$-$R_{27}$ can be the same or different. Similarly, each substituent of structures (VII) and (VIII), $R_{21}$-$R_{29}$, can be hydrogen, alkyl, aryl, aromatic, organometallic, a polymeric structure, or together can form a cycloalkyl, aryl, or an aromatic structure, and wherein R21-R29 can be the same or different. Moreover, in some embodiments of structures (V) and/or (VI), certain combinations of $R_{21}$-$R_{27}$ may be part of the same ring structure. For example, $R_{21}$ and $R_{27}$ of structure (V) may form part of a single ring structure. Moreover, in some embodiments, it will be understood that any combination of substituents ($R_{21}$-$R_{27}$ of structures (V) and/or (VI) as well as $R_{21}$-$R_{29}$ of structures (VII) and/or (VIII)) can be chosen so long as the substituents do not substantially interfere with the catalytic activity of the cyclic guanidine.

In certain embodiments, each ring in the cyclic guanidine is comprised of ≥5-members. For instance, the cyclic guanidine may be a 5-member ring, a 6-member ring, or a 7-member ring. As used herein, the term "member" refers to an atom located in a ring structure. Accordingly, a 5-member ring will have 5 atoms in the ring structure ("a" and/or "b"=1 in structures (V)-(VIII)), a 6-member ring will have 6 atoms in the ring structure ("a" and/or "b"=2 in structures (V)-(VIII)), and a 7-member ring will have 7 atoms in the ring structure ("a" and/or "b"=3 in structures (V)-(VIII)) It will be appreciated that if the cyclic guanidine is comprised of ≥2 rings (e.g., structures (VII) and (VIII), the number of members in each ring of the cyclic guanidine can either be the same or different. For example, one ring may be a five-member ring while the other ring may be a six-member ring. If the cyclic guanidine is comprised of ≥3 rings, then in addition to the combinations cited in the preceding sentence, the number of members in a first ring of the cyclic guanidine can be different from the number of members in any other ring of the cyclic guanidine.

Moreover, in some embodiments, the cyclic guanidine can either be substituted or unsubstituted. For example, as used herein in conjunction with the cyclic guanidine, "substituted", in certain embodiments, refers to a cyclic guanidine wherein $R_{25}$, $R_{26}$, and/or $R_{27}$ of structures (V) and/or (VI) and/or $R_{29}$ of structures (VII) and/or (VIII) is not hydrogen. As used herein in conjunction with the cyclic guanidine, "unsubstituted", in certain embodiments, refers to a cyclic guanidine wherein $R_{21}$-$R_{27}$ of structures (V) and/or (VI) and/or $R_{21}$-$R_{29}$ of structures (VII) and/or (VIII) is hydrogen. In some embodiments, the substituted cyclic guanidine is 1,5,7-triazabicyclo[4.4.0]dec-5-ene.

In certain embodiments, the metal amidine complex comprises a carbon/late derived from a carboxylic acid of the following formula:

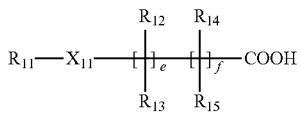

wherein $R_{11}$ is hydrogen, $C_1$-$C_{25}$ alkyl, $C_2$-$C_{25}$ alkyl interrupted by oxygen or sulfur; $C_2$-C24 alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, $C_7$-$C_9$ phenylalkyl which is unsubstituted or substituted on the phenyl ring by $C_1$-$C_4$ alkyl; —$COR_{16}$, a 5- or 6-membered heterocyclic ring which is unsubstituted or substituted by $C_1$-$C_4$ alkyl, $C_1$-$C_4$ alkoxy, halogen or carboxyl; a 5- or 6-membered heterocyclic ring which is benzo-fused and is unsubstituted or substituted by $C_1$-$C_4$ alkyl, $C_1$-$C_4$ alkoxy, halogen or carboxyl; or a radical of one of the following formulae:

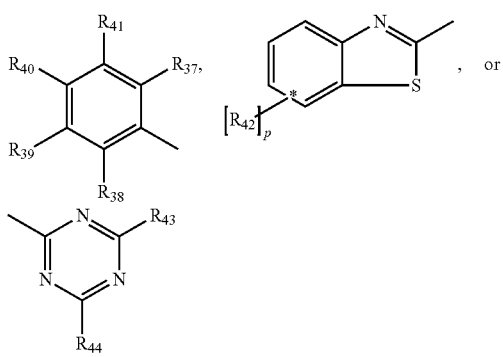

wherein $R_{12}$, $R_{13}$, $R_{14}$ and $R_{15}$ independently are hydrogen, hydroxyl, $C_1$-$C_{18}$ alkoxy, $C_2$-$C_{18}$ alkoxy which is interrupted by oxygen or sulfur; $C_1$-$C_{25}$ alkyl, $C_2$-$C_{25}$ alkyl which is interrupted by oxygen or sulfur; $C_2$-$C_{24}$ alkenyl, $C_5$-$C_{15}$ cycloalkyl which is unsubstituted or substituted by $C_1$-$C_4$ alkyl; $C_5$-$C_{15}$ cycloalkenyl which is unsubstituted or substituted by $C_1$-$C_4$ alkyl; phenyl or naphthyl which is unsubstituted or substituted by $C_1$-$C_4$ alkyl; $C_7$-$C_9$ phenylalkyl which is unsubstituted or substituted on the phenyl ring by $C_1$-$C_4$ alkyl; $C_{10}$-$C_{12}$ naphthylalkyl which is unsubstituted or substituted on the naphthyl ring system by $C_1$-$C_4$ alkyl; or are —$COR_6$, with the proviso that, if one of the radicals $R_{12}$, $R_{13}$, $R_{14}$ and $R_{15}$ is hydroxyl, the other radical attached to the same carbon atom is other than hydroxyl; or else $R_{12}$ and $R_{13}$ or $R_{14}$ and $R_{15}$, together with the carbon atom to which they are attached, form an unsubstituted or $C_1$-$C_4$ alkyl-substituted $C_5$-$C_{12}$ cycloalkylidene ring;

wherein $R_{16}$ is hydroxyl, $C_1$-$C_{18}$ alkoxy, or $C_2$-$C_{18}$ alkoxy which is interrupted by oxygen or sulfur; or

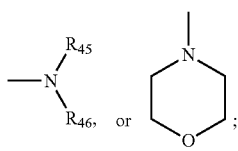

wherein $R_{37}$, $R_{38}$, $R_{39}$, $R_{40}$ and $R_{41}$ are independently hydrogen, hydroxyl, halogen, nitro, cyano, $CF_3$, —$COR_6$, $C_1$-$C_{25}$ alkyl, $C_2$-$C_{25}$ alkyl which is interrupted by oxygen or sulfur; $C_1$-$C_{25}$ haloalkyl, $C_1$-$C_{18}$ alkoxy, $C_2$-$C_{18}$ alkoxy which is interrupted by oxygen or sulfur; $C_1$-$C_{18}$ alkylthio, $C_2$-$C_{24}$ alkenyl, $C_5$-$C_{15}$ cycloalkyl which is unsubstituted or substituted by $C_1$-$C_4$ alkyl; $C_5$-$C_{15}$ cycloalkenyl which is unsubstituted or substituted by $C_1$-$C_4$ alkyl; phenyl or naphthyl which is unsubstituted or substituted by $C_1$-$C_4$ alkyl; $C_7$-$C_9$ phenylalkyl which is unsubstituted or substituted on the phenyl ring by $C_1$-$C_4$ alkyl; $C_{10}$-$C_{12}$ naphthylalkyl which is unsubstituted or substituted on the naphthyl ring system by $C_1$-$C_4$ alkyl; phenoxy or naphthoxy which is unsubstituted or substituted by $C_1$-$C_4$ alkyl; $C_7$-$C_9$ phenylalkoxy which is unsubstituted or substituted on the phenyl ring by $C_1$-$C_4$ alkyl; $C_{10}$-$C_{12}$ naphthylalkoxy which is unsubstituted or substituted on the naphthyl ring system by $C_1$-$C_4$ alkyl; or else the radicals $R_{38}$ and $R_{39}$ or the radicals $R_{39}$ and $R_{40}$ or the radicals $R_{40}$ and $R_{41}$ or the radicals $R_{37}$ and $R_{41}$, together with the carbon atoms to which they are attached, form an unsubstituted or $C_1$-$C_4$ alkyl-, halogen- or $C_1$-$C_4$ alkoxy-substituted benzo ring, with the proviso that at least one of the radicals $R_{37}$, $R_{38}$, $R_{39}$, $R_{40}$ and $R_{41}$ is hydrogen;

$R_{42}$ is hydroxyl, halogen, nitro, cyano, $CF_3$, $C_1$-$C_{25}$ alkyl, $C_2$-$C_{25}$ alkyl which is interrupted by oxygen or sulfur; $C_1$-$C_{25}$ haloalkyl, $C_1$-$C_{18}$ alkoxy, $C_2$-$C_{18}$ alkoxy which is interrupted by oxygen or sulfur; $C_1$-$C_{18}$ alkylthio or $C_2$-$C_{24}$ alkenyl;

$R_{43}$ and $R_{44}$ are independently hydrogen, $C_1$-$C_{25}$ alkyl, $C_1$-$C_{18}$ alkoxy or —Y—$(CH_2)_s$ $COR_6$;

$R_{45}$ and $R_{46}$ are independently hydrogen, $C_1$-$C_{25}$ alkyl, $C_3$-$C_{25}$ alkyl which is interrupted by oxygen or sulfur; $C_2$-$C_{24}$ alkenyl, $C_5$-$C_{15}$ cycloalkyl which is unsubstituted or substituted by $C_1$-$C_4$ alkyl; phenyl or naphthyl which is unsubstituted or substituted by $C_1$-$C_4$ alkyl;

$X_{11}$ is a direct bond, oxygen, sulfur, C(O), $C_1$-$C_{18}$ alkylene, $C_2$-$C_{18}$ alkylene which is interrupted by oxygen or sulfur; $C_2$-$C_{18}$ alkenylene, $C_2$-$C_{18}$ alkynylene, $C_2$-$C_{20}$ alkylidene, $C_7$-$C_{20}$ phenylalkylidene or $C_5$-$C_8$ cycloalkylene, with the proviso that, if m and n are 0, $X_{11}$ is other than oxygen and sulfur;

Y is oxygen or

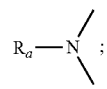

$R_a$ is hydrogen or $C_1$-$C_8$ alkyl;

e and f independently of one another are integers from 0 to 10, p is an integer from 0 to 4, and s is an integer from 1 to 8. In certain embodiments, the carboxylate of the metal amidine complex is formate, acetate, 2-ethylhexanoate, or neodecanoate.

In certain embodiments, the metal amidine complex is one as described in U.S. Pat. No. 7,485,729 to Hsieh et al, herein incorporated by reference in its entirety. Procedures for preparing the metal amidine complexes herein can be found at cols. 21-22 and Table 2 of U.S. Pat. No. 7,485,729, specifically incorporated herein by reference.

In certain embodiments, the metal of the catalyst composition is mercury, bismuth, barium, zinc, calcium, cadmium, zirconium, aluminum, nickel, manganese, vanadium, iron, cerium, thorium, cobalt, copper, titanium, hafnium, lithium, lead, or potassium. In particular embodiments, the metal of the metal compound is zinc or bismuth. In certain embodiments, the metal is comprised by a metal carboxylate.

In certain embodiments the amine carboxylate salt useful in this disclosure is derived from one or more amine selected from aliphatic primary amines such as methylamine, ethylamine, propylamine, isopropylamine, butylamine, amylamine, hexylamine, octylamine, 2-ethylhexylamine, nonylamine, decylamine, oleylamine, laurylamine, pentadecylamine, cetylamine, stearylamine, cyclohexylamine and the like; aliphatic secondary amines such as dimethylamine, diethylamine, dipropylamine, diisopropylamine, dibutylamine, diamylamine, dihexylamine, dioctylamine, di(2-ethylhexylamine, didecylamine, dilaurylamine, dicetylamine, distearylamine, methylstearylamine, ethylstearylamine, butylstearylamine and the like; aliphatic tertiary amines such as triamylamine, trihexylamine, trioctylamine, ethyldiisopropylamine and the like; aliphatic unsaturated amines such as triallylamine, oleylamine and the like; alicyclic amines such as menthane diamine, isophorone diamine, norbornane diamine, piperidine, N,N'-dimethylpiperidine, N-aminoethylpiperidine, 1,2-diaminocyclohexane, bis(4-amino-3-methylcyclohexyl)methane, bis(4-aminocyclohexyl)methane, polycyclohexyl polyamine, 1,8-diazabicyclo[5,4,0]undecene-7 (DBU), 1,4-diazabicyclo(2,2,2)octane (DABCO), 1,5-diazabicyclo[4,3,0]nonene-5(DBN), 6-dibutylamino-1, 8-diazabicyclo[5,4,0]undecene-7, N,N-dimethylcyclohexylamine, 1,2-bis(dimethylamino)cyclohexane, 1,4-bis(dimethylamino)cyclohexane, N,N,N',N',-tetramethylisophoronediamine, N,N,N',N',-tetramethylnorbornanediamine, bis(4-dimethylaminocyclohexyl)methane, bis(4-dimethylamino-3-methylcyclohexyl)methane, aziridine and the like; aromatic amines such as meta-phenylenediamine, 4,4'-diaminodiphenylmethane, 4,4'-diaminodiphenylsulfone, N,N,N',N'-tetramethyl-1,4-phenylenediamine, N,N-dimethylbenzylamine, α-methylbenzyldimethylamine; aniline, laurylaniline, stearylaniline, triphenylamine and the like; aliphatic aromatic amines such as benzylamine, m-xylylenediamine, benzyldimethylamine, 2-(dimethylaminomethyl) phenol, 2,4,6-tris(dimetylaminomethyl)phenol; ether functional amines such as 3-methoxypropylamine, 3-lauryloxypropylamine, 3,9-bis(3-aminopropyl)-2,4,8,10-tetraoxaspiro[5,5]undecane (ATU), morpholine, N-methylmorpholine, polyoxypropylene diamine, polyoxypropylene triamine, polyoxyethylene diamine; polyamide amines such as polyamide obtained by reaction of dimer acid with a polyamine such as diethylenetriamine or triethylenetetraamine, polyamide from the other polycarboxylic acids, polyoxypropylene amines such as polyoxypropylene diamine, polyoxypropylene triamine; phenols; modified amines such as epoxy-modified amine obtained by reaction of the above amines with an epoxy compound, Mannich-modified amine obtained by reaction of the above amines with formalin and phenols, Michael addition-modified amine, ketimine and heterocyclic amines such as pyridine, 2-aminopyridine, 2-(dimethylamino)pyridine, 4-(dimethylaminopyridine), 2-hydroxypyridine, imidazole, 2-ethyl-4-methylimidazole, morpholine, N-methylmorpholine, piperidine, 2-piperidinemethanol, 2-(2-piperidino)ethanol, piperidone, dicyandiamide and other hydroxyl functional amines such as monoethanolamine, diethanolamine, triethanolamine, 3-hydroxypropylamine, 2-(2-aminoethylamino) ethanol, dimethylamino-2-propanol, diethylamino-2-propanol, dimethylamino ethanol, diethylamino ethanol, 2-dimethylamino-2-methyl-1-propanol, and diamines such as N-methyl-1,3-propanediamine, N,N'-dimethyl-1,3-propanediamine, ethylenediamine, propylenediamine, diethylenetriamine, triethylenetetramine, tetraethylenepentamine, hexamethylenediamine, methylpentamethylenediamine, trimethylhexamethylenediamine, guanidine, N,N,N',N',-tetramethylethylenediamine, N,N,N',N'-tetramethyl-1,3-diaminopropane, N,N,N',N'-tetramethyl-1,4-diaminobutane, N,N,N',N'-tetramethyl-1,6-diaminohexane, diethylaminopropylamine, dimthylaminopropylamine, 3-dimethylaminopropylamine, 3-diethylaminopropylamine, 3-butylaminopropylamine, 3-morpholinopropylamine, 2-(1-piperazinyl) ethylamine, guanidine, tetramethyl guanidine, diphenylguanidine, aryl-substituted biguanides such as 1-o-tolylbiguanide, 1-phenylbiguanide and the like, 2,4,6-tris (dimethylaminomethyl)phenol and the like. The amine compound is not limited thereto.

In certain embodiments the amine compound of the amine carboxylate salt is an amidine of formulae I-VIII described above.

As specific examples of amidine compounds useful in the current disclosure are 1,2-dimethyl-1,4,5,6-tetrahydropyrimidine, 1-ethyl-2-methyl-1,4,5,6-tetrahydropyrimidine, 1,2-diethyl-1,4,5,6-tetrahydropyrimidine, 1-n-propyl-2-methyl-1,4,5,6-tetrahydropyrimidine, 1-isopropyl-2-methyl-1,4,5,6-tetrahydropyrimidine, 1-ethyl-2-n-propyl-1,4,5,6-tetrahydropyrimidine and 1-ethyl-2-isopropyl-1,4, 5,6-tetrahydropyrimidine; guanidine compounds such as 1-methylguanidine, 1-n-butylguanidine, 1,1-dimethylguanidine, 1,1-diethylguanidine, 1,1,2-trimethylguanidine, 1,2,3-trimethylguanidine, 1,1,3,3-tetramethylguanidine, 1,1,2,3,3-pentamethylguanidine, 2-ethyl-1,1,3,3-tetramethylguanidine, 1,1,3,3-tetramethyl-2-n-propylguanidine, 1,1,3,3-tetramethyl-2-isopropylguanidine, 2-n-butyl-1,1,3,3-tetramethylguanidine, 2-tert-butyl-1,1,3, 3-tetramethylguanidine, 1,2,3-tricyclohexylguanidine, 1,5, 7-triazabicyclo[4.4.0]dec-5-ene, 7-methyl-1,5,7-triazabicyclo[4.4.0]dec-5-ene, 7-ethyl-1,5,7-triazabicyclo[4.4.0]dec-5-ene, 7-n-propyl-1,5,7-triazabicyclo[4.4.0]dec-5-ene, 7-isopropyl-1,5,7-triazabicyclo[4.4.0]dec-5-ene, 7-n-butyl-1,5,7-triazabicyclo[4.4.0]dec-5-ene, 7-isobutyl-1,5,7-triazabicyclo[4.4.0]dec-5-ene, 7-tert-butyl-1,5,7-triazabicyclo [4.4.0]dec-5-ene, 7 cyclohexyl-1,5,7-triazabicyclo[4.4.0] dec-5-ene, 7-n-octyl-1,5,7-triazabicyclo[4.4.0]dec-5-ene, 7-2-ethylhexyl-1,5,7-triazabicyclo[4.4.0]dec-5-ene and 7-decyl-1,5,7-triazabicyclo[4.4.0]dec-5-ene; and biguanide compound such as biguanide, 1-methylbiguanide, 1-n-butylbiguanide, 1-(2-ethylhexyl)biguanide, 1-n-octadecylbiguanide, 1,1-dimethylbiguanide, 1,1-diethylbiguanide, 1-cyclohexylbiguanide, 1-allylbiguanide, 1-n-butyl-N2-ethylbiguanide, 1,1'-ethylenebisbiguanide, 1-[3-(diethylamino)propyl]biguanide, 1-[3-(dibutylamino) propyl]biguanide and N',N"-dihexyl-3,12-diimino-2,4,11, 13-tetraazatetradecanediamidine. These amine compounds may be used singly or two or more of them may be used in combination.

Among them, 2-(dimethylamino) pyridine, 4-(dimethylamino) pyridine, 2-hydroxypyridine, imidazole, DBU, DBN, DABCO, and other heterocyclic compounds are preferred since they exhibit a high activity. DBU and DBN are more preferred. Aryl-substituted biguanides are also preferred since they exhibit a high adhesiveness.

In certain embodiments the amine carboxylate may be derived from an amine of general formula $R^{51}{}_d YR^{52}NHR^{53}$ wherein Y is one selected from O, N, S and P; when Y is O or S, d is 1 and when Y is N or P, d is 2; $R^{51}$ are each a hydrogen atom, or a substituted or unsubstituted hydrocarbon group having 1 to 20 carbon atoms; when the number of $R^{51}$ is two, $R^{51}$ may be the same or different; $R^{52}$ is a substituted or unsubstituted bivalent hydrocarbon group having 1 to 10 carbon atoms; and $R^{53}$ is a hydrogen atom or a methyl group. In particular, monoethanolamine, 3-hydroxypropylamine, 2-(2-aminoethylamino)ethanol, dimethylamino-2-propanol, diethylamino-2-propanol, dimethylamino ethanol, diethylamino ethanol, 2-dimethylamino-2-methyl-1-propanol ethylenediamine, N-methylethylenediamine, 1, 3-propanediamine, N-methyl-1, 3-propanediamine, N, N'-dimethyl-1, 3-propanediamine, diethylaminopropyl amine, dimethylaminopropyl amine and diethylenetriamine can be used.

In certain embodiments a phenyl guanidine of the structure below could be used in the preparation of the amine carboxylate salt;

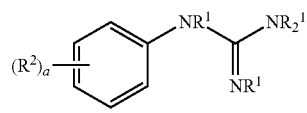

wherein, each $R^1$ is independently hydrogen or a hydrocarbon group in which the carbon atom at position 1 is saturated; each $R^2$ is independently hydrogen, a halogen, hydroxyl group, amino group, nitro group, acyano group, sulfonic acid group or an organic group, and a is an integer of 0 to 5.

Phenyl guanidines with a 2-methylphenyl group, a 3-methylphenyl group, a 4-methylphenyl group, a 4-aminophenyl group or a 4-guanidinophenyl group may be used, in many embodiments a phenyl guanidine having unsubstituted phenyl or 2-methylphenyl group are employed as they are readily available and enhance the surface curability of the organic polymer (A) and provide cured products exhibit good adhesiveness.

A ketimine which generates an amine compound by hydrolysis can also be used as an amine precursor to the amine carboxylate salt of the silanol condensation catalyst of the present disclosure.

The carboxylate of the amine carboxylate salt may a carboxylate as described above for amidine complexes comprising a carboxylate, but are not limited thereto. Specific examples of carboxylic acid which can used together with an amine compound include straight chain saturated fatty acids such as acetic acid, propionic acid, butyric acid, valeric acid, caproic acid, enanthic acid, caprylic acid, 2-ethylhexanoic acid, pelargonic acid, capric acid, undecanoic acid, lauric acid, tridecanoic acid, myristic acid, pentadecanoic acid, palmitic acid, heptadecanoic acid, stearic acid, nonadecanoic acid, arachic acid, behenic acid, lignoceric acid, cerotic acid, montanic acid, melissic acid, lacceric acid and the like; monoene unsaturated fatty acids such as undecylenic acid, linderic acid, tsuzuic acid, physeteric acid, myristoleic acid, 2-hexadecenoic acid, 6-hexadecenoic acid, 7-hexadecenoic acid, palmitoleic acid, petroselic acid, oleic acid, elaidic acid, asclepinic acid, vaccenic acid, gadoleic acid, gondoic acid, cetoleic acid, erucic acid, brassidic acid, selacholeic acid, ximenic acid, lumequeic acid, acrylic acid, methacrylic acid, angelic acid, crotonic acid, isocrotonic acid, 10-undecenoic acid and the like; polyene unsaturated fatty acids such as linoelaidic acid, linoleic acid, 10,12-octadecadienoic acid, hiragoic acid, alpha-eleostearic acid, beta-eleostearic acid, punicic acid, linolenic acid, 8,11,14-eicosatrienoic acid, 7,10,13-docosatrienoic acid, 4,8,11,14-hexadecatetraenoic acid, moroctic acid, stearidonic acid, arachidonic acid, 8,12,16,19-docosatetraenoic acid, 4,8,12, 15,18-eicosapentaenoic acid, clupanodonic acid, nishinic acid, docosahexaenoic acid and the like; branched fatty acids such as 1-methylbutyric acid, isobutyric acid, 2-ethylbutyric acid, isovaleric acid, tuberculostearic acid, pivalic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, neodecanoic acid, versatic acid and the like; fatty acids having a triple bond such as propiolic acid, tariric acid, stearolic acid, crepenynic acid, ximenynic acid, 7-hexadecynoic acid and the like; alicyclic carboxylic acids such as naphthenic acid, malvalic acid, sterculic acid, hydnocarpic acid, chaulmoogric acid, gorlic acid, 1-methylcyclopentanecarboxylic acid, 1-methylcyclohexanecarboxylic acid, 2-methylbicyclo[2.2.1]-5-heptene-2-carboxylic acid, 1-adamantanecarboxylic acid, bicycle[2.2.1]heptane-1-carboxylic acid, bicycle[2.2.2]octane-1-carboxylic acid and the like; oxygen containing fatty acids such as acetoacetic acid, ethoxy acetic acid, glyoxylic acid, glycolic acid, gluconic acid, sabinic acid, 2-hydroxytetradecanoic acid, ipurolic acid, 2,2-dimethyl-3-hydroxypropionic acid, 2-hydroxyhexadecanoic acid, jalapinolic acid, juniperic acid, ambrettolic acid, aleuritic acid, 2-hydroxyoctadecanoic acid, 12-hydroxyoctadecanoic acid, 18-hydroxyoctadecanoic acid, 9,10-dihydroxyoctadecanoic acid, ricinoleic acid, camlolenic acid, licanic acid, pheronic acid, cerebronic acid, 2-methyl-7-oxabicyclo[2.2.1]-5-heptene-2-carboxylic acid and the like; and halogen substituted monocarboxylic acids such as chloroacetic acid, 2-chloroacrylic acid and chlorobenzoic acid. Examples of aliphatic dicarboxylic acids include saturated dicarboxylic acids such as adipic acid, azelaic acid, pimelic acid, suberic acid, sebacic acid, ethylmalonic acid, glutaric acid, oxalic acid, malonic acid, succinic acid, oxydiacetic acid, dimethylmalonic acid, ethylmethylmalonic acid, diethylmalonic acid, 2,2-dimethylsuccinic acid, 2,2-diethylsuccinic acid, 2,2-dimethylglutaric acid, 1,2,2-trimethyl-1,3-cyclopentanedicarboxylic acid; and unsatureated dicarboxylic acids such as maleic acid, fumaric acid, acetylenedicarboxylic acid and itaconic acid. Examples of aliphatic polycarboxylic acids include tricarboxylic acids such as aconitic acid, 4,4-dimethylaconitic acid, citric acid, isocitric acid, 3-methylisocitric acid and the like. Examples of aromatic carboxylic acids include aromatic monocarboxylic acids such as benzoic acid, 9-anthracenecarboxylic acid, atrolactic acid, anisic acid, isopropylbenzoic acid, salicylic acid and toluic acid; and aromatic polycarboxylic acids such as phthalic acid, isophthalic acid, terephthalic acid, carboxyphenylacetic acid, pyromellitic acid and the like.

Typically, the acid employed in the amine carboxylate is a monocarboxylic acid, for example a linear monocarboxylic acid due to good compatibility with the silane functional polymers. When the melting point of a carboxylic acid is high the handling thereof can become difficult. Accordingly, the melting point of the carboxylic acid used together with the amine compound in the silanol condensation catalyst is typically 65° C. or lower, for example from −50 to 50° C., often from −40 to 35° C.

Typically, the number of carbon atoms in the carboxylic acid is from 5 to 20, for example from 6 to 18, often from 8 to 12. If the number of the carbon atoms too large the carboxylic acids are solids, which can render them incompatible with silane functional polymers. On the other hand, if the number of the carbon atoms is too small the volatility of the carboxylic acid becomes high so that odor tends to increase.

In many embodiments, due in part to availability and workability, the carboxylate is derived from 2-ethylhexanoic acid, octanoic acid, oleic acid, naphthenic acid, 2,2-dimethyloctanoic acid, 2-ethyl-2,5-dimethylhexanoic acid, neodecanoic acid, versatic acid and the like.

In certain embodiment the catalyst composition may comprise from about 1 to about 99% of the amine carboxylate and from about 1 to 99% of metal amidine complex; in another embodiment from about 1 to about 20% of metal amidine complex and from about 10 to 99% of the amine carboxylate.

In certain embodiments, the catalyst composition comprises a mixture of at least one metal amidine complex and at least one amine carboxylate, and excess free carboxylic acid. In certain embodiments, the molar ratio of carboxylic acid used is from about 1.0 to 10.0 per mole of amine, or more preferably from about 1.0 to 4.0 per mole of amine.

The inventors have unexpectedly found that amidine complexes in combination with carboxylate salts of various amines either on its own or in combination with certain adhesion promoter components and/or acidic compounds exhibit curing behavior similar to or even better than organotin compounds, and are therefore suitable as replacements for organotin catalysts in compositions having a reactive silyl-terminated polymer that can undergo condensation reactions such as in RTV-1 sealant and RTV-2 formulations.

Curable compositions using selected amidine complexes in combination with amine carboxylates compounds or a combination thereof may also exhibit certain storage stability of the uncured composition in the cartridge, adhesion onto several surfaces, and a cure rate in a predictable time scheme.

Thus, many embodiments of the disclosure provided a curable composition exhibiting a relatively short tack-free time, curing through the bulk, as well as long storage stability in the cartridge, i.e., in the absence of humidity.

For example, one embodiment provides a curable composition, comprising:
(A) one or more organic polymers having a reactive-silicon-containing group, and
(B) a silanol condensation catalyst consisting of one or more metal amidine complexes and one or more amine carboxylate salts,
wherein at least one part of the reactive-silicon-containing group(s) of the organic polymer(s) (A) is represented by the following general formula:

$$—(CR^2{}_2)_2—(SiR^1{}_{2-a}X_a)_m—SiX_3 \qquad (1)$$

wherein each $R^1$ independently represents a substituted or unsubstituted hydrocarbon group having 1 to 20 carbon atoms, or a triorganosiloxy group represented by $(R')_3SiO—$ wherein R's are each a substituted or unsubstituted hydrocarbon group having 1 to 20 carbon atoms, and R's may be the same or different, each $R^2$ are independently a hydrogen atom, or a substituted or unsubstituted hydrocarbon group having 1 to 10 carbon atoms, each X are independently a hydroxyl group, or a hydrolyzable group, a is 0, 1 or 2, and m is 0 or an integer of from 1 to 19.

For example, in certain embodiments X is an alkoxy group, e.g., a methoxy group.

In many embodiments the ratio of the organic polymer having the group represented by the general formula (1) in the organic polymer(s) of the component (A) in the curable composition of the disclosure is 10% or more by weight.

Many embodiments is provide a curable composition wherein the main chain skeleton of the organic polymer(s) of the component (A) is at least one polymer selected from the group consisting of polyoxyalkylene polymers, saturated hydrocarbon polymers, and (meth) acrylic acid ester polymers. In certain embodiments the polyoxyalkylene polymers are polyoxypropylene polymers.

In many embodiments the silanol condensation catalyst is present in an amount of 0.001 to 20 parts by weight for 100 parts by weight of the organic polymer(s) (A).

In certain embodiments the curable composition of the disclosure further comprises a silane coupling agent (C), typically in an amount of 0.01 to 20 parts by weight for 100 parts by weight of the organic polymer(s) (A).

Certain embodiments are to a one-part type curable composition comprising the curable composition of the disclosure.

One particular embodiment provides a sealant comprising the curable composition of the disclosure.

One particular embodiment provides an adhesive comprising the curable composition of the disclosure.

Example of silane coupling agents useful in the disclosure include isocyanate silanes such as γ-isocyanate propyltrimethoxysilane, γ-isocyanate propyltriethoxysilane, γ-isocyanate propylmethyldiethoxysilane, γ-isocyanate propylmethyldimethoxysilane, (isocyanatemethyl) trimethoxysilane, (isocyanatemethyl) dimethoxymethylsilane and the like; ketimine type silanes such as N-(1,3-dimethylbutylidene)-3-(triethoxysilyl)-1-propaneamie and the like; mercaptosilanes such as γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltriethoxysilane and the like; carboxysialnes such as β-carboxyethyltriethoxysilane, β-carboxyethylphenylbis(2-methoxyethoxy)silane, N-β-(carboxymethyl)aminoethyl-γ-aminopropyltrimethoxysilane and the like; vinyl-type-unsaturated-group-containing silanes such as vinyltrimethoxysilane, vinyltriethoxysilane, γ-methacryloyloxypropylmethyldimethoxy silane, γ-acryloyloxypropyltriethoxysilane and the like; halogen-containing silanes such as γ-chloropropyltrimethoxysilane and the like; and isocyanurate silanes such as tris(3-trimethoxysilylpropyl) isocyanurate and the like, and the like. A reactant of an aminosilane and an isocyanate silane as described above, a reactant of an aminosilane and a (meth)acryloyloxy-group-containing silane, or the like can also be used. Condensation products obtained by condensing the above-mentioned silanes partially can also be used. Furthermore, derivatives obtained by modifying these can also be used as the silane coupling agent, examples of the derivatives including amino-modified silyl polymers, silated aminopolymers, unsaturated aminosilane complexes, phenylamino long-chain alkylsilanes, aminosililated silicones, and sililated polyesters.

Certain embodiments provide a composition for forming a cured polymer composition comprising (A) a polymer having at least a reactive silylgroup; (B) about 0.01-7 parts per weight per 100 parts per weight of the polymer (A) of the above silanol condensation catalyst; (C) a coupling agent, crosslinker or chain extender chosen from an alkoxysilane, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane, an alkoxycarbamatosiloxane, and combinations of two or more thereof; (D) at least one adhesion promoter chosen from a silane or siloxane other than the compounds listed under (C); (E) optionally, a filler component; and (F) optionally at least one acidic compound chosen from a phosphate ester, a phosphonate, a phosphite, a phosphine, a sulfite, a pseudohalogenide, a branched $C_4$-$C_{30}$-alkyl carboxylic acid or a combination of two or more thereof.

In certain embodiments, the polymer component ($A_1$) has the formula:

$$R^2{}_{3-a}R^1{}_aSi—Z—[R_2SiO]_x[R^1{}_2SiO]_y—Z—SiR^1{}_aR^2{}_{3-a}$$

wherein x is 0 to 10000; y is 0 to 1000; a is 0 to 2; and R is methyl. In another aspect, $R^1$ is chosen from a $C_1$-$C_{10}$-alkyl, a $C_1$-$C_{10}$alkyl substituted with one or more of Cl, F, N, O or S, a phenyl, a $C_7$-$C_{16}$ alkylaryl, a $C_7$-$C_{16}$ arylalkyl, a $C_2$-$C_4$ polyalkylene ether, or a combination of two or more thereof, and other siloxane units may be present in amounts less than 10 mol % such as methyl, vinyl, phenyl. In yet another embodiment, $R^2$ is chosen from OH, a $C_1$-$C_8$-alkoxy, a $C_2$-$C_{18}$-alkoxyalkyl, an oximoalkyl, an enoxyalkyl, an aminoalkyl, a carboxyalkyl, an amidoalkyl, an amidoaryl, a carbamatoalkyl, or a combination of two or more thereof, and Z is —O—, bond, or —$C_2H_4$—.

In certain embodiments the crosslinker component (C) is chosen from tetraethylorthosilicate (TEOS), a polycondensate of TEOS, methyltrimethoxysilane (MTMS), vinyltrimethoxysilane, methylvinyldimethoxysilane, dimethyldiethoxysilane, vinyltriethoxysilane, tetra-n-propylorthosilicate, vinyltris(methylethylketoxime)silane, methyltris(methylethylketoxime)silane, trisacetamidomethylsilane, bisacetamidodimethylsilane, tris(N-methyl-acetamido)methylsilane, bis(N-methylacetamido)dimethylsilane, (N-methyl-acetamido)methyldialkoxysilane, trisbenzamidomethylsilane, trispropenoxymethylsilane, alkyldialkoxyamidosilanes, alkylalkoxybisamidosilanes, $CH_3Si(OC_2H_5)_{1-2}(NHCOR)_{2-1}$, $(CH_3Si(OC_2H_5)(NCH_3COC_6H_5)_2$, $CH_3Si(OC_2H_5)$—$(NHCOC_6H_5)_2$, methyldimethoxy(ethylmethyl-ketoximo)silane; methylmethoxybis-(ethyl methyl ketoximo)silane; methyldimethoxy(acetal-doximo)silane; methyldimethoxy(N-methylcarbamato)silane; ethyldimethoxy(N-methyl-carbamato)silane; methyldimethoxyisopropenoxysilane; trimethoxyisopropenoxysilane; methyltri-isopropenoxysilane; methyldimethoxy(but-2-ene-2-oxy)silane; methyldimethoxy(1-phenylethenoxy)silane; methyldimethoxy-2(1-carboethoxypropenoxy)silane; methylmethoxydi-N-methylaminosilane; vinyldimethoxymethylaminosilane; tetra-N,N-diethylaminosilane; methyldimethoxymethylaminosilane; methyltricyclohexylaminosilane; methyldimethoxy-ethylaminosilane; dimethyldi-N,N-dimethylaminosilane; methyldimethoxyisopropylaminosilane dimethyldi-N,N-diethylaminosilane; ethyldimethoxy(N-ethylpropionamido)silane; methyldi-methoxy(N-methylacetamido)silane; methyltris(N-methylacetamido)silane; ethyldimethoxy(N-methylacetamido)silane; methyltris(N-methylbenzamido)silane; methylmethoxybis(N-methylacetamido)silane; methyldi methoxy(caprolactamo)silane; trimethoxy(N-methylacetamido)silane; methyldi methoxyethylacetimidatosilane; methyldi methoxy-propylacetimidatosilane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldi methoxythioisocyanatosilane; methylmethoxydithioisocyanatosilane, or a combination of two or more thereof.

According to one embodiment, the composition comprises about 1 to about 10 wt. % of the crosslinker component (C) based on 100 wt. % of the polymer component (A).

In certain embodiments, the adhesion promoter component (D) is chosen from an aminoalkyltrialkoxysilane, an aminoalkylalkyldialkoxysilane, a bis(alkyltrialkoxy-silyl)amine, a tris(alkyltrialkoxysilyl)amine, a tris(alkyltrialkoxysilyl)cyanuarate, and a tris-(alkyl-trialkoxy-silyl)isocyanuarate, or a combination of two or more thereof.

According to one embodiment, the component (F) is chosen from a mono ester of a phosphate; a phosphonate of the formula $(R_3O)PO(OH)_2$, $(R_3O)P(OH)_2$, or $R_3P(O)(OH)_2$ where $R_3$ is a $C_1$-$C_{18}$-alkyl, a $C_2$-$C_{20}$-alkoxyalkyl, phenyl, a $C_7$-$C_{12}$-alkylaryl, a poly($C_2$-$C_4$-alkylene)oxide ester or its mixtures with diesters; a branched alkyl $C_4$-$C_{14}$-alkyl carboxylic acid; or a combination of two or more thereof.

According to one embodiment, the crosslinker component (C) is chosen from a silane or a siloxane, the silane or siloxane having two or more reactive groups that can undergo hydrolysis and/or condensation reaction with polymer (A) or on its own in the presence of water and component (F).

According to one embodiment, the polymer component (A) is chosen from a polyorganosiloxane comprising divalent units of the formula $[R_2SiO]$ in the backbone, wherein R is chosen from a $C_1$-$C_{10}$-alkyl; a $C_1$-$C_{10}$ alkyl substituted with one or more of Cl, F, N, O or S; a phenyl; a $C_7$-$C_{16}$ alkylaryl; a $C_7$-$C_{16}$ arylalkyl; a $C_2$-$C_4$ polyalkylene ether; or a combination of two or more thereof.

According to one embodiment, the catalyst (B) is present in an amount of from about 0.0.025 to about 0.7 parts per weight per 100 pt. wt. of component (A).

According to one embodiment, the component (F) is present in an amount of from about 0.02 to about 3 part per 100 parts of component (A).

According to one embodiment, the composition comprises 100 parts of component (A), 0.01 to about 7 parts of a catalyst (B), 0.1 to about 10 parts of at least one crosslinker (C), 0.1 to about 5 parts of an adhesion promoter (D), 0 to about 300 parts of component (E), 0.01 to about 8 parts of component (F) whereby this composition can be stored in the absence of humidity and is curable in the presence of humidity upon exposure to ambient air.

According to one embodiment, the composition is a two-part composition comprising: (i) a first portion comprising the polymer component (A), optionally the filler component (E), and optionally the acidic compound ($F_1$; and (ii) a second portion comprising the crosslinker (C), the catalyst component (B), the adhesive promoter (D), and the acidic compound (F), whereby (i) and (ii) are stored separately until applied for curing by mixing of the components (i) and (ii).

According to one embodiment, portion (i) comprises 100% wt. of component (A), and 0 to 70 parts of component (E); and portion (ii) comprises 0.1 to 10 parts of at least one crosslinker (C), 0.01 to 7 parts of a catalyst (B), 0 to 5 parts of an adhesion promoter (D), and 0.02 to 3 parts component (F).

In another aspect, the present disclosure provides a method of providing a cured material comprising exposing the composition to ambient air.

According to one embodiment, a method of providing a cured material comprises combining the first portion and the second portion and curing the mixture.

According to one embodiment, the composition is stored in a sealed cartridge or flexible bag having outlet nozzles for extrusion and/or shaping of the uncured composition prior to cure.

In still another aspect, the present disclosure provides a cured polymer material formed from the composition.

According to one embodiment, the cured polymer material is in the form of an elastomeric or duromeric seal, an adhesive, a coating including antifouling coating, an encapsulant, a shaped article, a mold, and an impression material.

The compositions are found to exhibit good storage stability and adhere to a variety of surfaces. In one embodiment, the curable compositions exhibit excellent adherence to thermoplastic surfaces, including polyacrylate and polymethylmethacrylate (PMMA) surfaces.

Further according to the disclosure, there is provided a silanol condensation catalyst consisting of one or more metal amidine complexes and one or more amine carboxylate salts. Yet further according to the disclosure, there is provided a silanol condensation catalyst consisting essentially of one or more metal amidine complexes and one or more amine carboxylate salts. In the latter, the catalyst does not contain additional substances that change the essential features of the catalyst.

DETAILED DESCRIPTION OF THE DISCLOSURE

In accordance with the present disclosure is provided a composition comprising a metal amidine complex in combination with amine carboxylate salts that are useful as catalysts for polymerization reactions of one or more organic polymers having a reactive-silicon-containing group.

In certain embodiments, the amidine of the metal amidine complex has the formula

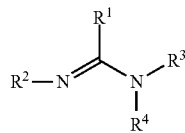

wherein $R^1$ is hydrogen, alkyl of 1 to 25 carbon atoms, an amine group which can be substituted, for example by an optionally substituted hydrocarbyl group, or a hydroxyl group which can be etherified, for example with an optionally substituted hydrocarbyl group having up to 8 carbon atoms; $R^2$ and $R^3$ each independently represent hydrogen or an organic group attached through a carbon atom or are joined to one another to form with the linking —N═C—N— a heterocyclic ring or a fused bicyclic ring with one or more heteroatoms, and $R^4$ represents hydrogen, an organic group attached through a carbon atom or a hydroxy group which can be etherified, for example with an optionally substituted hydrocarbyl group having up to 8 carbon atoms. When $R^1$ or $R^4$ is an organic group it can for example contain 1 to 40 carbon atoms or can be a polymeric group, for example having a molecular weight of 500 to 50,000. The groups $R^1$, $R^2$, $R^3$, $R^4$ could contain as substituents a total of at least two or more alcoholic hydroxyl groups.

In certain embodiments, the amidine of the metal amidine complex is N'-cyclohexyl-N,N-dimethylformamidine, N'-methyl-N,N-di-n-butylacetamidine, N'-octadecyl-N,N-dimethylformamidine, N'-cyclohexyl-N,N-dimethylvaleramidine, 1-methyl-2-cyclohexyliminopyrrolidine, 3-butyl-3,4,5,6-tetrahydropyrimidine, N-(hexyliminomethyl) morpholine, N-(α-(decylimino ethyl)ethyl)pyrrolidine, N'-decyl-N,N-dimethylformamidine, N'-dodecyl-N,N-dimethylformamidine, N'-cyclohexyl-N,N-acetamidine, pentamethylguanidine, tetramethylguanidine, or heptamethylisobiguanide.

In certain embodiments, the amidine of the metal amidine complex is an amidine in which one of the pairs $R^2$-$R^3$ or $R^2$-$R^4$ forms a 5 to 7 membered ring consisting of the two amidine nitrogen atoms and one of the pairs $R^1$-$R^3$ or $R^1$-$R^4$ forms a 5 to 9 membered ring consisting of one amidine nitrogen atom and carbon atoms. In specific embodiments, the amidine is 1,5-diazabicyclo(4.3.0) none-5-ene, 1,8-diazabicyclo(5.4.0) undec-7-ene, 1,4-diazabicyclo(3.3.0) oct-4-ene, 2-methyl-1,5-diazabicyclo(4.3.0) none-5-ene, 2,7,8-trimethyl-1,5-diazabicyclo(4.3.0) none-5-ene, 2-butyl-1,5-diazabicyclo(4.3.0) none-5-ene or 1,9-diazabicyclo(6.5.0) tridec-8-ene.

Particular amidine groups are those in which the groups $R^2$ and $R^3$ are joined to form with the linking —N═C—N— a heterocyclic ring, for example an imidazoline, imidazole, tetrahydropyrimidine, dihydropyrimidine or pyrimidine ring. Acyclic amidines and guanidines can alternatively be used.

In other embodiments, the amidine of the metal amidine complex is an amidine of the following formula: where $R^5$, $R^6$, $R^7$, and $R^8$ are independently represent hydrogen, alkyl, or substituted alkyl, hydroxyalkyl, aryl, aralkyl, cycloalkyl, heterocyclics, ether, thioether, halogen, —N(R)$_2$, polyethylene polyamines, nitro groups, keto groups, ester groups, or carbonamide groups, alkyl substituted with the various functional groups described above. In other embodiments, the amidine of the metal amidine complex is not an amidine of the aforementioned formula.

In certain embodiments, the amidine of the metal amidine complex is N-(2-Hydroxyethyl)imidazole, N-(3-Aminopropyl)imidazole, 4-(hydroxymethyl)Imidazole, 1-(tert-butoxycarbonyl)imidazole, Imidazole-4-propionic acid, 4-carboxyimidazole, 1-butylimidazole, 2-methyl-4-imidazolecarboxylic acid, 4-formyl imidazole, 1-(ethoxycarbonyl)imidazole, reaction product of propylene oxide with imidazole and 2-methyl imidazole, 1-trimethylsilyl imidazole, 4-(hydroxymethyl) Imidazole hydrochloride, copolymer of 1-chloro-2,3-epoxypropane and imidazole, 1(p-toluenesulfonyl)imidazole, 1,1'-carbonylbisimidazole, 1-(2-cyanoethyl)-2-ethyl-4-methylimidazole, 2-phenyl-2-imidazoline pyromellitate, 4-(hydroxymethyl) Imidazole picrate, reaction product of 2-propenoic acid with 4,5-dihydro-2-nonyl-1H-imidazole-1-ethanol and 2-heptyl-4,5-dihydro-1H-imidazole-1-ethanol, disodium salts, 1-(cyanoethyl)-2-undecylimidazole trimellitate, 1-(2-hydroxypropyl)imidazole formate, sodium imidazolate, or silver imidazolate.

In certain embodiments, the amidine of the metal amidine complex is a cyclic amidine imidazoline or tetrahydropyrimidine of the formula:

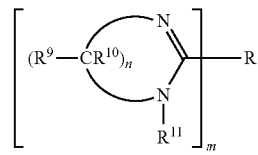

in which n=2 or 3, m=1 or 2, $R^9$, $R^{10}$ and $R^{11}$ are identical or different, and represent hydrogen, alkyl, or substituted alkyl, hydroxyalkyl, aryl, aralkyl, cycloalkyl, heterocyclics, ether, thioether, halogen, —N(R)$_2$, polyethylene polyamines, nitro groups, keto groups, ester groups, or carbonamide groups, alkyl substituted with the various functional groups described above, and R represents alkyl, alkylene, an aryl, aralkyl, cycloalkyl or heterocyclic radical, substituted if desired with halogen, nitro groups, alkyl groups, alkoxy groups or amino groups, and, when m=1, represents also hydrogen, a plurality of radicals being able to be joined, also by hetero atoms such as O, N or S, if desired. Salts of the above structures include carboxylic (aliphatic, aromatic and poly carboxylic), carbonic, sulfonic and phosphoric acid salts. In certain embodiments, the amidine of the metal amidine complex is not an amidine of the aforementioned formula.

In other embodiments, $R^9$, $R^{10}R^{11}$ are independently hydrogen, alkyl, alkenyl or alkoxy of 1 to 36 carbons, cycloalkyl of 6 to 32 carbons or alkylamino of 1 to 36 carbon atoms, cycloalkyl of 5 to 12 carbon atoms, phenyl, hydroxyalkyl or hydroxycycloalkyl of 1 to 20 carbon atoms, methoxyalkyl of 1 to 20 carbon atoms, aralkyl of 7 to 9 carbon atoms, said aralkyl wherein the aryl group is further substituted by alkyl of 1 to 36 carbon atoms.

When m=2, R is alkylene of 1 to 12 carbons or arylene of 6 to 10 carbons, or a plurality of radicals being able to be joined, containing hetero atoms also by hetero atoms such as O, N or S, if desired.

In some embodiments imidazoline structures are where R is a long chain alkyl up to 18 carbon atoms, m=1 and $R^{11}$ is one of 2-hydroxyethyl, or 2-aminoethyl or 2-amido ethyl substituents.

In certain embodiments, the amidine of the metal amidine complex is 1H-Imidazole-1-ethanol, 2-(8Z)-8-heptadecenyl-4,5-dihydro, 1H-Imidazole-1-ethanol, 2-(8Z)-8-heptadecenyl-4,5-dihydro,monoacetate salt, 1H-Imidazole-1-ethanol, -4,5-dihydro,-2-(9Z)-9-octadecenyl, 1H-Imidazole, 4,5-dihydro,-2-(9Z)-9-octadecenyl,oleyl hydroxyethyl imidazoline, 1H-Imidazole-1-ethanol, 4,5-dihydro-2-undecyl-, 1H-Imidazole-1-ethanol, 2(-8-heptadecenyl)-4,5-dihydro,1-(2-hydroxyethyl)-2-tall oil alkyl-2-imidazoline, azelaic acid salt, 1H-Imidazole-1-ethanol, 2-heptadecyl-4,5-dihydro, 1H-Imidazole-1-ethanol, 2-nonyl-4,5-dihydro, 1H-Imidazole-1-ethanol, 4,5-dihydro-2-$C_{15-17}$-unsaturated alkyl derivatives, 1H-Imidazole-1-ethanol, 4,5-dihydro-2-norcoco alkyl derivatives, 1H-Imidazole-1-ethanol, 4,5-dihydro-2-nortall-oil alkyl derivatives, reaction product of 4,5-dihydro-2-nonyl 1H-Imidazole-1-ethanol, and 4,5-dihydro-2-heptyl 1H-Imidazole-1-ethanol with 2-propenoic acid, 1-propane sulfonic acid, 3-chloro-2-hydroxy-mono sodium salt reaction products with 2-(8Z)-8-heptadecenyl-4,5-dihydro 1H-Imidazole-1-ethanol, chloroacetic acid sodium salt reaction products with 1H-Imidazole-1-ethanol, 4,5-dihydro-2-norcoco alkyl derivatives, and sodium hydroxide, 2-(8-heptadecenyl)-4,5-dihydro 1H-Imidazole-1-ethanamine, or the 9-octadecenoic acid compound with 2-(8-heptadecenyl)-4,5-dihydro 1H-Imidazole-1-ethanamine.

Unless otherwise noted, an "alkyl having up to 30 carbon atoms," as used herein, refers to a branched or unbranched radical such as, for example, methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl.

Unless otherwise noted, an "alkyl having 2 to 25 carbon atoms which is interrupted by oxygen or sulfur," or an "alkyl having 3 to 25 carbon atoms which is interrupted by oxygen or sulfur," refers to an alkyl or the specified number of carbon atoms which can be interrupted one or more times, for example, $CH_3$—O—$CH_2$—, $CH_3$—S—$CH_2$—, $CH_3$—O—$CH_2CH_2$—O—$CH_2$—, $CH_3$—(O—$CH_2CH_2$—)$_2$O—$CH_2$—, $CH_3$—(O—$CH_2CH_2$—)$_3$O—$CH_2$— or $CH_3$—(O—$CH_2CH_2$—)$_4$O—$CH_2$—.

Unless otherwise noted, an "alkenyl having 2 to 24 carbon atoms," as used herein, refers to a branched or unbranched radical, for example, vinyl, propenyl, 2-butenyl, 3-butenyl isobutenyl, n-2,4 pentadienyl, 3-methyl-2-butenyl, n-2-octenyl, n-2-dodecenyl, isododecenyl, oleyl, n-2-octadecenyl or n-4-octadecenyl. $C_4$-$C_{15}$ Cycloalkyl, or $C_5$-$C_{15}$ cycloalkyl, which is unsubstituted or substituted.

$C_5$-$C_{15}$ Cycloalkenyl which is unsubstituted or substituted by $C_1$-$C_4$ alkyl and/or carboxyl and which may contain 1 to 3 branched or unbranched alkyl group radicals and/or 1 or 2 carboxyl groups, can be, for example, cyclopentyl, methylcyclopentyl, dimethylcyclopentyl, cyclohexyl, 2-carboxycyclohexyl, 3-carboxycyclohexyl, methylcyclohexyl, dimethylcyclohexyl, trimethylcyclohexyl, tert-butylcyclohexyl, cycloheptyl, cyclooctyl or cyclododecyl.

$C_5$-$C_{15}$ Cycloalkenyl which is unsubstituted or substituted by $C_1$-$C_4$ alkyl and/or carboxyl and which contains 1 to 3 branched or unbranched alkyl group radicals and/or 1 or 2 carboxyl groups, can be, for example, cyclopentenyl, methylcyclopentenyl, dimethylcyclopentenyl, cyclohexenyl, 2-carboxycyclohexenyl, 3-carboxycyclohexenyl, 2-carboxy-4-methylcyclohexenyl, methylcyclohexenyl, dimethylcyclohexenyl, trimethylcyclohexenyl, tert-butylcyclohexenyl, cycloheptenyl, cyclooctenyl or cyclododecenyl, e.g., $C_5$-$C_{12}$ cycloalkenyl, in particular $C_5$-$C_{18}$ cycloalkenyl, e.g., cyclohexenyl.

$C_{13}$-$C_{26}$ polycycloalkyl can be, for example, the $C_{13}$-$C_{26}$ polycycloalkyls, which occur in naphthenic acid [J. Buckingham, Dictionary of Organic Compounds, Vol. 4, page 4152, 5th Edition (1982)].

$C_7$-$C_9$ Phenylalkyl which is unsubstituted or substituted on the phenyl radical by $C_1$-$C_4$ alkyl and which may contain 1 to 3 branched or unbranched alkyl group radicals can be, for example, benzyl, α-methylbenzyl, α,α-dimethylbenzyl 2-phenylethyl, 2-methylbenzyl, 3-methylbenzyl, 4methylbenzyl, 2,4-dimethylbenzyl, 2,6-dimethylbenzyl or 4-tert-butylbenzyl, e.g., benzyl.

A 5- or 6-membered heterocyclic ring which is unsubstituted or substituted by $C_1$-$C_4$ alkyl, $C_1$-$C_4$ alkoxy, halogen or carboxyl and which may contain 1 to 3, branched or unbranched alkyl or alkoxy group radicals, and 1 to 3 heteroatoms from the group consisting of nitrogen, oxygen and sulfur can be, for example, thienyl, 2-methylthienyl, 3-chlorothienyl, 3-methoxythienyl, tetrahydrofuranyl, furyl, pyrrolidinyl, 1-methylpyrrolidinyl, pyrrolyl, thiazolyl, isothiazolyl, imidazolyl, carboxyimidazolyl, triazolyl, tetrazolyl, oxazolyl, isoxazolyl, pyridyl, piperidinyl, morpholinyl, pyrazinyl, carboxypyrazinyl, piperazinyl, triazinyl or 2,6-di methoxytriazonyl.

A 5- or 6-membered heterocyclic ring which is unsubstituted or substituted by $C_1$-$C_4$ alkyl, $C_1$-$C_4$ alkoxy, halogen or carboxy and is benzo-fused, which may contain 1 to 3 branched or unbranched alkyl or alkoxy group radicals and 1 to 3 heteroatoms from the group consisting of nitrogen, oxygen and sulfur can be, for example, benzothiazolyl, 5-chlorobenzothiazolyl, 5-methoxybenzothiazolyl, 5-methylbenzothiazolyl, benzoimidazolyl, benzooxazolyl, benzoisothiazolyl or benzothienyl.

Unless otherwise noted, an "alkoxy having up to 18 carbon atoms," as used herein, refers to a branched or unbranched radical such as, for example, methoxy, ethoxy, propoxy, isopropoxy, n-butoxy, isobutoxy, pentoxy, isopentoxy, hexoxy, heptoxy, octoxy, decyloxy, tetradecyloxy, hexadecyloxy or octadecyloxy. $C_2$-$C_{18}$ Alkoxy which is interrupted by oxygen or sulfur can be, for example, $CH_3$—O—$CH_2CH_2$O—, $CH_3$—S—$CH_2CH_2$O—, $CH_3$—O—$CH_2CH_2$—O—$CH_2CH_2$O—, $CH_3$—S—$CH_2CH_2$—S—$CH_2CH_2$O—, $CH_3$—S—$CH_2CH_2$—O—$CH_2CH_2$O—, $CH_3$—(O—$CH_2CH_2$—)$_2$O—$CH_2CH_2$O—, $CH_3$—(O—$CH_2CH_2$—)$_3$O—$CH_2CH_2$O— or $CH_3$—(O—$CH_2CH_2$—)$_4$O—$CH_2CH_2$—.

Phenyl or naphthyl substituted by $C_1$-$C_4$ alkyl, which preferably contains 1 to 3 alkyl groups, can be, for example, o-, m- or p-methylphenyl 2,3-dimethylphenyl, 2,4-dimethylphenyl, 2,5-dimethylphenyl, 2,6-dimethylphenyl, 3,4dimethylphenyl, 3,5-dimethylphenyl, 2-methyl-6-ethylphenyl, 4tert-butylphenyl, 2-ethylphenyl, 2,6-diethylphenyl, 1-methylnaphthyl, 2-methylnaphthyl, 4-methylnaphthyl, 1,6-dimethylnaphthyl or 4-tert-butylnaphthyl.

$C_{10}$-$C_{12}$ Naphthylalkyl which is unsubstituted or substituted on the naphthyl ring system by $C_1$-$C_4$ alkyl and which may contain 1 to 3 branched or unbranched alkyl group radicals can be, for example, naphthylmethyl, α-methylnaphthylmethyl, α,α-dimethylnaphthylmethyl, naphthyl-ethyl, 2-methyl-1-naphthylmethyl, 3-methyl-1-naphthylmethyl, 4-methyl-1-naphthylmethyl, 2,4-dimethyl-1-naphthylmethyl, 2,6-dimethyl-1-naphthylmethyl or 4-tert-butyl-1-naphthylmethyl.

An unsubstituted or $C_1$-$C_4$ alkyl-substituted $C_5$-$C_{12}$ cycloalkylidene ring which may contain 1 to 3 branched or unbranched alkyl group radicals can be, for example, cyclopentylidene, methylcyclopentylidene, dimethylcyclopentylidene, cyclohexylidene, methylcyclohexylidene, dimethylcyclohexylidene, trimethylcyclohexylidene, tert-butylcyclohexylidene, cycloheptylidene, cyclooctylidene, cyclodecylidene or cyclododecylidene, e.g., cyclohexylidene and tert-butylcyclohexylidene.

Unless otherwise noted, a "halogen," as used herein, refers to chlorine, bromine or iodine, for example, chlorine.

Unless otherwise noted, a "haloalkyl having up to 25 carbon atoms," as used herein, refers to a branched or unbranched radical such as, for example, chloromethyl, chloroethyl, chloropropyl, chlorobutyl or 3-chloro-1-butyl.

Unless otherwise noted, an "alkylthio having up to 18 carbon atoms," as used herein, refers to a branched or unbranched radical such as, for example, methylthio, ethylthio, propylthio, isopropylthio, n-butylthio, isobutylthio, pentylthio, isopentylthio, hexylthio, heptylthio, octylthio, decylthio, tetradecylthio, hexadecylthio or octadecylthio.

$C_1$-$C_4$ Alkyl-substituted phenoxy or naphthoxy, which preferably contains 1 to 3 alkyl groups, can be for example o-, m- or p-methylphenoxy, 2,3-dimethylphenoxy, 2,4dimethylphenoxy, 2,5-dimethylphenoxy, 2,6-dimethylphenoxy, 3,4dimethylphenoxy, 3,5-dimethylphenoxy, 2-methyl-6-ethylphenoxy, 4-tert-butylphenoxy, 2-ethylphenoxy, 2,6-diethylphenoxy, 1-methylnaphthoxy, 2-methylnaphthoxy, 4-methylnaphthoxy, 1,6-dimethylnaphthoxy or 4-tert-butylnaphthoxy.

$C_7$-$C_9$ Phenylalkoxy which is unsubstituted or substituted on the phenyl ring by $C_1$-$C_4$ alkyl, and may contain 1 to 3 branched or unbranched allyl group radicals, can be for example benzyloxy, 2-phenylethoxy, 2-methylbenzyloxy, 3-methylbenzyloxy, 4-methylbenzyloxy, 2,4-di methylbenzyloxy, 2,6-dimethylbenzyloxy or 4-tert-butylbenzyloxy. Benzyloxy is preferred.

$C_{10}$-$C_{12}$ Naphthylalkoxy which is unsubstituted or substituted on the naphthyl ring system by $C_1$-$C_4$ alkyl, and preferably contains 1 to 3 branched or unbranched alkyl group radicals, can be for example naphthylmethoxy, naphthylethoxy, 2-methyl-1-naphthylmethoxy, 3-methyl-1-naphthylmethoxy, 4-methyl-1-naphthylmethoxy, 2,4-dimethyl-1-naphthylmethoxy, 2,6-dimethyl-1-naphthylmethoxy or 4-tert-butyl-1-naphthylmethoxy.

Unless otherwise noted, a "$C_1$-$C_{18}$ alkylene," as used herein, refers to a branched or unbranched radical such as, for example, methylene, ethylene, propylene, tetramethylene, pentamethylene, hexamethylene, heptamethylene, octamethylene, decamethylene, dodecamethylene or octadecamethylene.

Unless otherwise noted, a "$C_2$-$C_{18}$ alkylene which is interrupted by oxygen or sulfur," as used herein, refers to a $C_2$-$C_{18}$ alkylene which can be interrupted one or more times, for example —CH$_2$—O—CH$_2$—, —CH$_2$—S—CH$_2$—, —CH$_2$—NH—CH$_2$—, —CH$_2$—O—CH$_2$CH$_2$—O—CH$_2$—, —CH$_2$—(O—CH$_2$CH$_2$—)$_2$O—CH$_2$—, —CH$_2$—(O—CH$_2$CH$_2$—)$_3$O—CH$_2$—, —CH$_2$—(O—CH$_2$CH$_2$—)$_4$O—CH$_2$— or —CH$_2$CH$_2$—S—CH$_2$CH$_2$—.

Unless otherwise noted, a "$C_4$-$C_{18}$ alkylene interrupted by oxygen, sulfur, or an optionally alkyl-substituted nitrogen," as used herein, refers to a $C_4$-$C_{18}$ alkylene, which can be interrupted one or more times, for example —CH$_2$CH$_2$—NH—CH$_2$CH$_2$—, —CH$_2$CH$_2$—N(CH$_3$)-$_{CH2}$CH$_2$—, —CH$_2$CH$_2$—NH—CH$_2$CH$_2$CH$_2$—, —CH$_2$CH$_2$—S—CH$_2$CH$_2$—, —CH$_2$CH$_2$—O—CH$_2$CH$_2$—O—CH$_2$CH$_2$—, —CH$_2$CH$_2$NH—CH$_2$CH$_2$—NH—CH$_2$CH$_2$CH$_2$—, —CH$_2$CH$_2$—(O—CH$_2$CH$_2$—)$_2$O—CH$_2$CH$_2$—, —CH$_2$CH$_2$—(O—CH$_2$CH$_2$—)$_3$O—CH$_2$CH$_2$— or —CH$_2$CH$_2$—(O—CH$_2$CH$_2$—)$_4$O—CH$_2$CH$_2$—.

$C_2$-$C_{18}$ alkenylene can be, for example vinylene, methylvinylene, octenylethylene or dodecenylethylene. $C_2$-$C_{12}$ Alkenylene is preferred, especially $C_2$-$C_8$ alkenylene. $C_2$-$C_{18}$ alkenylene can be for example—2-propynylene, 2-butynylene, 2-pentynylene, 2-hexynylene, 3-hexynylene, 3-heptynylene, 2-decynylene, 4-decynylene or 8-Alkylidene having 2 to 20 carbon atoms can be for example ethylidene, propylidene, butylidene, pentylidene, 4-methylpentylidene, heptylidene, nonylidene, tridecylidene, nonadecylidene, 1-methylethylidene, 1-ethylpropylidene or 1-ethylpentylidene.

Phenylallidene having 7 to 20 carbon atoms can be for example benzylidene, 2-phenylethylidene or 1-phenyl-2-hexylidene.

Unless otherwise indicated, a "$C_5$-$C_9$ cycloalkylene," as used herein, refers to a saturated hydrocarbon group having two free valences and at least one ring unit and can be, for example, cyclopentylene, cyclohexylene, cycloheptylene or cyclooctylene. Cyclohexylene is preferred.

An Unsubstituted or $C_1$-$C_4$ alkyl-substituted phenylene or naphthylene can be, for example, 1,2-, 1,3-, or 1,4-phenylene; or 1,2-, 1,3-, 1,4-, 1,6-, 1,7-, 2,6-, or 2,7-naphthylene, e.g., phenylene.

In certain embodiments, the metal amidine complexes described herein are prepared by heating 1 mole of metal carboxylate with 4 moles of amidine in methanol. The mixture is held at about 50° C. for about 2 hours or until it becomes a clear solution. The clear solution is filtered and dried. In some embodiments, the dried catalyst is then optionally blended with fumed silica. A suitable fumed silica is SIPERNAT 50S from Degussa Corporation.

A variety of main chain skeleton are useful in the organic polymer(s) used in the present disclosure, which have an active silicon group.

Specific examples thereof include polyoxyalkylene polymers such as polyoxyethylene, polyoxypropylene, polyoxybutylene, polyoxytetramethylene, polyoxyethylene-polyoxypropylene copolymer, polyoxypropylene-polyoxybutylene copolymer and the like; hydrocarbon polymers such as ethylene-propylene copolymer, polyisobutylene, copolymer made from isobutylene and isoprene or the like, polychloroprene, polyisoprene, copolymer made from isoprene or butadiene, acrylonitrile, and/or styrene or the like, polybutadiene, copolymer made from isoprene or butadiene, acrylonitrile, and styrene or the like, hydrogenated polyolefin polymers obtained by hydrogenating these polyolefin polymers, and other hydrocarbon polymers; polyester polymers each obtained by condensing a dibasic acid such as adipic acid and glycol, or by ring-opening-polymerizing a lactone; (meth)acrylic acid ester polymers each obtained by radical-polymerizing ethyl (meth)acrylate, butyl (meth)acrylate, or some other monomer; vinyl polymers each obtained by radical-polymerizing a (meth)acrylic acid ester monomer, vinyl acetate, acrylonitrile, styrene or some other monomer; graft polymers each obtained by polymerizing the vinyl monomer in any one of the above-mentioned organic polymers; polysulfide polymers; polyamide 6 obtained by ring-opening-polymerizing ε-caprolactam, polyamide 6,6 obtained by polycondensing hexamethylenediamine and adipic acid, polyamide 6,10 obtained by polycondensing hexamethylenediamine and sebacic acid, polyamide 11 obtained by polycondensing ε-aminoundecanoic acid, polyamide 12 obtained by ring-opening-polymerizing ε-aminolaurolactam, copolymer polyamides each having two or more components out of the above-mentioned polyamides, and other polyamide polymers; a polycarbonate polymer produced by polycondensing bisphenol A and carbonyl chloride; diallyl phthalate polymers; and other organic polymers. More preferred are saturated hydrocarbon polymers such as polyisobutylene, hydrogenated polyisoprene and hydrogenated polybutadiene, the polyoxyalkylene polymers, and the (meth) acrylic acid ester polymers since they have a relatively low glass transition temperature and give a cured product excellent in cold resistance.

The glass transition temperature of the polymer(s) of the component (A) is not particularly limited, and is generally 20° C. or lower, e.g., 0° C. or lower, e.g., −20° C. or lower. If the glass transition temperature is higher than 20° C., the viscosity becomes high in winter or in cold districts so that the workability may deteriorate. Moreover, the flexibility of the cured product falls so that the elongation may lower. The glass transition temperature can be obtained by DSC measurement.

The polyoxyalkylene polymers and (meth) acrylic acid ester polymers are particularly preferred since they have high moisture permeability and can give a one-part type composition excellent in depth curability and adhesiveness. The polyoxyalkylene polymers are most preferred.

The reactive silicon group contained in the reactive-silicon-group-containing organic polymer(s) is a group which has a hydroxyl group or hydrolyzable group bonded to a silicon atom and which can form a siloxane bond by reaction accelerated by a silanol condensing catalyst so as to be crosslinked. The reactive silicon group may be a group represented by the following general formula (2):

　　　(2)

wherein $R^1$ and $R^3$ each independently represent a substituted or unsubstituted hydrocarbon group having 1 to 20 carbon atoms, or a triorganosiloxy group represented by $(R)_3SiO—$ wherein R's are each independently a substituted or unsubstituted hydrocarbon group having 1 to 20 carbon atoms, R's, the number of which is three, may be the same or different), Xs each independently represent a hydroxyl or a hydrolyzable group, a is 0, 1 or 2, b is 0, 1, 2 or 3 provided that a and b are not both 0 and m is 0 or an integer of 1 to 19.

The hydrolyzable group is not particularly limited, and may be a hydrolyzable group known in the prior art. Specific examples thereof include a hydrogen atom, halogen atoms, and alkoxy, acyloxy, ketoximate, amino, amide, acidamide, aminooxy, mercapto, alkenyloxy groups and the like, for example, alkoxy, acyloxy, ketoxymate, amino, amide, aminooxy, mercapto and alkenyloxy groups, and in many embodiments alkoxy groups as the groups have mild hydrolyzability and good handleability.

One to three hydrolyzable groups or hydroxyl groups which are each the same as described above can be bonded onto the single silicon atom. The value of (a+b) is preferably from 1 to 5. When the hydrolyzable groups or hydroxyl groups the number of which is two or more are bonded into the reactive silicon group, they may be the same or different.

One or more silicon atoms are contained in the reactive silicon group in order to form the group. The number of the silicon atoms is preferably 20 or less in the case of silicon atoms linked to each other through one or more siloxane bonds or the like.

In particular, a reactive silicon group represented by the following general formula (3) is preferred since the group is easily available:

　　　(3)

(wherein $R^3$ and X have the same meanings as described above, and c is 1, 2, or 3).

Specific examples of $R^1$ and $R^2$ include alkyl groups such as a methyl, ethyl group and the like; cycloalkyl groups such as a cyclohexyl group and the like; aryl groups such as a phenyl group and the like; aralkyl groups such as a benzyl group and the like; and triorganosiloxy groups represented by $(R)_3SiO—$ wherein R's are each a methyl, phenyl group, or the like. Among them, a methyl and ethyl groups are particularly preferred.

More specific examples of the reactive silicon group include trimethoxysilyl, triethoxysilyl, triisopropoxysilyl, dimethoxymethylsilyl, diethoxymethylsilyl, and diisopropoxymethylsilyl groups. More preferred are the trimethoxysilyl, triethoxysilyl and dimethoxymethylsilyl group, and particularly preferred is the trimethoxysilyl group since they have a high activity to give a good curability. From the viewpoint of storage stability, the dimethoxymethylsilyl group is particularly preferred. The triethoxysilyl group is particularly preferred since ethanol generated during the hydrolysis reaction of the reactive silicon group is more innocuous, than methanol generated from the trimethoxysilyl group.

It is essential that the curable composition of the present disclosure contains an organic polymer having, as the reactive-silicon-containing group in at least one portion thereof, a group represented by the following general formula (1):

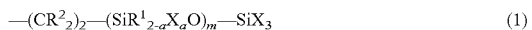　　　(1)

(wherein $R^1$, X, a and m have the same meanings as described above, and $R^2$ are each independently a hydrogen atom, or a substituted or unsubstituted hydrocarbon group having 1 to 10 carbon atoms).

The organic polymer having a reactive silicon group having three hydrolyzable groups on a silicon atom tends to give a curable composition having good restorability, endurance, and creep resistance.

The ratio of the organic polymer(s) having a group represented by the general formula (1) in all of the organic polymer(s) (A) used in the present disclosure will vary, and is preferably 10% or more by weight, more preferably 20% or more by weight in order to yield a curable composition wherein speedy curability and storage stability are satisfied.

The reactive silicon group may be introduced by a known method. Specifically, the following methods can be exemplified:

(A) An organic polymer having in the molecule thereof a functional group such as a hydroxyl group is caused to react with an organic compound having an active group reactive with this functional group and an unsaturated group to yield an organic polymer having the unsaturated group. Alternatively, the polymer is copolymerized with an unsaturated-group-containing epoxy compound, thereby yielding an unsaturated-group-containing polymer. The resultant reaction product is then hydrosilated, using a hydrosilane.

(B) An unsaturated-group-containing organic polymer obtained in the same manner as in the method (A) is caused to react with a compound having a mercapto group and a reactive silicon group.

(C) An organic polymer having in the molecule thereof a functional group such as a hydroxyl group, epoxy group or isocyanate group is caused to react with a compound having a functional group reactive with this functional group and a reactive silicon group.

Out of the above-mentioned methods, the method (A) and the method of causing a polymer having a hydroxyl group at its terminal to react with a compound having an isocyanate group and a reactive silicon group among variations of the method (C) are preferred since a high conversion ratio can be obtained in a relatively short reaction time. The method (A) is particularly preferred since the reactive-silicon-group-containing organic polymer obtained by the method (A) becomes a curable composition having a lower viscosity and a better workability than the organic polymer obtained by the method (C) and the organic polymer obtained by the method (B) generates a strong odor based on mercaptosilane.

Specific examples of the hydrosilane used in the method (A) include halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, and phenyldimethoxysilane; acyloxysilanes such as methyldiacetoxysilane, and phenyldiacetoxysilane; and ketoximatesilane such as bis(dimethylketoximate)methylsilane, bis(cyclohexylketoximate)methylsilane and the like. However, the hydrosilane is not limited thereto. Among them, halogenated silanes, and alkoxysilanes are preferred, and alkoxysilanes are most preferred since they give a curable composition having good storage stability. Out of the alkoxysilanes, methyldimethoxysilane is particularly preferred since it is easily available and a curable composition containing the organic polymer obtained therefrom has high curability, storage stability, elongation property and tensile strength.

Out of the above-mentioned hydrosilanes, a hydrosilane represented by the following general formula (4) is preferred since a curable composition made of the organic polymer obtained by addition reaction of the hydrosilane compound has very good curability:

$$H—SiX_3 \quad (4)$$

(wherein X has the same meaning as described above). Out of hydrosilane compounds represented by the general formula (4), more preferred are trialkoxysilanes such as trimethoxysilane, triethoxysilane, triisopropoxysilane and the like.

Out of the trialkoxysilanes, a trialkoxysilane having an alkoxy group having one carbon atom (a methoxy group), such as trimethoxysilane and the like, may accelerate disproportionation reaction, leading to a dimethoxysilane. From the viewpoint of safe handling, it is preferable to use a trialkoxysilane having an alkoxy group having 2 or more carbon atoms and represented by the following general formula (5):

$$H—Si(OR^4)_3 \quad (5)$$

(wherein $R^4$, are each independently an organic group having 2 to 20 carbon atoms). Triethoxysilane is most preferred from the viewpoint of availability and safe handling.

The synthesis method (B) may be, for example, a method of introducing a compound having a mercapto group and a reactive silicon group into an unsaturated bond moiety of the organic polymer by radical addition reaction in the presence of a radical initiator and/or a radical-generating source. However, the method (B) is not particularly limited. Specific examples of the compound having a mercapto group and a reactive silicon group include γ-mercaptopropyltrimethoxysilane, γ-mercaptopropylmethyldimethoxysilane, γ-mercaptopropyltriethoxysilane, γ-mercaptopropylmethyldiethoxysilane and the like.

Out of variations of the synthesis method (C), the method of causing a polymer having a hydroxyl group at its terminal to react with a compound having an isocyanate group and a reactive silicon group may be, for example, a method disclosed in JP-A-3-47825. However, the method is not particularly limited. Specific examples of the compound having an isocyanate group and a reactive silicon group include γ-isocyanate propyltrimethoxysilane, γ-isocyanate propylmethyldimethoxysilane, γ-isocyanate propyltriethoxysilane, γ-isocyanate propyldiethoxysilane and the like.

The organic polymer(s) having a reactive silicon group may be linear or branched with a number-average molecular weight thereof, from about 500 to 100,000, more preferably from 1,000 to 50,000, in particular preferably from 3,000 to 30,000. If the number-average molecular weight is less than 500, the elongation properties of the cured elastomer is inferior and if the molecular weight is more than 100,000 the cured product has an unacceptably high viscosity.

In order to obtain a rubber-like cured product exhibiting a high strength, a high elongation and a low elasticity, the number of reactive silicon groups contained in the organic polymer or each of the polymers is, on average, at least one, preferably from 1.1 to 5 per molecule of the polymer. If the number of the reactive silicon groups contained per molecule is less than one on average, the cure is insufficient and a good rubber-like elasticity behavior is not easily attained. The reactive silicon groups may be present on a terminal of the main chain of the molecule chain of the organic polymer(s) or a terminal of a side chain thereof, or may be present on both of the terminals. In particular, when the reactive silicon groups are present only on a terminal of the main chain of the molecular chain, a rubber-like cured product exhibiting a high strength, a high elongation and a low elasticity is easily obtained since the effective network length of the organic polymer component(s) contained in the cured product, which is finally formed, becomes long.

The above-mentioned polyoxyalkylene polymers are each a polymer which essentially has a recurring unit represented by the following general formula (6):

$$—R^5—O— \quad (6)$$

(wherein $R^5$ is a linear or branched alkylene group having 1 to 14 carbon atoms). $R^5$ in the general formula (6) is preferably a linear or branched alkylene group having 1 to 14 carbon atoms, preferably 2 to 4 carbon atoms.

The main chain skeleton of the polyoxyalkylene polymer may be made of only one kind of recurring unit, or may be made of two or more kinds of recurring units. In the case that the composition is used, in particular, for a sealant, a material made of a polymer made mainly of a propylene oxide polymer is preferred since the material is amorphous and has a relatively low viscosity.

Examples of the method for synthesizing the polyoxyalkylene polymer include a polymerization method based on an alkali catalyst such as KOH, a polymerization method based on a transition metal compound/porphyrin complex catalyst obtained by reaction between an organic aluminum compound and porphyrin, as described in JP-A-61-215623, a polymerization method based on a composite metal cyanide complex catalyst, as described in JP-B-46-27250, JP-B-59-15336, and U.S. Pat. Nos. 3,278,457, 3,278,458, 3,278,459, 3,427,256, 3,427,334, 3,427,335, and other publications; a polymerization method using a catalyst made of a polyphosphazene salt, as exemplified in JP-A-10-273512; and a polymerization method using a catalyst made of a phosphazene compound, as exemplified in JP-A-11-060722. However, the method is not limited thereto.

Examples of the method for producing the polyoxyalkylene polymer having a reactive silicon group include methods suggested in JP-B-45-36319 and 46-12154, JP-A-50-156599, 54-6096, 55-13767, 55-13468 and 57-164123, JP-B-3-2450, and U.S. Pat. Nos. 3,632,557, 4,345,053, 4,366,307, 4,960,844, and other publications; and polyoxyalkylene polymers having a number-average molecular weight of 6,000 or more and a Mw/Mn of 1.6 or less, which has a high molecular weight and a narrow molecular weight distribution, as suggested in JP-A-61-197631, 61-215622, 61-215623, 61-218632, 3-72527, 3-47825, and 8-231707. However, the method is not particularly limited thereto.

The above-mentioned polyoxyalkylene polymers having a reactive silicon group may be used alone or in combination of two or more thereof.

The saturated hydrocarbon polymers are each a polymer which does not substantially contain any carbon-carbon unsaturated bond other than those in an aromatic ring. The polymer which constitutes the skeleton thereof can be obtained by a method (1) of polymerizing, as a main monomer, an olefin compound having 2 to 6 carbon atoms, such as ethylene, propylene, 1-butene or isobutylene, a method (2) of homo-polymerizing a diene compound such as butadiene or isoprene, or copolymerizing the diene compound and one or more out of the above-mentioned olefin compounds, and then hydrogenating the homopolymer or copolymer, or some other methods. Isobutylene polymers or hydrogenated polybutadiene polymers are preferred since one or more functional groups can easily be introduced into a terminal thereof, the molecular weight thereof is easily controlled and further the number of the terminal functional groups can be made large. The isobutylene polymers are particularly preferred.

The polymer having a main chain skeleton made of a saturated hydrocarbon polymer has a very good characteristic in heat resistance, weather resistance, endurance, and humidity blocking property.

The isobutylene polymers may each be a polymer wherein all of their monomer units are isobutylene units, or a copolymer made from isobutylene units and a different monomer. From the viewpoint of rubber-like characteristics, the recurring units originating from isobutylene are contained preferably in an amount of 50% or more by weight, more preferably in an amount of 80% or more by weight, in particular preferably in an amount of 90 to 99%.

As the method for synthesizing the saturated hydrocarbon polymer, hitherto various polymerization methods have been reported. In recent years, in particular, a large number of, what is called, living polymerizations have been developed. In the case of a saturated hydrocarbon polymer, in particular, an isobutylene polymer, the following are known: the polymer can easily be produced by using iniferter polymerization as disclosed by Kennedy et al. (J. P. Kennedy et al., J. Polymer Sci., Polymer Chem. Ed. 1997, vol. 15, 2843); the polymer can be produced by polymerization, so as to have a molecular weight of about 500 to 100,000 and a molecular weight distribution of 1.5 or less; and various functional groups can be introduced into a terminal of the molecule.

The method for synthesizing the saturated hydrocarbon polymer having a reactive silicon group is described in, for example, JP-B-4-69659 and 7-108928, JP-A-63-254149, 64-22904 and 1-197509, Japanese Patent Official Gazette Nos. 2539445 and 2873395, JP-A-7-53882, and other publications. However, the method is not particularly limited thereto.

The above-mentioned saturated hydrocarbon polymers having a reactive silicon group may be used alone or in combination of two or more thereof.

The (meth)acrylic acid ester monomer which constitutes the main chain of the above-mentioned (meth)acrylic acid ester polymers is not particularly limited, and various monomers can be used. Examples thereof include (meth)acrylic acid based monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, γ-(methacryloyloxypropyl)trimethoxysilane, γ-(methacryloyloxypropyl)dimethoxymethylsilane, an ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(trifluoromethyl)methyl (meth)acrylate, 2-trifluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate and the like. In the (meth)acrylic acid ester polymers, any (meth)acrylic acid ester monomer may be copolymerized with a vinyl monomer, which will be described hereinafter. Examples of the vinyl monomer include styrene monomers such as styrene, vinyltoluene, α-methylstyrene, chlorostyrene, styrenesulfonic acid and salts thereof, and the like; fluorine-containing vinyl monomers such as perfluoroethylene, perfluoropropylene, fluorinated vinylidene and the like; silicon-containing vinyl monomers such as vinyltrimethoxysilane, vinyltriethoxysilane and the like; maleic anhydride, maleic acid, and monoalkyl esters and dialkyl esters of maleic acid; fumaric acid, monoalkyl ester and dialkyl ester of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide and the like; nitrile-group-containing vinyl monomers such as acrylonitrile, methacrylonitrile and the like; amide-group-containing vinyl monomers such as acrylamide, methacrylamide and the like; vinyl esters such as vinyl acetate, vinyl propionate, vinyl pivalate, vinyl benzoate, vinyl cinnamate and the like; alkenes such as ethylene, propylene and the like; conjugated dienes such as butadiene, isoprene and the like; and vinyl chloride, vinylidene chloride, allyl chloride, allyl alcohol and the like. These may be used alone, or plural ones thereof may be copolymerized. Among them, a polymer made from a styrene monomer and a (meth)acrylic acid based monomer is preferred from the viewpoint of physical properties of the product, and others. More preferred is a (meth)acrylic polymer made from an acrylic acid ester monomer and a methacrylic acid ester monomer. Particularly preferred is an acrylic polymer made from an acrylic acid ester monomer. In articles for ordinary buildings, a butyl acrylate based monomer is further preferred since the composition is required to have a low viscosity and the cured product is required to have a low modulus, a high elongation, weather resistance, heat resistance and other physical properties. On the other hand, in articles required to have oil resistance and others, for cars, a copolymer made mainly of ethyl acrylate is further preferred. This polymer made mainly of ethyl acrylate is excellent in oil resistance, but tends to be somewhat poor in low-temperature property (cold resistance); therefore, in order to improve the low-temperature property, ethyl acrylate is partially substituted with butyl acrylate. However, a good oil resistance is gradually damaged with an increase in the ratio of butyl acrylate. In articles required to have oil resistance, the ratio is preferably 40% or less, more preferably 30% or less. It is also preferred to use 2-methoxyethyl acrylate or 2-ethoxyethyl acrylate, wherein oxygen is introduced into an alkyl group of a side chain, in order to improve the low-temperature property and others without damaging the oil resistance. However, when the alkoxy group, which has an ether bond, is introduced to the side chain, a poor heat resistance tends to be exhibited; thus, when heat resistance is required, the ratio thereof is preferably 40% or less. The ratio is varied, considering oil resistance, heat resistance, low-temperature property and other physical properties necessary in accordance with usages or a requested purpose. In this way, an appropriate polymer can be obtained. An unrestricted example excellent in physical balances between oil resistance, heat resistance, low-temperature property and others is a copolymer of ethyl acrylate/butyl acrylate/2-methoxyethyl acrylate (ratio by weight: 40 to 50/20 to 30/30 to 20). In the present disclosure, a monomer out of these preferred monomers may be copolymerized with a different monomer, or may be block-copolymerized therewith. At this time, the preferred monomer is contained preferably at a ratio by weight of 40% or more. In the above-mentioned expressions, for example, (meth)acrylic acid represents acrylic acid and/or methacrylic acid.

The method for synthesizing such a (meth)acrylic acid ester polymer is not particularly limited, and may be a known method. However, the polymer obtained by an ordinary free-radical polymerization method using an azo compound, a peroxide or the like as a polymerization initiator has a problem that the value of the molecular weight distribution is generally as large as 2 or more, and the viscosity becomes high. Accordingly, it is preferred to use a living radical polymerization method in order to yield a (meth)acrylic acid ester polymer having a narrow molecular weight distribution and a low viscosity and containing, at a terminal of the molecule chain thereof, a crosslinkable functional group at a high content by percentage.

Out of variations of the "living radical polymerization method", the "atom transfer radical polymerization method" of polymerizing the (meth)acrylic acid ester monomer, using an organic halide, halogenated sulfonyl compounds or the like as an initiator and a transition metal complex as a catalyst, is more preferred as a method for producing a (meth)acrylic acid ester polymer having a specific functional group since the terminal has a halogen or the like, which is relatively advantageous for functional-group-converting reaction, and the flexibility in design of the initiator or the catalyst is large as well as the characteristics of the above-mentioned "living polymerization method" are exhibited. This atom transfer radical polymerization method is described in, for example, Matyjaszewski et al., J. Am. Chem. Soc., 1995, vol. 117, 5614.

As the method for producing the (meth)acrylic acid ester polymer having a reactive silicon group, a production process using a free radical polymerization method using a chain transfer agent is disclosed in, for example, JP-B-3-14068 and 4-55444, and JP-A-6-211922. JP-A-9-272714 and others disclose a production process using an atom transfer radical polymerization method. However, the method is not particularly limited thereto.

The above-mentioned (meth)acrylic acid ester polymers having a reactive silicon group may be used alone or in combination of two or more thereof.

These organic polymers having reactive silicon group may be used alone or in combination of two or more thereof. Specifically, it is allowable to use an organic polymer obtained by blending two or more selected from the group consisting of the polyoxyalkylene polymers having a reactive silicon group, the saturated hydrocarbon polymers having a reactive silicon group, and the (meth)acrylic acid ester polymers having a reactive silicon group.

The method for producing an organic polymer wherein a polyoxyalkylene polymer having a reactive silicon group is blended with a (meth)acrylic acid ester polymer having a reactive silicon group is suggested in JP-A-59-122541, 63-112642, 6-172631 and 11-116763, and other publications. However, the method is not particularly limited thereto. A preferred specific example thereof is a method of blending a polyoxyalkylene polymer having a reactive silicon group with a copolymer which has a reactive silicon group and has a molecular chain composed substantially of (meth)acrylic acid ester monomer units each having 1 to 8 carbon atoms and represented by the following general formula (7)

$$-CH_2-C(R^6)(COOR^7) \qquad (7)$$

(wherein $R^6$ represents a hydrogen atom or a methyl group, and $R^7$ represents an alkyl group having 1 to 8 carbon atoms), and (meth) acrylic acid ester monomer units each having an alkyl group having 10 or more carbon atoms and represented by the following general formula (8)

$$-CH_2-C(R^6)(COOR^8) \qquad (8)$$

(wherein $R^6$ has the same meaning as described above, and $R^8$ represents an alkyl group having 10 or more carbon atoms).

Examples of $R^7$ in the general formula (7) include alkyl groups having 1 to 8 carbon atoms, preferably 1 to 4 carbon atoms, more preferably 1 to 2 carbon atoms, such as a methyl, ethyl, propyl, n-butyl, t-butyl, and 2-ethylhexyl group. The alkyl groups as $R^7$ may be used alone or in the form of a mixture of two or more thereof.

Examples of $R^8$ in the general formula (8) include long-chain alkyl groups having 10 or more carbon atoms, usually 10 to 30 carbon atoms, preferably 10 to 20 carbon atoms, such as lauryl, tridecyl, cetyl, stearyl, and behenyl groups. The alkyl groups as R.sup.8 may be used alone or in the form of a mixture of two or more thereof in the same manner as $R^7$.

The molecular chain of the (meth)acrylic acid ester copolymer is composed substantially of the monomer units of the formula (7) and (8). The word "substantially" referred to herein means that the total amount of the monomer units of the formula (6) and (8) present in the copolymer is over 50% by weight. The total amount of the monomer units of the formula (7) and (8) is preferably 70% or more by weight.

The presence ratio by weight of the monomer units of the formula (7) to the monomer units of the formula (8) is preferably from 95/5 to 40/60, more preferably from 90/10 to 60/40.

Examples of a monomer unit which is different from the monomer units of the formula (7) and (8) and may be contained in the copolymer include acrylic acids such as acrylic acid, methacrylic acid and the like; monomers containing an amide group, such as N-methylolacrylamide, N-methylolmethacrylamide and the like, those containing an epoxy group, such as glycidyl acrylate, glycidyl methacrylate and the like, and those containing a nitrogen-containing group, such as diethylaminoethyl acrylate, diethylaminoethyl methacrylate and the like; and other monomer units originating from acrylonitrile, styrene, α-methylstyrene, alkyl vinyl ether, vinyl chloride, vinyl acetate, vinyl propionate, ethylene, or the like.

An organic polymer wherein a saturated hydrocarbon polymer having a reactive silicon group is blended with a (meth)acrylic acid ester copolymer having a reactive silicon group is suggested in JP-A-1-168764 and 2000-186176, and other publications. However, the polymer is not limited thereto.

A different example of the method for producing an organic polymer containing, as a blend component, a (meth) acrylic acid ester copolymer having a reactive silicon functional group is a method of polymerizing a (meth)acrylic acid ester monomer in the presence of an organic polymer having a reactive silicon group. This production method is specifically disclosed in JP-A-59-78223, 59-168014, 60-228516 and 60-228517, and other publications. However, the method is not limited thereto.

On the other hand, the main chain skeleton of the organic polymer(s) may contain a different component such as a urethane bond component as long as the advantageous effects of the present disclosure are not largely damaged.

The urethane bond component is not particularly limited, and an example thereof is a group generated by reaction between an isocyanate group and an active hydrogen group (and the group may be referred to as an amide segment hereinafter).

The amide segment is represented by the following general formula (9):

$$-NR^9-C(=O)- \qquad (9)$$

(wherein $R^9$ represents a hydrogen atom or a substituted or unsubstituted organic group).

Specific examples of the amide segment include a urethane group generated by reaction between an isocyanate group and a hydroxyl group; a urea group generated by reaction between an isocyanate group and an amino group; and a thiourethane group generated by reaction between an isocyanate group and a mercapto group, and the group. In the present disclosure, groups generated by causing the active hydrogen occurring in the urethane group, the urea group and the thiourethane group to react further with an isocyanate group are also contained in the category of the group of the formula (9).

An example of the method for producing a polymer having an amide segment and a reactive silicon group with industrial ease is a method of causing a polymer having an active-hydrogen-containing group as its terminal to react with an excessive amount of a polyisocyanate compound to prepare a polymer having an isocyanate group at its polyurethane main chain terminal, and subsequently or simultaneously causing a part or the whole of individuals of the isocyanate group to react with a Z group of a silicon compound represented by the following general formula (10)

$$Z-R^{10}-SiR^3{}_{3-c}X_c \qquad (10)$$

(wherein $R^3$, X and c have the same meanings as described above, and $R^{10}$ is a bivalent organic group, more preferably a substituted or unsubstituted bivalent hydrocarbon group having 1 to 20 carbon atoms; and Z is an active-hydrogen-containing group selected from hydroxyl, carboxyl, mercapto, and mono-substituted or unsubstituted amino groups), thereby producing the polymer. Examples of known organic polymer-producing methods related to this production method include methods disclosed in JP-B-46-12154 (U.S. Pat. No. 3,632,557), JP-A-58-109529 (U.S. Pat. No. 4,374,237), JP-A-62-13430 (U.S. Pat. No. 4,645,816), JP-A-8-53528 (EP 0676403), JP-A-10-204144 (EP 0831108), JP-A-2003-508561 as Japanese Patent Application National Publication (U.S. Pat. No. 6,197,912), JP-A-6-211879 (U.S. Pat. No. 5,364,955), JP-A-10-53637 (U.S. Pat. No. 5,756,751), JP-A-11-100427, 2000-169544, 2000-169545 and 2002-212415, Japanese Patent No. 3313360, U.S. Pat. Nos. 4,067,844 and 3,711,445, and JP-A-2001-323040, and other publications.

Another example of the above-mentioned method is a method of reacting a polymer having an active-hydrogen-containing group at its terminal with a reactive-silicon-group-containing isocyanate compound represented by the following general formula (11):

$$O=C=N-R^{10}-SiR^3{}_{3-c}X_c \qquad (11)$$

(wherein $R^3$, $R^{10}$, X and c have the same meanings as described above), thereby producing the polymer. Examples of known polymer-producing methods related to this production method include methods disclosed in JP-A-11-279249 (U.S. Pat. No. 5,990,257), JP-A-2000-119365 (U.S. Pat. No. 6,046,270), JP-A-58-29818 (U.S. Pat. No. 4,345,053), JP-A-3-47825 (U.S. Pat. No. 5,068,304), JP-A-11-60724, 2002-155145 and 2002-249538, WO 03/018658, WO 03/059981 and other publications.

Examples of the organic polymer have an active-hydrogen-containing group at its terminal include oxyalkylene polymer having a hydroxyl group at its terminal (polyetherpolyol), polyacrylpolyol, polyesterpolyol, saturated hydrocarbon polymer having a hydroxyl group at its terminal (polyolefinpolyol), polythiol compounds, polyamine compounds, polyalkyleneimine and the like. Among them, polyesterpolyol, polyetherpolyol, polyacrylpolyol and polyolefinpolyol are preferred since the resultant polymer has a relatively high glass transition temperature and the resultant cured product has very good cold resistance. The polyetherpolyol is particularly preferred since the resultant polymer has a low viscosity to exhibit a good workability and the depth curability thereof is good. The polyacrylpolyol and the saturated hydrocarbon polymers are more preferred since the cured product of the resultant polymer has good weather resistance and heat resistance.

As the polyetherpolyol, polyetherpolyol that is produced by any method can be used. Preferred is polyetherpolyol having, at its terminal, a hydroxyl group the number of individuals of which is at least 0.7 per molecular terminal on the average of all the molecules. Specific examples thereof include oxyalkylene polymer produced by use of a conventional alkali metal catalyst; and oxyalkylene polymer produced by causing an initiator such as a polyhydroxy compound, which has at least two hydroxyl groups, to react with an alkylene oxide in the presence of a composite metal cyanide complex or cesium.

Out of the above-mentioned polymerization methods, the polymerization method using a composite metal cyanide complex is preferred since the method makes it possible to yield oxyalkylene polymer having a lower unsaturated

degree, a narrow Mw/Mn, a lower viscosity, a high acid resistance and a high weather resistance.

The polyacrylpolyol may be a polyol having a skeleton of an alkyl (meth)acrylate (co)polymer and having in the molecule thereof a hydroxyl group. The method for synthesizing the polymer is preferably a living polymerization method since a polymer having a narrow molecular weight distribution and a low viscosity can be obtained. An atom transfer radical polymerization method is more preferred. It is also preferred to use a polymer based on the so-called SGO process, which is obtained by subjecting an alkyl acrylate ester monomer described in JP-A-2001-207157 to continuous bulk polymerization at high temperature and high pressure. A specific example thereof is "UH-2000" manufactured by Toagosei Co., Ltd.

Specific examples of the above-mentioned polyisocyanate compound include aromatic polyisocyanates such as toluene (tolylene)diisocyanate, diphenylmethane diisocyanate, xylylene diisocyanate and the like; and aliphatic polyisocyanates such as isophoronediisocyanate, and hexamethylenediisocyanate and the like.

The silicon compound of the general formula (10) is not particularly limited, and specific examples thereof include amino-group-containing silanes such as γ-aminopropyltrimethoxysilane, N-(β-aminoethyl)-γ-aminopropyltrimethoxysilane, γ-(N-phenyl)aminopropyltrimethoxysilane, N-ethylaminoisobutyltrimethoxysilane and the like; hydroxy-group-containing silanes such as γ-hydroxypropyltrimethoxysilane and the like; and mercapto-group-containing silanes such as γ-mercaptopropyltrimethoxysilane and the like, and the like. As described in JP-A-6-211879 (U.S. Pat. No. 5,364,955), JP-A-10-53637 (U.S. Pat. No. 5,756,751), JP-A-10-204144 (EP 0831108), and JP-A-2000-169544 and 2000-169545, the following can also be used as the silicon compound of the general formula (10): Michael addition reactants made from a variety of α,β-unsaturated carbonyl compounds and an amino-group-containing silane; and Michael addition reactants made from a variety of (meth)acryloyl-group-containing silanes and an amino-group-containing compound.

The reactive-silicon-group-containing isocyanate compound of the general formula (11) is not particularly limited, and specific examples thereof include γ-trimethoxysilylpropyl isocyanate, γ-triethoxysilylpropylisocyanate, γ-methyldimethoxysilylpropylisocyanate, γ-methyldiethoxysilylpropylisocyanate and the like. As described in JP-A-2000-119365 (U.S. Pat. No. 6,046,270), a compound obtained by causing a silicon compound of the general formula (10) to react with an excessive amount of the above-mentioned polyisocyanate compound can also be used as the reactive-silicon-group-containing isocyanate compound of the general formula (11).

When the amount of the amide segment in the main chain skeleton of the organic polymer(s) which is/are the component (A) in the present disclosure is large, the viscosity of the organic polymer tends to be high. After the storage of the polymer(s), the viscosity may also rise so that the workability of the resultant composition may lower. Accordingly, in order to obtain a composition having very good storage stability and workability, it is preferred that the amide segment is not substantially contained therein. On the other hand, the amide segment in the main chain skeleton of the component (A) tends to cause an improvement in the curability of the composition of the present disclosure. Accordingly, when the main chain skeleton of the component(s) (A) contains an amide segment, the number of individuals of the amide segment is preferably from 1 to 10, more preferably from 1.5 to 5, in particular preferably from 2 to 3 per molecule on the average. If the number is less than 1, the curability may be sufficient. If the number is more than 10, the organic polymer becomes highly viscous so that a composition poor in workability may be obtained.

A filler can be added to the composition of the present disclosure. Examples of the filler include reinforcing fillers such as fume silica, precipitating silica, crystalline silica, fused silica, dolomite, silicic anhydride, hydrated silicic acid, and carbon black and the like; ground calcium carbonate, colloidal calcium carbonate, magnesium carbonate, diatomaceous earth, calcined clay, clay, talc, titanium oxide, bentonite, organic bentonite, ferric oxide, aluminum fine powder, flint powder, zinc oxide, active zinc white, shirasu balloon, glass micro-balloon, organic micro-balloon made of phenol resin or vinylidene chloride resin, PVC powder, PMMA powder, and other resin powders; and fibrous fillers such as asbestos, glass fiber, and filament and the like. When the filler is used, the use amount thereof is from 1 to 250 parts by weight, preferably from 10 to 200 parts by weight for 100 of the polymer(s) of the component(s) (A).

As described in JP-A-2001-181532, the filler can be dehydrated and dried in advance by mixing the filler with a dehydrating agent such as calcium oxide and the like into a homogeneous form, putting the mixture air-tightly into a bag made of an airtight material, and then allowing the bag to stand still for an appropriate time. By use of this filler, which has a low water content, the storage stability of the composition can be improved, in particular, when the composition is rendered a one-part type composition.

When a composition with a high transparency is desired, one can use a polymer powder made of a polymer such as methyl methacrylate and the like, amorphous silica, or the like, as described in JP-A-11-302527. Moreover, a composition having a high transparency can be obtained by using, as a filler, hydrophobic silica, which silicon dioxide fine powder is having a surface to which hydrophobic groups are bonded, as described in JP-A-2000-38560. The surface of the silicon dioxide fine powder generally has silanol groups (—SiOH), and the silanol groups are caused to react with an organic silicon halide, an alcohol or the like, thereby producing (—SiO-hydrophobic group). The resultant product is hydrophobic silica. Specifically, dimethylsiloxane, hexamethyldisilazane, dimethyldichlorosilane, trimethoxyoctylsilane, trimethylsilane or the like reacts with and is bonded to the silanol groups present in the surface of the silicon dioxide fine powder. The resultant is hydrophobic silica. Silicon dioxide fine powder having a surface made of silanol groups (—SiOH) is called hydrophilic silica fine powder.

When a cured product with high strength is desired to use of a filler selected from fume silica, precipitating silica, crystalline silica, fused silica, dolomite, silicic anhydride, hydrated silicic acid, carbon black, surface-treated fine calcium carbonate, calcined clay, clay, active zinc white, and others can be used in an amount of 1 to 200 parts by weight for 100 parts by weight of the organic polymer(s) (A) having a reactive silicon group. When a cured product having a low strength and a large elongation at break is desired a filler selected from titanium oxide, a calcium carbonate species such as ground calcium carbonate, magnesium carbonate, talc, ferric oxide, zinc oxide, shirasu balloon, and others can used in an amount of 5 to 200 parts by weight for 100 parts by weight of the polymer(s) (A) having a reactive silicon group. As the value of the specific surface area of calcium carbonate is larger, the effect of improving the rupture strength, the elongation at break and the adhesiveness of the cured product becomes larger. Of course, these fillers may be used alone or in the form of a mixture of two or more thereof. When calcium carbonate is used, it is desired to use surface-treated fine calcium carbonate, and a calcium carbonate species having a large particle diameter, such as ground calcium carbonate and the like, together. The particle diameter of the surface-treated fine calcium carbonate is preferably 0.5 μm or less, and the surface treatment is preferably treatment with a fatty acid or a fatty acid salt. Moreover, the particle diameter of the calcium carbonate species having a large particle diameter is preferably 1 μm or more, and the species not subjected to any surface treatment can be used.

The composition of the present disclosure can be preferably used for: a joint of outer walls of a building, such as siding boards, in particular, ceramic siding boards and others; an adhesive agent for outer wall tiles; an adhesive agent, for outer wall tiles, that may remain as it is in the joint of the walls; or the like since the cured product therefrom has good chemical resistance and other properties. It is desired that the design of outer walls is in harmony with the design of the sealant. The composition is used for high-quality outer walls when sputtering paint is used together or colored aggregate is incorporated into the composition.

A tackifier may be added to the composition of the present disclosure. The tackifier of resin (tackifying resin) is not particularly limited, and may be a resin that is usually used whether the resin is in a solid form or in a liquid form at normal temperature. Specific examples thereof include styrene based block copolymer, a hydrogenated product thereof, phenol resin, modified phenol resins (such as cashew oil modified phenol resin, tall oil modified phenol resin and the like), terpene-phenol resin, xylene-phenol resin, cyclopentadiene-phenol resin, coumalin-indene resin, rosin resin, rosin ester resin, hydrogenated rosin ester resin, xylene resin, low molecular weight polystyrene resin, styrene copolymer resin, petroleum resins (such as $C_5$ hydrocarbon resin, $C_9$ hydrocarbon resin, $C_5$-$C_9$ hydrocarbon copolymer resin and the like), hydrogenated petroleum resins, terpene resin, and DCPD resin petroleum resin and the like. These may be used alone or in combination of two or more thereof. Examples of the styrene block copolymer and the hydrogenated product thereof include styrene-butadiene-styrene block copolymer (SBS), styrene-isoprene-styrene block copolymer (SIS), styrene-ethylenebutylene-styrene block copolymer (SEBS), styrene-ethylenepropylene-styrene block copolymer (SEPS), styrene-isobutylene-styrene copolymer (SIBS) and the like. These tackifying resins may be used alone or in combination of two or more thereof.

The tackifying resin is used in an amount of 5 to 1,000 parts by weight, preferably from 10 to 100 parts by weight for 100 parts by weight of the organic polymer(s) (A).

A solvent or a diluting agent can be added to the composition of the present disclosure. The solvent and the diluting agent are not particularly limited, and the following can be used: aliphatic hydrocarbons, aromatic hydrocarbons, alicyclic hydrocarbons, halogenated hydrocarbons, alcohols, esters, ketones, ethers and others. When the solvent or the diluting agent is used, the boiling point of the solvent is preferably 150° C. or higher, more preferably 200° C. or higher, in particular preferably 250° C. or higher in light of a problem of air pollution when the composition is used indoors. The above-mentioned solvents or diluting agents may be used alone or in combination of two or more thereof.

Moreover, a silicate can be used in the composition of the present disclosure. This silicate acts as a crosslinking agent, and has a function of improving the restorability, the endurance and the creep resistance of the polymer(s) of the component (A) in the present disclosure. Furthermore, the silicate also has a function of improving the adhesiveness, the water-resistant adhesiveness, and the adhesion endurance under high temperature and high humidity. As the silicate, tetraalkoxysilane or a partially-hydrolyzed condensation product thereof can be used. In the case of using the silicate, the use amount thereof is preferably from 0.1 to 20 parts by weight, more preferably from 0.5 to 10 parts by weight for 100 parts by weight of the polymer(s) of the component (A).

Specific examples of the silicate include tetraalkoxysilanes (tetraalkylsilicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane, tetra-t-butoxysilane and the like; and partially-hydrolyzed condensation products thereof.

The partially-hydrolyzed condensation products of tetraalkoxysilanes are more preferred since their effects of improving the restorability, the endurance and the creep resistance to a greater extent than tetraalkoxysilanes.

Examples of the partially-hydrolyzed condensation products of tetraalkoxysilanes include products each obtained by adding water to a tetraalkoxysilane in a usual way, and then hydrolyzing the resultant partially so as to be condensed. Furthermore, as partially-hydrolyzed condensation products of organosilicate compounds, commercially available products can be used. Examples of the condensation products include Methyl Silicate 51 and Ethyl Silicate 40 (each manufactured by Colcoat Co., Ltd.).

A plasticizer can be added to the composition of the present disclosure. The addition of the plasticizer makes it possible to adjust the viscosity and the slump property of the curable composition, and the tensile strength, the elongation and other mechanical properties of the cured product obtained by curing the composition. Examples of the plasticizer include phthalic acid esters such as dibutyl phthalate, diheptyl phthalate, bis(2-ethylhexyl) phthalate, butylbenzyl phthalate and the like; non-aromatic bibasic acid esters such as dioctyl adipate, dioctyl sebacate, dibutyl sebacate, isodecyl succinate and the like; aliphatic esters such as butyl oleate, methyl acetylricinolate and the like; phosphates such as tricresyl phosphate, tributyl phosphate and the like; trimellitic acid esters; chlorinated paraffins; hydrocarbon oils such as alkyldiphenyl, partially-hydrogenated terphenyl and the like; process oils; epoxy plasticizers such as epoxidized soybean oil, benzyl epoxystearate and the like.

A polymeric plasticizer can be used. In the case of using the polymeric plasticizer, the initial physical properties are maintained over a longer term than in the case of using a low molecular weight plasticizer, which does not contain in the molecule thereof any polymeric component. Furthermore, when an alkyd paint is painted onto the cured product, the drying property, which may be called paintability, can be improved. Specific examples of the polymeric plasticizer include vinyl polymers, which are each obtained by polymerizing a vinyl monomer by a variety of methods; polyalkylene glycol esters such as diethylene glycol dibenzoate, triethylene glycol dibenzoate, pentaerythritol esters and the like; polyester plasticizers each made from a dibasic acid such as sebacic acid, adipic acid, azelaic acid, phthalic acid or the like, and a dihydric alcohol such as ethylene glycol, diethylene glycol, triethylene glycol, propylene glycol, and dipropylene glycol; polyethers, for example, polyetherpolyols such as polyethylene glycol and polypropylene glycol polytetraethylene glycol, which has a molecular weight of 500 or more, preferably 1000 or more, and derivatives obtained by changing hydroxyl groups of these polyether-polyols to ester groups or ether groups; polystyrenes such as polystyrene and poly-α-methylstyrene; polybutadiene; polybutene; polyisobutylene; butadiene-acrylonitrile; and polychloroprene. However, the polymeric plasticizer is not limited thereto.

Out of these polymeric plasticizers, ones compatible with the component (A) are preferred. From this viewpoint, polyethers and vinyl polymers are preferred. When a polyether is used as the plasticizer, the surface curability and the depth curability are improved. Moreover, after the composition is stored, the composition does not undergo curing delay. Thus, the use is preferred. Out of the plasticizers, polypropylene glycol is more preferred. From the viewpoint of compatibility, weather resistance and heat resistance, vinyl polymers are preferred. Out of the vinyl polymers, acrylic polymers and/or methacrylic polymers are preferred, and acrylic polymers such as poly(alkyl acrylate)s are more preferred. The method for synthesizing the polymers is preferably a living radical polymerization method since the molecular weight distribution is narrow and the viscosity is low. An atomic transfer radical polymerization method is more preferred. It is also preferred to use a polymer based on the so-called SGO process, which is obtained by subjecting an alkyl acrylate monomer described in JP-A-2001-207157 to continuous bulk polymerization at high temperature and high pressure.

The number-average molecular weight of the polymeric plasticizer is preferably from 500 to 15,000, more preferably from 800 to 10,000, even more preferably from 1000 to 8,000, in particular preferably from 1,000 to 5,000. The molecular weight is most preferably from 1,000 to 3,000. If the molecular weight is too low, the plasticizer flows out with time by heat or rainfall so that the initial physical properties cannot be maintained over a long term, the plasticizer causes pollution based on adhesion of dust thereto, and the alkyd paintability cannot be improved. If the molecular weight is too high, the viscosity becomes high so that the workability deteriorates. The molecular weight distribution of the polymeric plasticizer is not particularly limited, and a narrow distribution is preferred. The distribution is preferably less than 1.80, more preferably 1.70 or less, even more preferably 1.60 or less, even more preferably 1.50 or less, in particular preferably 1.40 or less, most preferably 1.30 or less.

In the case that the plasticizer is a polyether polymer, the number-average molecular weight is measured by terminal group analysis. In the case that the plasticizer is any other polymer, the number-average molecular weight is measured by a GPC method. The molecular weight distribution (Mw/Mn) is measured by the GPC method (in terms of polystyrene).

The polymeric plasticizer may have no reactive silicon group, or may have a reactive silicon group. When the plasticizer has a reactive silicon group, the plasticizer acts as a reactive plasticizer. Thus, the plasticizer can be prevented from being shifted from the cured product. When the plasticizer has a reactive silicon group, the number of individuals of the reactive silicon group is preferably 1 or less, more preferably 0.8 or less per molecule on average. In the case of using a plasticizer having a reactive silicon group, in particular, an oxyalkylene polymer having a reactive silicon group, the number-average molecular weight thereof is preferably lower than that of the polymer(s) of the component (A). If not so, plasticizing effect may not be obtained.

About the plasticizer, only one species thereof may be used, or two or more species thereof may be used together. A low molecular weight plasticizer and a polymeric plasticizer may be used together. These plasticizers may be blended when the polymer(s) is/are produced.

The amount of the used plasticizer is from 5 to 150 parts by weight, preferably from 10 to 120 parts by weight, even more preferably from 20 to 100 parts by weight for 100 parts by weight of the polymer(s) of the component (A). If the amount is less than 5 parts by weight, effects as a plasticizer are not expressed. If the amount is more than 150 parts by weight, the mechanical strength of the cured product is insufficient.

If necessary, a physical property adjustor for adjusting tensile characteristics of the cured product may be added to the curable composition of the present disclosure. The physical property adjustor is not particularly limited, and examples thereof include alkylalkoxysilanes such as methyltrimethoxysilane, dimethyldimethoxysilane, trimethylmethoxysilane, n-propyltrimethoxysilane and the like; alkoxysilanes having an unsaturated group, such as dimethyldiisopropenoxysilane, methyltriisopropenoxysilane, other alkylisopropenoxysilanes, vinyltrimethoxysilane, vinyldimethylmethoxysilane and the like; silicone vanish; polysiloxanes and the like. The use of the physical property adjustor makes it possible that when the composition of the present disclosure is cured, the hardness is raised or the hardness is conversely lowered so as to improve the property of elongation at break. The above-mentioned physical property adjustors may be used alone or in combination of two or more thereof.

In particular, a compound which can be hydrolyzed, thereby generating a compound having in the molecule thereof a monovalent silanol group has an effect of lowering the modulus of the cured product without deteriorating the stickiness of the surface of the cured product. A compound which can generate trimethylsilanol is particularly preferred. Examples of the compound which can be hydrolyzed, thereby generating a compound having in the molecule thereof a monovalent silanol group include compounds described in JP-A-5-17521. Other examples thereof include compounds which are each a derivative of an alkylalcohol such as hexanol, octanol, decanol and the like, and can each generate a silicon compound which can be hydrolyzed, thereby generating $R_3SiOH$ such as trimethylsilanol and the like; and compounds which are each a derivative of a polyhydric alcohol having 3 or more hydroxyl groups, such as trimethylolpropane, glycerin, pentaerythritol, sorbitol and the like, as described in JP-A-11-241029, and can each generate a silicon compound which can be hydrolyzed, thereby generating $R_3SiOH$ such as trimethylsilanol and the like.

Different examples thereof include compounds which are each a derivative of an oxypropylene polymer, and can each generate a silicon compound which can be hydrolyzed, thereby generating $R_3SiOH$ such as trimethylsilanol and the like, as described in JP-A-7-258534. Furthermore, there can be used a polymer having a crosslinkable, hydrolyzable silicon-containing group and a silicon-containing group which can be hydrolyzed so as to be converted to a monosilanol-containing compound, as described in JP-A-6-279693.

The physical property adjustor is used in an amount of 0.1 to 20 parts by weight, preferably 0.5 to 10 parts by weight for 100 parts by weight of the organic polymer(s) (A) having a reactive silicon group.

If necessary, a thixotrope (anti-dripping agent) may be added to the curable composition of the present disclosure to prevent the composition from dripping and to make the workability better. The anti-dripping agent is not particularly limited, and examples thereof include polyamide waxes; hydrogenated castor oil derivatives; and metal soaps such as calcium stearate, aluminum stearate, barium stearate and the like. In the case of using rubber powder having a particle diameter of 10 to 500 µm as described in JP-A-11-349916 or an organic fiber as described in JP-A-2003-155389, a composition having a high thixotropy and a good workability can be obtained. These thixotropes (anti-dripping agents) may be used alone or in combination of two or more thereof. The thixotrope(s) is/are used in an amount of 0.1 to 20 parts by weight for 100 parts by weight of organic the polymer(s) (A) having a reactive silicon group.

In the composition of the present disclosure, a compound having in a single molecule thereof an epoxy group can be used. When the compound having an epoxy group is used, the restorability of the cured product can be made high. Examples of the compound having an epoxy group include epoxidized unsaturated oils and fats, epoxidized unsaturated aliphatic acid esters, alicyclic epoxy compounds, epichlorohydrin derivatives and mixtures thereof, and the like. Specific examples thereof include epoxidized soybean oil, epoxidized linseed oil, bis(2-ethylhexyl)-4,5-epoxycyclohexane-1,2-dicarboxylate (E-PS), epoxyoctyl stearate, epoxybutyl stearate and the like. Among them, E-PS is particularly preferred. It is advisable to use the epoxy compound in an amount of 0.5 to 50 parts by weight for 100 parts by weight of the organic polymer(s) (A) having a reactive silicon group.

In the composition of the present disclosure, a photo-curable material can be used. When the photo-curable material is used, a coating of the photo-curable material is formed on the surface of the cured product. Thus, the stickiness or the weather resistance of the cured product can be improved. The photo-curable material is a material which undergoes a chemical change in molecular structure by action of light so as to generate a physical change such as curing. As a compound of this type, many materials are known, examples of which include organic monomers, oligomers, resins and compositions containing these materials and the like. Any commercially available products can be used. Typically, an unsaturated acrylic compound, a polyvinyl cinnamate, an azide resin or the like can be used. The unsaturated acrylic compound is a monomer or oligomer having one or more acrylic or methacrylic unsaturated groups, or a mixture thereof. Examples thereof include propylene (or butylene or ethylene) glycol di(meth)acrylate, neopentyl glycol di(meth)acrylate and the like, or oligoesters made from such a monomer and having a molecular weight of 10000 or less. In particular, compounds having an acrylic functional group are preferred, and compounds each containing in a single molecule thereof 3 or more acrylic functional groups on average are preferred.

An oxygen curable material can be used in the composition of the present disclosure. Examples of the oxygen curable material include unsaturated compounds reactive with oxygen in air. The material reacts with oxygen in air to form a cured coating in the vicinity of the surface of the cured product, thereby fulfilling an act of preventing the stickiness of the surface or adhesion of wastes or dust onto the cured product surface. Specific examples of the oxygen curable material include drying oils, typical examples of which are tung oil and linseed oil; various alkyd resins obtained by modifying the compounds; acrylic polymer, epoxy resin, and silicone resin which are each modified with a drying oil; liquid polymers such as 1,2-polybutadiene, 1,4-polybutadiene, C5 to C8 diene polymer and the like, which are each obtained by polymerizing or copolymerizing one or more diene compounds such as butadiene, chloroprene, isoprene, and/or 1,3-pentadiene; liquid copolymers such as NBR, SBR and the like, which are each obtained by copolymerizing a monomer copolymerizable with the diene compounds, such as acrylonitrile, styrene and the like, with one or more of the diene compounds so as to make the diene compound(s) into one or more main components; and various modified products thereof (such as maleic acid modified products boiled oil modified products and the like). These may be used or in combination of two or more thereof. Among them, tung oil and liquid diene polymers are particularly preferred. When a catalyst for promoting the oxidization curing reaction or a metal drier is used together, the advantageous effects may be enhanced. Examples of the catalyst or metal drier include metal salts such as cobalt naphthenate, lead naphthenate, zirconium naphthenate, cobalt octanoate, zirconium octanonate and the like; and amine compounds and the like. The use amount of the oxygen curable material is preferably from 0.1 to 20 parts by weight, more preferably 0.5 to 10 parts by weight for 100 parts by weight of the organic polymer(s) (A) having a reactive silicon group. If the use amount is less than 0.1 part by weight, an improvement in pollution resistance is insufficient. If the amount is more than 20 parts by weight, the tensile characteristic or the like of the cured product tends to be damaged.

An antioxidant can be used in the composition of the present disclosure. When the antioxidant is used, the heat resistance of the cured product can be enhanced. Examples of the antioxidant include hindered phenols, monophenols, bisphenols, and polyphenols. Particularly preferred are hindered phenols. Similarly, the following can also be used: a hindered amine photostabilizer named TINUVIN 622LD, TINUVIN 144, CHIMASSORB 944LD, or CHIMASSORB 119FL (BASF.); MARK LA-57, MARK LA-62, MARK LA-67, MARK LA-63, or MARK LA-68 (Asashi Denka) SANOL LS-770, SANOL LS-765, SANOL LS-292, SANOL LS-2626, SANOL LS-1114, or SANOL LS-744 (Sankyo Co., Ltd.). The use amount of the antioxidant is preferably from 0.1 to 10 parts by weight, more preferably from 0.2 to 5 parts by weight for 100 parts by weight of the organic polymer(s) (A) having a reactive silicon group.

A photostabilizer can be used in the composition of the present disclosure. The use of the photostabilizer makes it possible to prevent the cured product form being deteriorated by photo-oxidation. Examples of the photostabilizer include benzophenones, benztriazoles, triazines and hindered amine light stabilizers compounds, and the like. The use amount of the photostabilizer is preferably from 0.1 to 10 parts by weight, more preferably from 0.2 to 5 parts by weight for 100 parts by weight of the organic polymer(s) (A) having a reactive silicon group.

In the case of using the photocurable material, in particular, an unsaturated acrylic compound together in the composition of the present disclosure, it is preferred to use a tertiary-amine-containing hindered amine photostabilizer as a hindered amine photostabilizer, as described in JP-A-5-70531, in order to improve the storage stability of the composition. Examples of the tertiary-amine-containing hindered amine photostabilizer include photostabilizers named TINUVIN 622LD, TINUVIN 144, and CHIMASSORB 119FL (each manufactured by BASF.); MARK LA-57, MARK LA-62, MARK LA-67, and MARK LA-63

(each manufactured by Asashi Denka Kogyo K.K.); and SANOL LS-765, SANOL LS-292, SANOL LS-2626, SANOL LS-1114, SANOL LS-744 (each manufactured by Sankyo Co., Ltd.) and the like.

An ultraviolet absorber can be used in the composition of the present disclosure. The use of the ultraviolet absorber makes it possible to enhance the surface weather resistance of the cured product. Examples of the ultra violet absorber include benzophenone compounds, benzotriazole compounds, salicylate compounds, substituted tolyl compounds, metal chelate compounds and the like. Particularly preferred are benzotriazole compounds. The use amount of the ultraviolet absorber is preferably from 0.1 to 10 parts by weight, more preferably from 0.2 to 5 parts by weight for 100 parts by weight of the organic polymer(s) (A) having a reactive silicon group. It is preferred to use a phenolic or hindered phenolic antioxidant with a hindered amine photostabilizer, and a benzotriazole ultraviolet absorber together.

An epoxy resin can be added to the composition of the present disclosure. The composition to which the epoxy resin is added is particularly preferred as an adhesive, in particular, as an adhesive for outer wall tiles. Examples of the epoxy resin include epichlorohydrin-bisphenol A epoxy resin, epichlorohydrin-bisphenol F epoxy resin, glycidyl ether of tetrabromobisphenol A, other flame retardant epoxy resins, novolak epoxy resin, hydrogenated bisphenol A epoxy resin, glycidyl ether type epoxy resin of a bisphenol A propylene oxide adduct, glycidyl etherester type epoxy resin of p-oxybenzoic acid, m-aminophenol epoxy resin, diaminodiphenylmethane epoxy resin, urethane-modified epoxy resin, various alicyclic epoxy resins, N,N-diglycidylaniline, N,N-diglycidyl-o-toluidine, triglycidyl isocyanurate, polyalkylene glycol diglycidyl ether, glycerin, other glycidyl ethers of polyhydric alcohol, hydantoin type epoxy resin, petroleum resin, and other epoxidized unsaturated polymers. However, the epoxy resin is not limited thereto, and any epoxy resin that is ordinarily used can be used. Preferred is an epoxy resin having, in the molecule thereof, at least two epoxy groups since a high reactivity is exhibited when the resin is cured and a three-dimensional network structure is easily formed in the cured product. More preferred is bisphenol A epoxy resin, novolak epoxy resin or the like. The ratio by weight of the used epoxy resin to the organic polymer(s) (A) having a reactive silicon group ranges from 100/1 to 1/100. If the ratio of the (A) to the epoxy resin is less than 1/100, the impact strength of the epoxy resin cured product or the toughness-improving effect thereof is not easily obtained. If the ratio of the (A)/to the epoxy resin is more than 100/1, the strength of the organic polymer cured product becomes insufficient. A preferred use ratio there between is not decided without reservation since the ratio is varied in accordance with the usage of the curable resin composition, or the like. In the case of improving, for example, the impact resistance, flexibility, toughness, peel strength or the like of the epoxy resin cured product, the component (A) is/are used preferably in an amount of 1 to 100 parts by weight, more preferably in an amount of 5 to 100 parts by weight for 100 parts by weight of the epoxy resin. In the case of improving the strength of the cured product of the component(s) (A), the epoxy resin is used preferably in an amount of 1 to 200 parts by weight, more preferably in an amount of 5 to 100 parts by weight for 100 parts by weight of the component (A).

In the case of the addition of the epoxy resin, a curing agent for curing the epoxy resin can be used in the curable composition of the present disclosure. The epoxy resin curing agent which can be used is not particularly limited, and may be any epoxy resin curing agent that is ordinarily used. Specific examples thereof include primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, amine-terminated polyether and the like; tertiary amines such as 2,4,6-tris(dimethylaminomethyl)phenol and tripropylamine, and salts of these tertiary amines; polyamide resins; imidazoles; dicyandiamines; trifluoroboron complex compounds; carboxylic anhydrides such as phthalic anhydride, hexahydrophthalic anhydride, tetrahydrophthalic anhydride, dodecylsuccinic anhydride, pyromellitic anhydride, chlorendic anhydride and the like; alcohols; phenols; carboxylic acids; and diketone complex compounds of aluminum or zirconium, and the like. However, the curing agent is not limited thereto. The above-mentioned curing agents may be used alone or in combination of two or more thereof.

When the epoxy resin curing agent is used, the use amount thereof ranges from 0.1 to 300 parts by weight for 100 parts by weight of the epoxy resin.

A ketimine can be used as the epoxy resin curing agent. The ketimine is stably present in a state that there is no water content, and is dissolved into a primary amine and a ketone by water content. The resultant primary amine becomes a curing agent for epoxy resin which can be cured at room temperature. When the ketimine is used, a one-part type composition can be obtained. Such a ketimine compound can be obtained by condensation reaction between an amine compound and a carbonyl compound.

In order to synthesize the ketimine, a known amine compound and a known carbonyl compound may be used. As the amine compound, the following is used: a diamine such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phneylenediamine, p,p'-biphenylenediamine or the like; a polyhydric amine such as 1,2,3-triaminopropane, triaminobenzene, tris(2-aminoethyl)amine, tetrakis(aminomethyl)methane or the like; a polyalkylenepolyamine such as diethylenetriamine, triethylenetriamine, tetraethylenepentamine or the like; a polyoxyalkylene polyamine; an aminosilane such as γ-aminopropyltriethoxysilane, N-(β-aminoethyl)-γ-aminopropyltrimethoxysilane, N-(β-aminoethyl)-γ-aminopropylmethyldimethoxysilane; or the like. As the carbonyl compound, the following can be used: an aldehyde such as acetoaldehyde, propionaldehyde, n-butylaldehyde, isobutylaldehyde, diethylacetoaldehyde, glyoxal, benzaldehyde or the like; a cyclic ketone such as cyclopentanone, trimethylcyclopentanone, cyclohexanone, trimethylcyclohexanone or the like; an aliphatic ketone such as acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone or the like; a β-dicarbonyl compound such as acetylacetone, methyl acetoacetate, ethyl acetoacetate, dimethyl malonate, diethyl malonate, methylethyl malonate, dibenzoylmethane; or the like.

When an imino group is present in the ketimine, the imino group may be caused to react with styrene oxide, a glycidyl ether such as butyl glycidyl ether allyl glycidyl ether or the like, a glycidyl ester, or the like. The above-mentioned ketimines may be used alone or in combination of two or more thereof. The use amount thereof is from 1 to 100 parts by weight for 100 parts by weight of the epoxy resin, and is varied in accordance with the kind of the epoxy resin and that of the ketimine.

A flame retardant may be added to the curable composition of the present disclosure, examples of the retardant including a phosphorus-containing plasticizer such as ammonium polyphosphate, tricresyl phosphate or the like; aluminum hydroxide, magnesium hydroxide, or thermally expandable graphite or the like. These flame retardants may be used alone or in combination of two or more thereof.

The flame retardant is used in an amount of 5 to 200 parts by mass, preferably 10 to 100 parts by mass for 100 parts by weight of the component (A).

If necessary, various additives may be added to the curable composition of the present disclosure in order to adjust various physical properties of the curable composition or the cured product. Examples of the additives include a curability adjustor, a radical inhibitor, a metal deactivator agent, an ozone deterioration preventive, a phosphorus-containing peroxide decomposer, a lubricant, a pigment, a foaming agent, an ant preventive, and an antifungal agent. These additives may be used alone or in combination of two or more thereof. Specific examples of additives other than the specific examples described in the specification are described in JP-B-4-69659 and 7-108928, and JP-A-63-254149, 64-22904 and 2001-72854, and other publications.

The curable composition of the present disclosure can be prepared into a one component form, wherein all blend components are beforehand blended, air-tightly sealed up and stored, and after the resultant blend is actually used, the blend is cured with moisture in the air. Alternatively, the composition can be prepared into a two-component form, wherein a curing catalyst, a filler, a plasticizer, water and other components are separately blended with each other as a curing agent, and this blend and a polymer composition are mixed before used. From the viewpoint of workability, the one-part form is preferred.

In the case that the curable composition is in a one component form, all of the blend components are beforehand blended with each other; therefore, it is preferred to use the blend components which contain water content after the components are dehydrated and dried in advance, or dehydrate the composition by pressure-reduction when the components are blended and kneaded. In the case that the curable composition is in a two-component form, it is unnecessary to blend a curing catalyst with the main agent containing the polymer(s) having a reactive silicon group; therefore, it is hardly feared that the blend components are gelatinized even if the components contain a certain amount of water content. However, in the case that the composition is required to have storage stability for a long term, the composition is preferably dehydrated and dried. Preferred examples of the method for the dehydration and drying include a heating drying method when the composition is in the form of a solid such as powder; and a pressure-reducing dehydrating method or a dehydrating method using synthetic zeolite, activated alumina, silica gel, caustic lime, magnesium oxide or the like when the composition is in a liquid form. It is allowable to incorporate a small amount of an isocyanate compound into the composition to cause the isocyanate group to react with water, thereby attaining dehydration, or to incorporate an oxazolidine compound such as 3-ethyl-2-methyl-2-(3-methylbutyl)-1,3-oxazolidine or the like to cause the compound to react with water, thereby attaining dehydration. By the addition of the following compound besides this dehydration drying method, the storage stability is made better by adding the following compound: a lower alcohol such as methanol or ethanol; or an alkoxysilane compound such as n-propyltrimethoxysilane, vinyltrimethoxysilane, vinylmethyldimethoxysilane, methyl silicate, ethyl silicate, γ-mercaptopropylmethyldimethoxysilane, γ-mercaptopropylmethyldiethoxysilane or the like.

The use amount of the dehydrating agent, in particular, a silicon compound reactive with water, such as vinyltrimethoxysilane or the like, is preferably from 0.1 to 20 parts by weight, more preferably from 0.5 to 10 parts by weight for 100 parts by weight of the organic polymer(s) (A) having a reactive silicon group.

The method for preparing the curable composition of the present disclosure is not particularly limited, and a usual method is adopted, an example of the method being a method of blending the above-mentioned components with each other, then using a mixer, a roll, a kneader or the like to knead the blend at normal temperature or while the blend is heated, or a method of using a small amount of an appropriate solvent to dissolve the above-mentioned components therein, and then mixing the components, or other methods.

When the curable composition of the present disclosure is exposed to the atmosphere, the composition forms a three-dimensional network structure by action of water, so as to be cured into a solid having rubber-like elasticity.

The curable composition of the present disclosure can be used for a binder, a sealing agent for a building, ship, car, road or the like, an adhesive, a mold or pattern-forming material, a vibration isolating material, a vibration reducing material, a soundproof material, a foaming material, a paint, a spraying material, and so on. The composition is more preferably used as a sealant or an adhesive, out of the above-mentioned materials, since the cured product obtained by curing the curable composition of the present disclosure is excellent in flexibility and adhesiveness.

The curable composition can be used for various articles, such as electrical/electronic part materials such as a solar cell rear face sealant and the like, electrically insulating materials such as an insulating coating material for electric wires/cables and the like, elastic adhesives, contact-type adhesives, spray type sealants, crack repairing materials, tile-laying adhesives, powdery paints, casting materials, rubber materials for medical treatment, adhesives for medical treatment, medical instrument sealants, food wrapping materials, joint sealants for outer packaging materials such as a siding board and the like, coating materials, primers, electromagnetic-wave-shielding electroconductive materials, thermally conductive materials, hot melt materials, electrical and electronic potting agents, films, gaskets, various molding materials, rust resisting/waterproof sealants for an end face (cut portion) of net-incorporated glass or laminated glass, and liquid sealants used in automobile parts, electrical parts, or various mechanical parts. Furthermore, the curable composition can adhere closely to various substrates such as glass, ceramic, wood, metal, resin molded product substrates and the like by itself or by aid of a primer; therefore, the curable composition can also be used as various types of sealing compositions or adhesive compositions. Moreover, the curable composition of the present disclosure can be used as an adhesive for interior panels, an adhesive for exterior panels, a tile-laying adhesive, a stone-material-laying adhesive, a ceiling finishing adhesive, a floor finishing adhesive, a wall finishing adhesive, an adhesive for automobile panels, an electrical/electronic/precision instrument fabricating adhesive, a direct grading sealants, a sealant for double glazing, a sealant for the SSG method, or a sealant for working joints of a building.

The polymer component (A) may be a liquid or solid-based polymer having a reactive terminal silyl group. The polymer component (A) is not particularly limited and may be chosen from any cross-linkable polymer as may be desired for a particular purpose or intended use. Non-limiting examples of suitable polymers for the polymer component (A) include polyorganosiloxanes ($P_1$) or organic polymers free of siloxane bonds ($P_2$), wherein the polymers ($P_1$) and ($P_2$) comprise reactive terminal silyl groups. In one embodiment, the polymer component (A) may be present in an amount of from about 10 to about 100 wt. % of the curable composition. In one embodiment, the curable composition comprises about 100 parts of the polymer component (A).

As described above, the polymer component ($A_1$) may include a wide range of polyorganosiloxanes. In one embodiment, the polymer component may comprise one or more polysiloxanes and copolymers of formula:

  (3a)

$R^1$ may be chosen from saturated $C_1$-$C_{12}$ alkyl, which can be substituted with one or more of a halogen e.g., Cl or F, an O, S or N atom, $C_5$-$C_{16}$ cycloalkyl, $C_2$-$C_{12}$ alkenyl, $C_7$-$C_{16}$ arylalkyl, $C_7$-$C_{16}$ alkylaryl, phenyl, $C_2$-$C_4$ polyalkylene ether, or a combination of two or more thereof, e.g., methyl, trifluoropropyl and/or phenyl groups.

$R^2$ may be a group reactive to protonated agents such as water and may be chosen from OH, $C_1$-$C_8$-alkoxy, $C_2$-$C_{18}$-alkoxyalkyl, amino, alkenyloxy, oximoalkyl, enoxyalkyl, aminoalkyl, carboxyalkyl, amidoalkyl, amidoaryl, carbamatoalkyl or a combination of two or more thereof. Exemplary groups for $R^2$ include OH, alkoxy, alkenyloxy, alkyloximo, alkylcarboxy, alkylamido, arylamido, or a combination of two or more thereof.

Z may be a bond, a divalent linking unit selected from the group of $O_{1/2}$, hydrocarbons which can contain one or more O, S or N atom, amide, urethane, ether, ester, urea units or a combination of two or more thereof. If the linking group Z is a hydrocarbon group then Z is linked to the silicon atom over a SiC bond. In one embodiment Z is chosen from a $C_1$-$C_{14}$ alkylene.

X is chosen from a polyurethane; a polyester; a polyether; a polycarbonate; a polyolefin; a polypropylene; a polyesterether; and a polyorganosiloxane having units of $R_3SiO_{1/2}$, $R_2SiO$, $RSiO_{3/2}$, and/or $SiO_{4/2}$, where R is chosen from a $C_1$-$C_{10}$-alkyl; a $C_1$-$C_{10}$ alkyl substituted with one or more of Cl, F, N, O or S; a phenyl; a $C_7$-$C_{16}$ alkylaryl; a $C_7$-$C_{16}$ arylalkyl; a $C_2$-$C_4$ polyalkylene ether; or a combination of two or more thereof X may be a divalent or multivalent polymer unit selected from the group of siloxy units linked over oxygen or hydrocarbon groups to the terminal silyl group comprising the reactive group $R^2$ as described above, polyether, alkylene, isoalkylene, polyester or polyurethane units linked over hydrocarbon groups to the silicon atom comprising one or more reactive groups $R^2$ as described above. The hydrocarbon group X can contain one or more heteroatoms such as N, S, O or P forming amides, esters, ethers urethanes, esters, ureas. In one embodiment, the average polymerization degree ($P_n$) of X should be more than 6, e.g. polyorganosiloxane units of $R_3SiO_{1/2}$, $R_2SiO$, $RSiO_{3/2}$, and/or $SiO_{4/2}$. In formula (3), n is 0-100, e.g., 1; and a is 0-2, e.g., 0-1.

Non-limiting examples of the components for unit X include polyoxyalkylene polymers such as polyoxyethylene, polyoxypropylene, polyoxybutylene, polyoxyethylene-polyoxypropylene copolymer, polyoxytetramethylene, or polyoxypropylene-polyoxybutylene copolymer; ethylene-propylene copolymer, polyisobutylene, polychloroprene, polyisoprene, polybutadiene, copolymer of isobutylene and isoprene, copolymers of isoprene or butadiene and acrylonitrile and/or styrene, or hydrocarbon polymer such as hydrogenated polyolefin polymers produced by hydrogenating these polyolefin polymers; polyester polymer manufactured by a condensation of dibasic acid such as adipic acid or phthalic acid and glycol, polycarbonates, or ring-opening polymerization of lactones; polyacrylic acid ester produced by radical polymerization of a monomer such as $C_2$-$C_8$-alkyl acrylates, vinyl polymers, e.g., acrylic acid ester copolymer of acrylic acid ester such as ethyl acrylate or butyl acrylate and vinyl acetate, acrylonitrile, methyl methacrylate, acrylamide or styrene; graft polymer produced by polymerizing the above organic polymer with a vinyl monomer; polysulfide polymer; polyamide polymer such as Nylon 6 produced by ring-opening polymerization of ε-caprolactam, Nylon 6.6 produced by polycondensation of hexamethylenediamine and adipic acid, Nylon 12 produced by ring-opening polymerization of ε-aminolauro-lactam, copolymeric polyamides, polyurethanes, or polyureas.

Particularly suitable polymers include, but are not limited to, polysiloxanes, polyoxyalkylenes, saturated hydrocarbon polymers such as polyisobutylene, hydrogenated polybutadiene and hydrogenated polyisoprene, or polyethylene, polypropylene, polyester, polycarbonates, polyurethanes, polyurea polymers and the like. Furthermore, saturated hydrocarbon polymer, polyoxyalkylene polymer and vinyl copolymer are particularly suitable due to their low glass transition temperature which provide a high flexibility at low temperatures, i.e. below 0° C.

The reactive silyl groups in formula

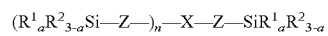

can be introduced by employing silanes containing a functional group which has the ability to react by known methods with unsaturated hydrocarbons via hydrosilylation, or reaction of SiOH, aminoalkyl, HOOC-alkyl, HO-alkyl or HO-aryl, HS-alkyl or -aryl, Cl(O)C-alkyl or -aryl, epoxyalkyl or epoxycycloalkyl groups in the prepolymer to be linked to a reactive silyl group via condensation or ring-opening reactions. Examples of the main embodiments include the following: (i) siloxane prepolymers having a SiOH group that can undergo a condensation reaction with a silane (L-group) $SiR^1aR^2_{3-a}$ whereby a siloxy bond Si—O—$SiR^1_aR^2_{3-a}$ is formed while the addition product of the leaving group (L-group) and hydrogen is released (L-group+H); (ii) silanes having an unsaturated group that is capable of reacting via a hydrosilylation or a radical reaction with a SiH group or radically activated groups of a silane such as SiH or an unsaturated group; and (iii) silanes including organic or inorganic prepolymers having OH, SH, amino, epoxy, —COCl, —COOH groups, which can react complementarily with epoxy, isocyanato, OH, SH, cyanato, carboxylic halogenides, reactive alkylhalogenides, lactones, lactams, or amines, that is to link the reactive prepolymer with the organofunctional silanes to yield a silyl functional polymer.

Silanes suitable for method (i) include alkoxysilanes, especially tetraalkoxysilanes, di- and trialkoxysilanes, di- and triacetoxysilanes, di- and triketoximatosilanes, di- and trialkenyloxysilanes, di- and tricarbonamidosilanes, wherein the remaining residues at the silicon atom of the silane are substituted or unsubstituted hydrocarbons. Other non-limiting silanes for method (i) include alkyltrialkoxysilanes, such as vinyltrimethoxysilane, methyltrimethoxysilane, propyltrimethoxysilane aminoalkyltrimethoxysilane, ethyltriacetoxysilane, methyl- or propyltriacetoxysilane, methyltributanonoximosilane, methyltripropenyloxysilane, methyltribenzamidosilane, or methyltriacetamidosilane. Prepolymers suitable for reaction under method (i) are SiOH-terminated polyalkylsiloxanes, which can undergo a condensation reaction with a silane having hydrolysable groups attached to the silicon atom. Exemplary SiOH-terminated polyalkydisiloxanes include polydimethylsilaxanes.

Suitable silanes for method (ii) include alkoxysilanes, especially trialkoxysilanes $(HSi(OR)_3)$ such as trimethoxysilane, triethoxysilane, methyldiethoxysilane, methyldimethoxysilane, and phenyldimethoxysilane; methyldiacetoxysilane and phenyldiacetoxysilane. Hydrogenchlorosilanes are in principle possible but are less desirable due to the additional replacement of the halogen through an alkoxy or acetoxy group. Other suitable silanes include organofunctional silanes having unsaturated groups which can be activated by radicals, such as vinyl, allyl, mercaptoalkyl, or acrylic groups. Non-limiting examples include vinyltrimethoxysilane, mercaptopropyltrimethoxysilane, methacryloxypropyltrimethoxysilane. Prepolymers suitable for reaction under method (ii) include vinyl terminated polyalkylsiloxanes, preferably polydimethylsiloxanes, hydrocarbons with unsaturated groups which can undergo hydrosilylation or can undergo radically induced grafting reactions with a corresponding organofunctional group of a silane comprising, for example, unsaturated hydrocarbon or a —SiH group.

Another method for introducing silyl groups into hydrocarbon polymers can be the copolymerization of unsaturated hydrocarbon monomers with the unsaturated groups of silanes. The introduction of unsaturated groups into a hydrocarbon prepolymer may include, for example, the use of alkenyl halogenides as chain stopper after polymerization of the silicon free hydrocarbon moiety.

Desirable reaction products between the silanes and prepolymers include the following structures:

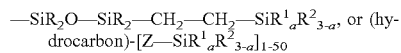

Suitable silanes for method (iii) include, but are not limited to, alkoxysilanes, especially silanes having organo-functional groups to be reactive to —OH, —SH, amino, epoxy, —COCl, or —COOH.

In one embodiment, these silanes have an isocyanatoalkyl group such as γ-isocyanatopropyltrimethoxysilane, γ-isocyanatopropylmethyldimethoxysilane, γ-isocyanatopropyltriethoxysilane, γ-glycidoxypropylethyldimethoxysilane, γ-glycidoxypropyltrimethoxysilane, γ-glycidoxypropyltrimethoxysilane, γ-(3,4-epoxycyclohexyl)ethyltrimethoxysilane, epoxylimonyltrimethoxysilane, N-(2-aminoethyl)-aminopropyltrimethoxysilane, γ-aminopropyltriethoxysilane, γ-aminopropyltrimethoxysilane, γ-aminopropylmethyldimethoxysilane, or γ-aminopropylmethyldiethoxysilane.

In one embodiment blocked amines or isocyanates $(Z'$—$X)_n$—$Z'$ are selected for carrying out first a complete mixing and then the following coupling reaction. Examples of blocking agents are disclosed in EP 0947531 and other blocking procedures that employ heterocyclic nitrogen compounds such as caprolactam or butanone oxime, or cyclic ketones referred to in U.S. Pat. No. 6,827,875 both of which are incorporated herein by reference in their entirety.

Examples of suitable prepolymers for a reaction under method (iii) include, but are not limited to, polyalkylene oxides having OH groups, preferably with a high molecular weight $(M_w)$ (weight average molecular weight >6000 g/mol) and a polydispersity $M_w/M_n$ of less than 1.6; urethanes having remaining NCO groups, such as NCO functionalized polyalkylene oxides, especially blocked isocyanates. Prepolymers selected from the group of hydrocarbons having —OH, —COOH, amino, epoxy groups, which can react complementarily with an epoxy, isocyanato, amino, carboxyhalogenide or halogenalkyl group of the corresponding silane having further reactive groups useful for the final cure.

Suitable isocyanates for the introduction of a NCO group into a polyether may include tolulene diisocyanate, diphenylmethane diisocyanate, or xylene diisocyanate, or aliphatic polyisocyanate such as isophorone diisocyanate, or hexamethylene diisocyanate.

The polymerization degree of the unit X depends on the requirements of viscosity and mechanical properties of the cured product. If X is a polydimethylsiloxane unit, the average polymerization degree based on the number average molecular weight $M_n$ is preferably 7 to 5000 siloxy units, preferably 200-2000 units. In order to achieve a sufficient tensile strength of >5 MPa, an average polymerization degree $P_n$ of >250 is suitable whereby the polydimethylsiloxanes have a viscosity of more than 300 mPas at 25° C. If X is a hydrocarbon unit other than a polysiloxane unit, the viscosity with respect to the polymerization degree is much higher.

Examples of the method for synthesizing a polyoxyalkylene polymer include, but are not limited to, a polymerization method using an alkali catalyst such as KOH, a polymerization method using a transition metal compound porphyrin complex catalyst such as complex obtained by reacting an organoaluminum compound, a polymerization method using a composite metal cyanide complex catalyst disclosed, e.g., in U.S. Pat. Nos. 3,427,256; 3,427,334; 3,278,457; 3,278,458; 3,278,459; 3,427,335; 6,696,383; and 6,919,293.

If the group X is selected from hydrocarbon polymers, then polymers or copolymers having isobutylene units are particularly desirable due to its physical properties such as excellent weatherability, excellent heat resistance, and low gas and moisture permeability.

Examples of the monomers include olefins having 4 to 12 carbon atoms, vinyl ether, aromatic vinyl compound, vinylsilanes, and allylsilanes. Examples of the copolymer component include 1-butene, 2-butene, 2-methyl-1-butene, 3-methyl-1-butene, pentene, 4-methyl-1-pentene, hexene, vinylcyclohexene, methyl vinyl ether, ethyl vinyl ether, isobutyl vinyl ether, styrene, alpha-methylstyrene, dimethylstyrene, beta-pinene, indene, and for example, but not limited to, vinyltrialkoxysilanes, e.g. vinyltrimethoxysilane, vinylmethyldichlorosilane, vinyldimethylmethoxysilane, divinyldichlorosilane, divinyldimethoxysilane, allyltrichlorosilane, allylmethyldichlorosilane, allyldimethylmethoxysilane, diallyldichlorosilane, diallyldimethoxysilane, gamma-methacryloyloxypropyltrimethoxysilane, and gamma-methacryloyloxy-propylmethyldimethoxysilane.

In one embodiment, the polymer component (A) may be a polymer of formula:

where $R^1$, $R^2$, and Z are defined as above with respect to formula (3a); R is $C_1$-$C_6$-alkyl (an exemplary alkyl being methyl); a is 0-2, x is 0 to about 10,000; preferably 11 to about 2500; and y is 0 to about 1,000; preferably 0 to 500.

In one embodiment, Z in a compound of formula (4a) is a bond or a divalent $C_2$ to $C_{14}$-alkylene group, especially preferred is —$C_2H_4$—.

Non-limiting examples of suitable polysiloxane-containing polymers ($P_1$) include, for example, silanol-stopped polydimethylsiloxane, silanol or alkoxy-stopped polyorganosiloxanes, e.g., methoxystopped polydimethylsiloxane, alkoxy-stopped polydimethylsiloxane-polydiphenylsiloxane copolymer, and silanol or alkoxy-stopped fluoroalkyl-substituted siloxanes such as poly(methyl 3,3,3-trifluoropropyl) siloxane and poly(methyl 3,3,3-trifluoropropyl)siloxane-polydimethyl siloxane copolymer. The polyorganosiloxane component ($P_1$) may be present in an amount of about 10 to about 90 wt. % of the composition or 100 pt. wt. In one preferred embodiment, the polyorganosiloxane component has an average chain length in the range of about 10 to about 2500 siloxy units, and the viscosity is in the range of about 10 to about 500,000 mPas at 25° C.

Alternatively, the composition may include silyl-terminated organic polymers ($P_2$) that are free of siloxane units, and which undergo curing by a condensation reaction comparable to that of siloxane containing polymers ($P_1$). Similar to the polyorganosiloxane polymer ($P_1$), the organic polymers ($P_2$) that are suitable as the polymer component ($A_1$) include a terminal silyl group. In one embodiment, the terminal silyl group may be of the formula (5):

where $R^1$, $R^2$, and a are as defined above.

Examples of suitable siloxane free organic polymers include, but are not limited to, silylated polyurethane (SPUR), silylated polyester, silylated polyether, silylated polycarbonate, silylated polyolefins like polyethylene, polypropylene, silylated polyesterether and combinations of two or more thereof. The siloxane-free organic polymer may be present in an amount of from about 10 to about 90 wt. % of the composition or about 100 pt. wt.

In one embodiment, the polymer component ($A_1$) may be a silylated polyurethane (SPUR). Such moisture curable compounds are known in the art in general and can be obtained by various methods including (i) reacting an isocyanate-terminated polyurethane (PUR) prepolymer with a suitable silane, e.g., one possessing both hydrolyzable functionality at the silicon atom, such as an alkoxy and secondly an active hydrogen-containing functionality, such as mercaptan, primary or secondary amine, preferably the latter, or by (ii) reacting a hydroxyl-terminated PUR (polyurethane) prepolymer with a suitable isocyanate-terminated silane, e.g., one possessing one to three alkoxy groups. The details of these reactions, and those for preparing the isocyanate-terminated and hydroxyl-terminated PUR prepolymers employed therein can be found in, amongst others: U.S. Pat. Nos. 4,985,491; 5,919,888; 6,207,794; 6,303,731; 6,359, 101; and 6,515,164 and published U.S. Publication Nos. 2004/0122253 and U.S. 2005/0020706 (isocyanate-terminated PUR prepolymers); U.S. Pat. No. 3,786,081 and U.S. Pat. No. 4,481,367 (hydroxyl-terminated PUR prepolymers); U.S. Pat. Nos. 3,627,722; 3,632,557; 3,971,751; 5,623,044; 5,852,137; 6,197,912; and 6,310,170 (moisture-curable SPUR (silane modified/terminated polyurethane) obtained from reaction of isocyanate-terminated PUR prepolymer and reactive silane, e.g., aminoalkoxysilane); and, U.S. Pat. Nos. 4,345,053; 4,625,012; 6,833,423; and published U.S. Publication No. 2002/0198352 (moisture-curable SPUR obtained from reaction of hydroxyl-terminated PUR prepolymer and isocyanatosilane). The entire contents of the foregoing U.S. patent documents are incorporated by reference herein. Other examples of moisture curable SPUR materials include those described in U.S. Pat. No. 7,569,653, the disclosure of which is incorporated by reference in its entirety.

The polysiloxane composition may further include a crosslinker or a chain extender as component (C). In one embodiment, the crosslinker is of the formula (6a):

wherein $R^2$ may be as described above, $R^1$ may be as described above, and a is 0-3. Alternatively, the cross-linker component may be a condensation product of formula (6a) wherein one or more but not all $R^2$ groups are hydrolyzed and released in the presence of water and then intermediate silanols undergo a condensation reaction to give a Si—O—Si bond and water. The average polymerization degree can result in a compound having 2-10 Si units.

As used herein, the term crosslinker includes a compound including an additional reactive component having at least two hydrolysable groups and less than three silicon atoms per molecule not defined under ($A_1$). In one embodiment, the crosslinker or chain extender may be chosen from an alkoxysilane, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane, an alkoxycarbamatosiloxane, an imidatosilane, a ureidosilane, an isocyanatosilane, a thioisocyanatosilane, and combinations of two or more thereof. Examples of suitable cross-linkers include, but are not limited to, tetraethylorthosilicate (TEOS); methyltrimethoxysilane (MTMS); methyltriethoxysilane; vinyltrimethoxysilane; vinyltriethoxysilane; methylphenyldimethoxysilane; 3,3,3-trifluoropropyltrimethoxysilane; methyltriacetoxysilane; vinyltriacetoxysilane; ethyltriacetoxysilane; di-butoxydiacetoxysilane; phenyltripropionoxysilane; methyltris(methylethylketoxime)silane; vinyltris (methylethylketoxime)silane; 3,3,3-trifluoropropyltris (methylethylketoxime)silane; methyltris(isopropenoxy) silane; vinyltris(isopropenoxy)silane; ethylpolysilicate; dimethyltetraacetoxydisiloxane; tetra-n-propylorthosilicate; methyldimethoxy(ethylmethylketoximo)silane; methylmethoxybis-(ethylmethylketoximo)silane; methyldimethoxy(acetaldoximo)silane; methyldimethoxy(N-methylcarbamato)silane; ethyldimethoxy(N-methylcarbamato)silane; methyldimethoxyisopropenoxysilane; trimethoxyisopropenoxysilane; methyltri-iso-propenoxysilane; methyldimethoxy(but-2-ene-2-oxy)silane; methyldimethoxy(1-phenylethenoxy)silane; methyldimethoxy-2(1-carboethoxypropenoxy)silane; methylmethoxydi-N-methylaminosilane; vinyldimethoxymethylaminosilane; tetra-N,N-diethylaminosilane; methyldimethoxymethylaminosilane; methyltricyclohexylaminosilane; methyldimethoxyethylaminosilane; dimethyldi-N,N-dimethylaminosilane; methyldimethoxyisopropylaminosilane; dimethyldi-N,N-diethylaminosilane; ethyldimethoxy(N-ethylpropionamido)silane; methyldimethoxy(N-methylacetamido)silane; methyltris(N-methylacetamido) silane; ethyldimethoxy(N-methylacetamido)silane; methyltris(N-methylbenzamido)silane; methylmethoxybis (N-methylacetamido)silane; methyldimethoxy(caprolactamo)silane; trimethoxy(N-methylacetamido)silane; methyldimethoxyethylacetimidatosilane; methyldimethoxypropylacetimidatosilane; methyl dimethoxy(N,N',N'-triethylureido)silane; methyldimethoxy(N-allyl-N',N'-dimethylureido)silane; methyldimethoxy(N-phenyl-N',N'- dimethylureido)silane; methyldimethoxyisocyanatosilane; dimethoxydiisocyanatosilane; methyldimethoxythioisocyanatosilane; methylmethoxydithioisocyanatosilane, or combinations of two or more thereof. In one embodiment, the crosslinker may be present in an amount from about 1 to about 10 wt. % of the composition or from about 0.1 to about 10 pt. wt. per 100 pt. wt. of the polymer component (A). In another embodiment, the crosslinker may be present in an amount from about 0.1 to about 5 pt. wt. per 100 pt. wt. of the polymer component (A). In still another embodiment, the crosslinker may be present in an amount from about 0.5 to about 3 pt. wt. per 100 pt. wt. of the polymer component (A). Here as elsewhere in the specification and claims, numerical values may be combined to form new or undisclosed ranges.

Additional alkoxysilanes in an amount greater than 0.1 wt. % of component and (A) that are not consumed by the reaction between the prepolymer Z'—X—Z' and which comprise additional functional groups selected from $R^4$ can also work as an adhesion promoter and are defined and counted under component (D).

The composition furthers include an adhesion promoter component (D) that is different to component $(A_1)$ or $(B_1)$. In one embodiment, the adhesion promoter (D) may be an organofunctional silane comprising the group $R^4$, e.g., aminosilanes, and other silanes that are not identical to the silanes of component (C), or are present in an amount which exceeds the amount of silanes necessary for endcapping the polymer (A). The amount of non-reacted silane $(B_1)$ or $(D_1)$ in the reaction for making (A) can be defined in that after the endcapping reaction the free silanes are evaporated at a higher temperature up to 200° C. and vacuum up to 1 mbar to be more than 0.1 wt. % of (A).

In one embodiment, the composition comprises an adhesion promoter (D) comprising a group $R^4$ as described by the general formula (7a):

$$R^4{}_e R^1{}_d Si(OR^3)_{4-d-e} \tag{7a}$$

where $R^4$ is $E\text{-}(CR^5{}_2)_f\text{-}W\text{--}(CH_2)_f\text{--}$; $R^1$ is as described above; d is 0, 1 or 2; e=1, 2 or 3; d+e=1 to 2; and f is 0 to 8, and may be identical or different.

Non-limiting examples of suitable compounds include:

$$E^1\text{-}(CR^5{}_2)_f\text{--}W\text{--}(CH_2)_f SiR^1{}_d(OR^3)_{3-d} \tag{7c, or (7d)}$$

$$E^2\text{-}[(CR^5{}_2)_f\text{--}W\text{--}(CH_2)_f SiR^1{}_d(OR^3)_{3-d}]_p \tag{7b or (7f)}$$

where p=2-3.

The group E may be selected from either a group $E^1$ or $E^2$. $E^1$ may be selected from a monovalent group comprising amine, —$NH_2$, —NHR, —$(NHC_2H_5)_{1\text{-}10}$ NHR, $NHC_6H_5$ halogen, pseudohalogen, unsaturated aliphatic group with up to 14 carbon atoms, epoxy-group-containing aliphatic group with up to 14 carbon atoms, cyanurate-containing group, and an isocyanurate-containing group.

$E^2$ may be selected from a group comprising of a di- or multivalent group consisting of amine, polyamine, isocyanurate-containing and an isocyanurate-containing group, sulfide, sulfate, phosphate, phosphite and a polyorganosiloxane group, which can contain Wand $OR^3$ groups; W is selected from the group consisting of a single bond, a heteroatomic group selected from —COO—, —O—, epoxy, —S—, —CONH—, —HN—CO—NH— units; $R^5$ is selected from hydrogen and R as defined above, $R^1$ may be identical or different as defined above, $R^3$ is selected from the group, which consists of $C_1$-$C_8$-alkoxy, such as methoxy, ethoxy, $C_3$-$C_{12}$-alkoxyalkyl, $C_2$-$C_{22}$-alkylcarboxy and $C_4$-$C_{100}$ polyalkylene oxide may be identical or different.

Non-limiting examples of component (D) include:

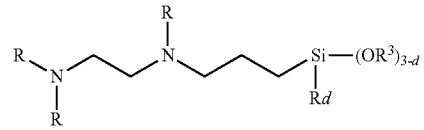

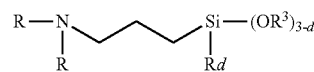

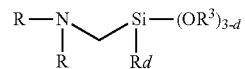

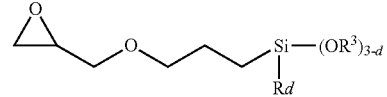

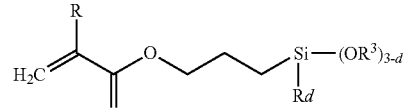

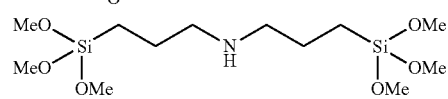

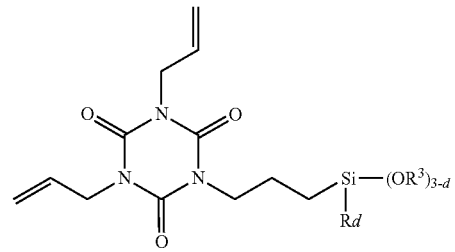

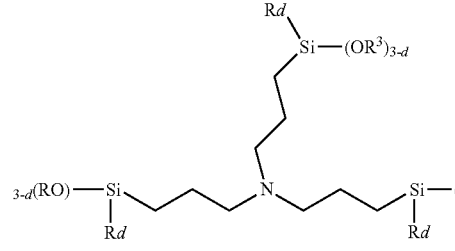

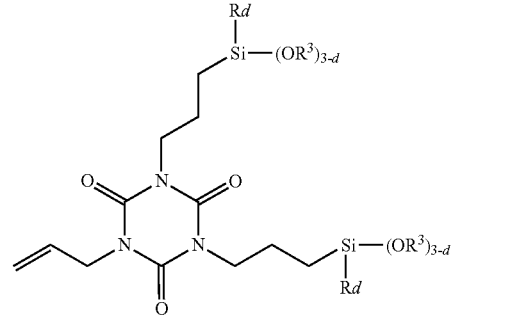

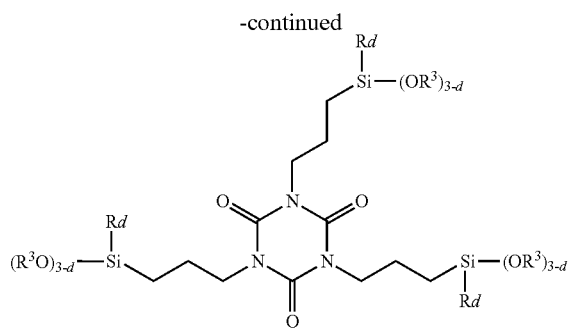

wherein R and d are as defined above.

An exemplary group of adhesion promoters are selected from the group which consists of amino group-containing silane coupling agents. The amino group-containing silane adhesion promoter agent (D) is a compound having a group containing a silicon atom bonded to a hydrolyzable group (hereinafter referred to as a hydrolyzable group attached to the silicon atom) and an amino group. Specific examples thereof include the same silyl groups with hydrolyzable groups described above. Among these groups, the methoxy group and ethoxy group are particularly suitable. The number of the hydrolyzable groups may be 2 or more, and particularly suitable are compounds having 3 or more hydrolyzable groups.

Examples of other suitable adhesion promoter (D) include, but are not limited to N-(2-amino ethyl)aminopropyltrimethoxysilane, γ-aminopropyltriethoxysilane, γ-aminopropyltrimethoxysilane, bis(γ-trimethoxysilypropyl)amine, N-phenyl-γ-aminopropyltrimethoxysilane, triaminofunctionaltrimethoxysilane, γ-aminopropylmethyldimethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, γ-(3,4-epoxycyclohexyl)ethyltrimethoxysilane, beta-(3,4-epoxycyclohexyl)ethylmethyl-dimethoxysilane, epoxylimonyltrimethoxysilane, isocyanatopropyltriethoxysilane, isocyanatopropyltrimethoxysilane, isocyanatopropylmethyldimethoxysilane, beta-cyano-ethyl-trimethoxysilane, γ-acryloxypropyl-trimethoxy-silane, γ-methacryloxypropyl-methyldimethoxysilane, α,Ω-bis-(aminoalkyl-diethoxysilyl)-polydimethylsiloxanes (Pn=1-7), α,Ω-bis-(aminoalkyl-diethoxysilyl)-octa-methyltetrasiloxane, 4-amino-3,3,-dimethyl-butyl-trimethoxysilane, and N-ethyl-3-tri-methoxy-silyl-2-methylpropanamine, 3-(diethyl-aminopropyl)-trimethoxysilane combinations of two or more thereof, and the like. Particularly suitable adhesion promoters include bis(alkyltrialkoxysilyl)amines and tris(alkyltrialkoxysilyl) amines including, but not limited to, bis(3-propyltrimethoxysilyl)amine and tris(3-propyltrimethoxysilyl)amine.

Also, it is possible to use derivatives obtained by modifying them, for example, amino-modified silyl polymer, silylated amino polymer, unsaturated aminosilane complex, phenylamino long-chain alkyl silane and aminosilylated silicone. These amino group-containing silane coupling agents may be used alone, or two or more kinds of them may be used in combination.

The curable compositions of the present disclosure may further comprise an alkoxysilane or blend of alkoxysilanes as an adhesion promoter (D). The adhesion promoter may be a combination blend of N-2-aminoethyl-3-aminopropyltrimethoxysilane and 1,3,5-tris(trimethoxy-silylpropyl)isocyanurate and others.

The adhesion promoter (D) may be present in an amount of from about 0.1 to about 5.0 pt. wt. based on 100 parts of the polymer component (A). In one embodiment, the adhesion promoter may be present in an amount of from about 0.15 to about 2.0 pt. wt. In another embodiment, the adhesion promoter may be present in an amount of from about 0.5 to about 1.5 parts per weight (pt. wt.) of the polymer component (A) This defines the amount of (D) in composition of (A) wherein the content of free silanes coming from the endcapping of polymer (A) is smaller than 0.1 wt. %.

The present compositions may further include a filler component (E). The filler component(s) (E) may have different functions, such as to be used as reinforcing or semi-reinforcing filler, i.e., to achieve higher tensile strength after curing having in addition the ability to increase the viscosity establish pseudoplasticity/shear thinning, and thixotropic behavior as well as non-reinforcing fillers acting mainly as a volume extender. The reinforcing fillers are characterized by having a specific surface area of more than 50 m²/g related BET-surface, whereby the semi-reinforcing fillers have a specific surface area in the range of 10-50 m²/g. So-called extending fillers have preferably a specific surface of less than 10 m²/g according to the BET-method and an average particle diameter below 100 um. In one embodiment, the semi-reinforcing filler is a calcium carbonate filler, a silica filler, or a mixture thereof. Examples of suitable reinforcing fillers include, but are not limited to fumed silicas or precipitated silica, which can be partially or completely treated with organosilanes or siloxanes to make them less hydrophilic and decrease the water content or control the viscosity and storage stability of the composition. These fillers are named hydrophobic fillers. Tradenames of representative filler components include AEROSIL™, HDK™, and CAB-O-SIL™.

Examples of suitable extending fillers include, but are not limited to, ground silicas (CELITE), precipitated and colloidal calcium carbonates (which are optionally treated with compounds such as stearate or stearic acid); reinforcing silicas such as fumed silicas, precipitated silicas, silica gels and hydrophobized silicas and silica gels; crushed and ground quartz, cristobalite, alumina, aluminum hydroxide, titanium dioxide, zinc oxide, diatomaceous earth, iron oxide, carbon black, powdered thermoplastics such as acrylonitrile, polyethylene, polypropylene, polytetrafluoroethylene and graphite or clays such as kaolin, bentonite or montmorillonite (treated/untreated), and the like.

The type and amount of filler added depends upon the desired physical properties for the cured silicone/non-silicone composition. As such, the filler may be a single species or a mixture of two or more species. The extending fillers can be present from about 0 to about 300 wt. % of the composition related to 100 parts of component (A). The reinforcing fillers can be present from about 5 to about 60 wt. of the composition related to 100 parts of component ($A_1$, preferably 5 to 30 wt. %.

The inventive compositions may further comprise an acidic compound (F), which, in conjunction with the adhesion promoter and catalyst, has been found to accelerate curing (as compared to curing in the absence of such compounds). The component (F) may be present in an amount of from about 0.01 to about 5 wt. % of the composition. In another embodiment 0.01 to about 8 pt. wt. per 100 pt. wt. of component (A) are used, more preferably 0.02 to 3 pt. wt. per 100 pt. wt. of component (A) and most preferably 0.02 to 1 pt. wt. per 100 pt. wt. of component (A) are used.

The acidic compounds (F) may be chosen from various phosphate esters, phosphonates, phosphites, phosphines, sulfites, pseudohalogenides, branched alkyl carboxylic acids, combinations of two or more thereof, and the like. Without being bound to any particular theory, the acidic compounds (F) may, in one embodiment, be useful as stabilizers in order to ensure a longer storage time when sealed in a cartridge before use in contact with ambient air. Especially alkoxy-terminated polysiloxanes can lose the ability to cure after storage in a cartridge and show e.g. decreased hardness under curing conditions. It may, therefore be useful to add compounds of the formula (8a), which can extend storage time or ability to cure over months:

$$O=P(OR^7)_{3-r}(OH)_r \qquad (8a)$$

whereby r is 0, 1 or 2, and $R^7$ is selected from the group a linear or branched and optionally substituted $C_1$-$C_{30}$-alkyl groups, linear or branched, $C_5$-$C_{14}$-cycloalkyl groups, $C_6$-$C_{14}$-aryl groups, $C_6$-$C_{31}$ alkylaryl groups, linear or branched $C_2$-$C_{30}$-alkenyl groups or linear or branched $C_1$-$C_{30}$-alkoxy-alkyl groups, $C_4$-$C_{300}$-polyalkenylene oxide groups (polyethers), such as MARLOPHOR N5 acid, triorganylsilyl- and diorganyl($C_1$-$C_8$)-alkoxysilyl groups. The phosphates can include also mixtures of primary and secondary esters. Non-limiting examples of suitable phosphonates include 1-hydroxyethane-(1,1-diphosphonate) (HEDP), aminotrimethylene phosphonate (ATMP), nitrolotris(methylphosphonate) (NTMP), diethylenetriamine-pentakismethylene phosphonate (DTPMP), 1,2-diaminoethane-tetrakismethylene phosphonate (EDTMP), and phosphonobutanetricarbonate (PBTC).

In another embodiment, a compound of the formula $O=P(OR^7)_{2-t}(OH)_t$ may be added where t is 1 or 2, and $R^7$ is as defined above or di- or mulitvalent hydrocarbons with one or more amino group.

Another type are phosphonic acid compounds of the formula $O=PR^7(OH)_2$ such as alkyl phosphonic acids preferably hexyl or octyl phosphonic acid.

In one embodiment, the acidic compound may be chosen from a mono ester of a phosphate; a phosphonate of the formula $(R^3O)PO(OH)_2$ $(R^3O)P(OH)_2$, or $R^3P(O)(OH)_2$ where $R^3$ is a $C_1$-$C_8$-alkyl, a $C_2$-$C_{20}$-alkoxyalkyl, phenyl, a $C_7$-$C_{12}$-alkylaryl, a poly($C_2$-$C_4$-alkylene)oxide ester or its mixtures with diesters.

In another embodiment, the acidic compound is a branched alkyl $C_4$-$C_{30}$-alkyl carboxylic acids, including $C_5$-$C_{19}$ acids with alpha tertiary carbon, or a combination of two or more thereof. Examples of such suitable compounds include, but are not limited to, versatic acid, lauric acid, and stearic acid. In one embodiment, the acidic compound may be a mixture comprising branched alkyl carboxylic acids. In one embodiment, the acidic compound is a mixture of mainly tertiary aliphatic $C_{10}$-carboxylic acids.

Applicants have found that the combination of catalyst of the current disclosure, namely metal amidine complexes in combination with carboxylate salts of various amines and an acidic compound may provide a curable composition that provides a cured polymer exhibiting a tack-free time, hardness, and/or cure time comparable to compositions made using tin catalysts, but that provide better adhesion compared to materials made using tin catalysts.

Generally, the acidic component (F) is added in a molar ratio of less than 1 with respect to catalyst (B). In embodiments, the acidic component (F) is added in a molar ratio of (F):(C) of 1:10 to 1:4.

The curable composition may also include auxiliary substances (G) such as plasticizers, pigments, stabilizers, anti-microbial or fungicides, biocides and/or solvents. Preferred plastizers for reactive polyorganosiloxanes (A) are selected from the group of polyorganosiloxanes having chain length of 10-300 siloxy units. Preferred are trimethylsilyl terminated polydimethylsiloxanes having a viscosity of 100-1000 mPas at 25° C. The choice of optional solvents (dispersion media or extenders) may have a role in assuring uniform dispersion of the catalyst, thereby altering curing speed. Such solvents include polar and non-polar solvents such as toluene, hexane, chloroform, methanol, ethanol, isopropyl alcohol, acetone, methylethyl ketone, dimethylformamide (DMF), dimethyl sulfoxide (DMSO). Water can be an additional component (G) to accelerate fast curing 2 part compositions RTV 2-K, whereby the water can be in one part of the 2 compositions. Particularly suitable non-polar solvents include, but are not limited to, toluene, hexane and the like if the solvents should evaporate after cure and application. In another embodiment, the solvents include high boiling hydrocarbons such as alkylbenzenes, phthalic acid esters, arylsulfonic acid esters, trialkyl- or triarylphosphate esters, which have a low vapor pressure and can extend the volume providing lower costs. Examples cited by reference may be those of U.S. Pat. Nos. 6,599,633; 4,312,801. The solvent can be present in an amount of from about 20 to about 99 wt. % of the catalyst composition.

In one embodiment, a composition in accordance with the present disclosure comprises: 100 pt. wt. polymer component (A); about 0.1 to about 10 pt. wt. crosslinker component (C); about 0.01 to about 7 pt. wt. catalyst component (B); about 0.1 to about 5, in one embodiment 0.15-1 pt. wt., of an adhesion promoter component (D); about 0 to about 300 pt. wt. filler component (E); about 0.01 to about 7 pt. wt. of acidic compound (F); optionally 0 to about 15 pt. wt. component ($G_1$), where the pt. wt. of components (B)-(G) are each based on 100 parts of the polymer component (A). In one embodiment the composition comprises the component (F) in an amount of from about 0.01 to about 1 pt. wt. per 100 pt. wt. of component (A). In still another embodiment, the composition comprises the catalyst ($C_1$) in an amount of from about 0.1 to about 0.8 pt. wt. per 100 wt. pt of component (A).

It will be appreciated that the curable compositions may be provided as either a one-part composition or a two-part composition. A one-part composition refers to a composition comprising a mixture of the various components described above. A two-part composition may comprise a first portion and a second portion that are separately stored and subsequently mixed together just prior to application for curing. In one embodiment, a two-part composition comprises a first portion ($X_1$) comprising a polymer component (A) and a crosslinker component (C), and a second portion ($X_2$) comprising the catalyst component (B) comprising a catalyst of the current disclosure, namely metal amidine complexes in combination with carboxylate salts of various amines The first and second portions may include other components (F) and/or (G) as may be desired for a particular purpose or intended use. For example, in one embodiment, the first portion ($X_1$) may optionally comprise an adhesion promoter (D) and/or a filler (E), and the second portion ($X_2$) may optionally comprise auxiliary substances (G), a cure rate modifying component (F), and water (G).

In one embodiment, a two-part composition comprises (i) a first portion comprising the polymer component (A), optionally the filler component (E), and optionally the acidic compound (F); and (ii) a second portion comprising the crosslinker (C), the catalyst component (B), the adhesive promoter (D), and the acidic compound (F), where portions (i) and (ii) are stored separately until applied for curing by mixing of the components (i) and (ii).

An exemplary "Two-Part" composition comprises: a first portion (i) comprising 100 pt. wt of component (A) and 0 to 70 pt. wt of component (E); and a second portion (ii) comprising 0.1 to 5 pt. wt of at least one crosslinker (C); 0.01 to 2 pt. wt. of a catalyst (B); 0.1 to 2 p. wt. of an adhesion promoter (D); and 0.02 to 1 pt. wt. component (F).

The curable compositions may be used in a wide range of applications including as materials for sealing, mold making, adhesives, coatings in sanitary rooms, glazing, prototyping, joint seal between different materials, e.g., sealants between ceramic or mineral surfaces and thermoplastics, paper release, impregnation, and the like. A curable composition in accordance with the present disclosure comprising a catalyst of the current disclosure, namely metal amidine complexes in combination with carboxylate salts of various amines may be suitable for a wide variety of applications such as, for example, a general purpose and industrial sealant, potting compound, caulk, adhesive or coating for construction use, insulated glass (IG), structural glazing (SSG), where glass sheets are fixed and sealed in metal frame; caulks, adhesives for metal plates, car bodies, vehicles, electronic devices and the like. Furthermore, the present composition may be used either as a one-part RTV-1K or as a two-part room temperature vulcanizing (RTV-2K) formulation which can adhere onto broad variety of metal, mineral, ceramic, rubber or plastic surfaces.

The following examples are submitted for the purpose of further illustrating the nature of the present disclosure and should not be construed as a limitation on the scope thereof.

EXAMPLES

Metal Amidine Complex Preparation

[Metal(Amidine)$_2$(Ligand)$_x$] of this disclosure: To a mixture of amidine (2.0 moles) and metal carboxylate, or acetylacetonate (1 mole) was added methanol to make a 50% solution. The mixture was held at 50° C. for 2 hours or until it became a clear solution. The solution was filtered and dried. The example metal amidine catalysts Metal(Amidine)$_2$ (Ligand)$_x$ are listed in TABLE 1. "x" is the oxidation state of the metal.

TABLE 1

| Example Metal Amidine Complex | Physical Form |
| --- | --- |
| 1 Zn(DBN*)$_2$(acetate)$_2$ | white powder |
| 2 Zn(DBN*)$_2$(formate)$_2$ | white powder |
| 3 Zn(DBN*)$_2$(2-ethylhexanoate)$_2$ | clear liquid |
| 4 Zn(DBN*)$_2$(neodecanoate)$_2$ | clear liquid |
| 5 Zn(DBU*)$_2$(acetate)$_2$ | white powder |
| 6 Zn(DBU*)$_2$(formate)$_2$ | white powder |
| 7 Zn(DBU*)$_2$(2-ethylhexanoate)$_2$ | clear liquid |
| 8 Zn(DBU*)$_2$(neodecanoate)$_2$ | clear liquid |
| 9 Zn(1-methylimidazole)$_2$(acetate)$_2$ | white powder |
| 10 Zn(1-methylimidazole)$_2$(formate)$_2$ | white powder |
| 11 Zn(1-methylimidazole)$_2$(2-ethylhexanoate)$_2$ | clear liquid |
| 12 Zn(1-methylimidazole)$_2$(neodecanoate)$_2$ | clear liquid |
| 13 Zn(1,2-dimethylimidazole)$_2$(acetate)$_2$ | white powder |
| 14 Zn(1,2-dimethylimidazole)$_2$(formate)$_2$ | white powder |
| 15 Zn(1,2-dimethylimidazole)$_2$(2-ethylhexanoate)$_2$ | clear liquid |

TABLE 1-continued

| Example Metal Amidine Complex | Physical Form |
| --- | --- |
| 16 Zn(1,2-dimethylimidazole)$_2$(neodecanoate)$_2$ | clear liquid |
| 17 Zn(1-butylimidazole)$_2$(acetate)$_2$ | white powder |
| 18 Zn(1-butylimidazole)$_2$(formate)$_2$ | white powder |
| 19 Zn(1-butylimidazole)$_2$(2-ethylhexanoate)$_2$ | clear liquid |
| 20 Zn(1-butylimidazole)$_2$(neodecanoate)$_2$ | clear liquid |
| 21 Zn(imidazole)$_2$(acetate)$_2$ | white powder |
| 22 Zn(imidazole)$_2$(formate)$_2$ | white powder |
| 23 Zn(imidazole)$_2$(2-ethylhexanoate)$_2$ | clear liquid |
| 24 Zn(imidazole)$_2$(neodecanoate)$_2$ | clear liquid |
| 25 Zn(tetramethylguanidine)$_2$(acetate)$_2$ | white powder |
| 26 Zn(tetramethylguanidine)$_2$(formate)$_2$ | white powder |
| 27 Zn(tetramethylguanidine)$_2$(2-ethylhexanoate)$_2$ | clear liquid |
| 28 Zn(tetramethylguanidine)$_2$(neodecanoate)$_2$ | clear liquid |
| 29 Zn(1,3-diphenylguanidine)$_2$(acetate)$_2$ | white powder |
| 30 Zn(1,3-diphenylguanidine)$_2$(formate)$_2$ | white powder |
| 31 Zn(1,3-diphenylguanidine)$_2$(2-ethylhexanoate)$_2$ | clear liquid |
| 32 Zn(1,3-diphenylguanidine)$_2$(neodecanoate)$_2$ | clear liquid |
| 33 Zn(4,4-dimethyl-2-imidazoline)$_2$(acetate)$_2$ | white powder |
| 34 Zn(4,4-dimethyl-2-imidazoline)$_2$(formate)$_2$ | white powder |
| 35 Zn(4,4-dimethyl-2-imidazoline)$_2$(2-ethylhexanoate)$_2$ | clear liquid |
| 36 Zn(4,4-dimethyl-2-imidazoline)$_2$(neodecanoate)$_2$ | clear liquid |
| 37 Zn(MACKAZOLINE T*)$_2$(acetate)$_2$ | brown liquid |
| 38 Zn(MACKAZOLINE T*)$_2$(formate)$_2$ | brown liquid |
| 39 Zn(MACKAZOLINE T*)$_2$(2-ethylhexanoate)$_2$ | brown liquid |
| 40 Zn(MACKAZOLINE T*)$_2$(neodecanoate)$_2$ | brown liquid |
| 41 Zn(Lindax-1*)$_2$(acetate)$_2$ | brown liquid |
| 42 Zn(Lindax-1*)$_2$(formate)$_2$ | brown liquid |
| 43 Zn(Lindax-1*)$_2$(2-ethylhexanoate)$_2$ | brown liquid |
| 44 Zn(Lindax-1*)$_2$(neodecanoate)$_2$ | brown liquid |
| 45 Zn(1-phenyl guanidine)$_2$(acetate)$_2$ | white powder |
| 46 Zn(1-phenyl guanidine)$_2$(formate)$_2$ | white powder |
| 47 Zn(1-phenyl guanidine)$_2$(2-ethylhexanoate)$_2$ | clear liquid |
| 48 Zn(1-phenyl guanidine)$_2$(neodecanoate)$_2$ | clear liquid |
| 49 Zn(1-methylimidazole)$_2$(acac)$_2$ | white powder |
| 50 Bi(1-methylimidazole)$_2$(acetate)3 | white powder |
| 51 Ca(1-methylimidazole)$_2$(acetate)$_2$ | white powder |
| 52 Cd(1-methylimidazole)$_2$(acetate)$_2$ | white powder |
| 53 La(1-methylimidazole)$_2$(acetate)$_3$ | white powder |
| 54 Zr(1-methylimidazole)$_2$(acetate)$_x$(hydroxide)$_y$, x + y = 4 | white powder |
| 55 Hf(1-methylimidazole)$_2$(acac)$_4$ | yellow liquid |

*DBN: 1,5-Diazabicyclo[4.3.0]non-5-ene
DBU: 1,8-Diazabicyclo[5.4.0]undec-7-ene
Amidines, Zinc Acetate Anhydrous, and Zinc Acetylacetonate [Zn(acac)$_2$] supplied by Aldrich.
Zinc Formate Anhydrous and Zinc 2-Ethylhexanoate supplied by Alfa Aesar.
MACKAZOLINE T ™ supplied by McIntyre Group is tall oil hydroxyethyl imidazoline.
Lindax-1 ™ supplied by Lindau Chemicals Inc. is 1-(2-hydroxypropyl)imidazole Amine/Carboxylic Acid Salt Preparation An amine/carboxylic acid salt according to this disclosure: One mole of an amine was added into a flask. Three moles of an acid were introduced to a flask slowly under agitation. The mixture was held at 50° C. for 2 hours. The solution was filtered. The example amine/carboxylic acid salts are listed in TABLE 2.

TABLE 2

| | Example Amine/Carboxylic Acid Salt |
| --- | --- |
| 1 | DBN/2-ethylhexanoic acid |
| 2 | DBN/neodecanoic acid |
| 3 | DBN/naphthenic acid |
| 4 | DBU/2-ethylhexanoic acid |
| 5 | DBU/neodecanoic acid |
| 6 | DBU/naphthenic acid |
| 7 | 1-methylimidazole/2-ethylhexanoic acid |
| 8 | 1-methylimidazole/neodecanoic acid |
| 9 | 1-methylimidazole/naphthenic acid |
| 10 | 1,2-dimethylimidazole/2-ethylhexanoic acid |
| 11 | 1,2-dimethylimidazole/neodecanoic acid |
| 12 | 1,2-dimethylimidazole/naphthenic acid |
| 13 | 1-butylimidazole/2-ethylhexanoic acid |
| 14 | 1-butylimidazole/neodecanoic acid |
| 15 | 1-butylimidazole/naphthenic acid |

TABLE 2-continued

| Example | Amine/Carboxylic Acid Salt |
|---|---|
| 16 | imidazole/2-ethylhexanoic acid |
| 17 | imidazole/neodecanoic acid |
| 18 | imidazole/naphthenic acid |
| 19 | tetramethylguanidine/2-ethylhexanoic acid |
| 20 | tetramethylguanidine/neodecanoic acid |
| 21 | tetramethylguanidine/naphthenic acid |
| 22 | 1,3-diphenylguanidine/2-ethylhexanoic acid |
| 23 | 1,3-diphenylguanidine/neodecanoic acid |
| 24 | 1,3-diphenylguanidine/naphthenic acid |
| 25 | 4,4-dimethyl-2-imidazoline/2-ethylhexanoic acid |
| 26 | 4,4-dimethyl-2-imidazoline/neodecanoic acid |
| 27 | 4,4-dimethyl-2-imidazoline/naphthenic acid |
| 28 | 3-(diethylamino)propylamine (DMAPA)/2-ethylhexanoic acid |
| 29 | 3-(diethylamino)propylamine (DMAPA)/neodecanoic acid |
| 30 | 3-(diethylamino)propylamine (DMAPA)/naphthenic acid |
| 31 | 1-dimethylamino-2-propanol (DMPA)/2-ethylhexanoic acid |
| 32 | 1-dimethylamino-2-propanol (DMPA)/neodecanoic acid |
| 33 | 1-dimethylamino-2-propanol (DMPA)/naphthenic acid |
| 34 | 2-(dimethylamino)ethanol (DMEA)/2-ethylhexanoic acid |
| 35 | 2-(dimethylamino)ethanol (DMEA)/neodecanoic acid |
| 36 | 2-(dimethylamino)ethanol (DMEA)/naphthenic acid |
| 37 | 1-phenyl guanidine/2-ethylhexanoic acid |
| 38 | 1-phenyl guanidine/neodecanoic acid |
| 39 | 1-phenyl guanidine/naphthenic acid |

Catalyst Preparation

A catalyst according to this disclosure: A metal amidine complex (50% by weight) listed in TABLE 1 was mixed with an amine/carboxylic acid salt (50% by weight) listed in TABLE 2 for 2 hours. The solution was filtered. The example catalysts are listed in TABLE 3.

TABLE 3

| Example | Catalyst |
|---|---|
| 1 | $Zn(DBN)_2$(2-ethylhexanoate)$_2$ + DBN/2-ethylhexanoic acid |
| 2 | $Zn(DBN)_2$(neodecanoate)$_2$ + DBN/neodecanoic acid |
| 3 | $Zn(DBN)_2$(neodecanoate)$_2$ + DBN/naphthenic acid |
| 4 | $Zn(DBU)_2$(2-ethylhexanoate)$_2$ + DBU/2-ethylhexanoic acid |
| 5 | $Zn(DBU)_2$(neodecanoate)$_2$ + DBU DBU/neodecanoic acid |
| 6 | $Zn(DBU)_2$(neodecanoate)$_2$ + DBU/naphthenic acid |
| 7 | $Zn(1\text{-methylimidazole})_2$(2-ethylhexanoate)$_2$ + 1-methylimidazole/2-ethylhexanoic acid |
| 8 | $Zn(1\text{-methylimidazole})_2$(neodecanoate)$_2$ + 1-methylimidazole/neodecanoic acid |
| 9 | $Zn(1\text{-methylimidazole})_2$(neodecanoate)$_2$ + 1-methylimidazole/naphthenic acid |
| 10 | $Zn(1,2\text{-dimethylimidazole})_2$(2-ethylhexanoate)$_2$ + 1,2-dimethylimidazole/2-ethylhexanoic acid |
| 11 | $Zn(1,2\text{-dimethylimidazole})_2$(neodecanoate)$_2$ + 1,2-dimethylimidazole/neodecanoic acid |
| 12 | $Zn(1,2\text{-dimethylimidazole})_2$(neodecanoate)$_2$ + 1,2-dimethylimidazole)/naphthenic acid |
| 13 | $Zn(1\text{-butylimidazole})_2$(2-ethylhexanoate)$_2$ + 1-butylimidazole/2-ethylhexanoic acid |
| 14 | $Zn(1\text{-butylimidazole})_2$(neodecanoate)$_2$ + 1-butylimidazole/neodecanoic acid |
| 15 | $Zn(1\text{-butylimidazole})_2$(neodecanoate)$_2$ + 1-butylimidazole/naphthenic acid |
| 16 | $Zn(imidazole)_2$(2-ethylhexanoate)$_2$ + imidazole/2-ethylhexanoic acid |
| 17 | $Zn(imidazole)_2$(neodecanoate)$_2$ + imidazole/neodecanoic acid |
| 18 | $Zn(imidazole)_2$(neodecanoate)$_2$ + imidazole/naphthenic acid |
| 19 | $Zn(tetramethylguanidine)_2$(2-ethylhexanoate)$_2$ + tetramethylguanidine/2-ethylhexanoic acid |
| 20 | $Zn(tetramethylguanidine)_2$(neodecanoate)$_2$ + tetramethylguanidine/neodecanoic acid |
| 21 | $Zn(tetramethylguanidine)_2$(neodecanoate)$_2$ + tetramethylguanidine/naphthenic acid |
| 22 | $Zn(1,3\text{-diphenylguanidine})_2$(2-ethylhexanoate)$_2$ + 1,3-diphenylguanidine/2-ethylhexanoic acid |
| 23 | $Zn(1,3\text{-diphenylguanidine})_2$(neodecanoate)$_2$ + 1,3-diphenylguanidine/neodecanoic acid |
| 24 | $Zn(1,3\text{-diphenylguanidine})_2$(neodecanoate)$_2$ + 1,3-diphenylguanidine/naphthenic acid |
| 25 | $Zn(4,4\text{-dimethyl-2-imidazoline})_2$(2-ethylhexanoate)$_2$ + 4,4-dimethyl-2-imidazoline/2-ethylhexanoic acid |
| 26 | $Zn(4,4\text{-dimethyl-2-imidazoline})_2$(neodecanoate)$_2$ + 4,4-dimethyl-2-imidazoline/neodecanoic acid |
| 27 | $Zn(4,4\text{-dimethyl-2-imidazoline})_2$(neodecanoate)$_2$ + 4,4-dimethyl-2-imidazoline/naphthenic acid |
| 28 | $Zn(1\text{-methylimidazole})_2$(2-ethylhexanoate)$_2$ + 3-(diethylamino)propylamine (DMAPA)/2-ethylhexanoic acid |
| 29 | $Zn(tetramethylguanidine)_2$(neodecanoate)$_2$ + 3-(diethylamino)propylamine (DMAPA)/neodecanoic acid |
| 30 | $Zn(DBU)_2$(neodecanoate)$_2$ + 3-(diethylamino)propylamine (DMAPA)/neodecanoic acid |
| 31 | $Zn(1\text{-methylimidazole})_2$(2-ethylhexanoate)$_2$ + 1-dimethylamino-2-propanol (DMPA)/2-ethylhexanoic acid |
| 32 | $Zn(tetramethylguanidine)_2$(neodecanoate)$_2$ + 1-dimethylamino-2-propanol (DMPA)/neodecanoic acid |
| 33 | $Zn(DBU)_2$(neodecanoate)$_2$ + 1-dimethylamino-2-propanol (DMPA)/neodecanoic acid |
| 34 | $Zn(1\text{-methylimidazole})_2$(2-ethylhexanoate)$_2$ + 2-(dimethylamino)ethanol (DMEA)/2-ethylhexanoic acid |
| 35 | $Zn(tetramethylguanidine)_2$(neodecanoate)$_2$ + 2-(dimethylamino)ethanol (DMEA)/neodecanoic acid |
| 36 | $Zn(DBU)_2$(neodecanoate)$_2$ + 2-(dimethylamino)ethanol (DMEA)/neodecanoic acid |
| 37 | $Zn(1\text{-methylimidazole})_2$(2-ethylhexanoate)$_2$ + 1-phenyl guanidine/2-ethylhexanoic acid |
| 38 | $Zn(tetramethylguanidine)_2$(neodecanoate)$_2$ + 1-phenyl guanidine/neodecanoic acid |
| 39 | $Zn(DBU)_2$(neodecanoate)$_2$ + 1-phenyl guanidine/neodecanoic acid |

Uncatalyzed Sealant Preparation

An uncatalyzed sealant of this disclosure: Uncatalyzed sealants were prepared according to the procedures listed in TABLE 4. Silane polymers of this disclosure included dimethoxysilane terminated polyester (DMS), trimethoxysilane terminated polyester (TMS), and diethoxysilane terminated polyether urea (DES). Uncatalyzed sealants were packaged in cartridge tubes.

TABLE 4

| Ingredients | Description |
| --- | --- |
| Eastman 168 | Dioctyl terephthalate plasticizer |
| HiPflex 100 | 3 micron treated ground calcium carbonate |
| Ultra Pflex | 0.07 micron treated precipitated calcium carbonate |
| KRT 12-C TiO2 | Titanium dioxide |
| Ethanox 310 | Antioxidant |
| Tinuvin 770 | HALS |
| Mix until uniform, scrape | |
| Mix/vac 1 hr @ 200+° F., Check Moisture | |
| Continue mix/vac until <0.08%, then add: | |
| p-TSI | Monoisocyanate (dessication) |
| Mix 5 min w/ N2, scrape quickly, | |
| Mix/vac 15 min, then add: | |
| Silane Polymer | |
| Mix/vac 15 min, then add: | |
| Aerosil R202 | Fumed silica |
| Mix until uniform, scrape | |
| Mix/vac 15 min | |

Cure Studies in a Dimethoxysilane Terminated Polyester System

Sealant Preparation: Dispense 30 grams of the uncatalyzed sealant (DMS) described in TABLE 5 from cartridge tube into speed mixer container using a caulk gun. Add catalyst and mix on the speed mixer using Program 3 (30 seconds @ 1500 rpm then 2 minutes @ 2200 rpm). Use adjustable doctor blade to apply 3 mm of the blend onto a paper substrate. Monitor cure time by applying a folded 1"×2" strip of paper onto the casting surface and measuring tack after applying weights onto the folded paper strips. Gauge the degree of cure based on the time needed for the casting to be tack free after application of 20, 50, 100, 200, and 500 gram weights. Allow the weights to remain on the paper for approximately 5 seconds before lifting the paper strip. Touch dry time was determined by passing the weight of 20 grams and through dry time was determined by passing the weight of 500 grams. The formulation is tabulated in TABLE 5. The catalyst levels of dioctyltin diacac (Control) and disclosure catalysts were 0.6% and 2.0% based on total formulation, respectively.

TABLE 5

| Ingredient | % by weight |
| --- | --- |
| Eastman 168 | 23.4 |
| HiPflex 100 | 27.7 |
| Ultra Pflex | 22.2 |
| KRT 12-C TiO2 | 3.3 |
| Ethanox 310 | 0.3 |
| Tinuvin 770 | 0.3 |
| p-TSI | 0.8 |
| Dimethoxysilane (DMS) | 20.5 |
| Aerosil R202 | 1.4 |
| Dioctyltin Diacac (Control) | 0.6 |
| Disclosure Catalyst | 2.0 |

TABLE 6

| Examples | Catalysts | % Catalyst | Touch Dry Hours | Through Dry Hours |
| --- | --- | --- | --- | --- |
| 1 | Dioctyltin Diacac (Control) | 0.6 | 1.5 | 4.0 |
| 2 | Zn(1-methylimidazole)$_2$(2-ethylhexanoate)$_2$ + 3-(diethylamino)propylamine (DMAPA)/2-ethylhexanoic acid | 2.0 | 3.0 | 7.5 |
| 3 | Zn(tetramethylguanidine)$_2$(neodecanoate)$_2$ + 3-(diethylamino)propylamine (DMAPA)/neodecanoic acid | 2.0 | 1.5 | 4.5 |
| 4 | Zn(DBU)$_2$(neodecanoate)$_2$ + 3-(diethylamino)propylamine (DMAPA)/neodecanoic acid | 2.0 | 1.5 | 4.0 |
| 5 | Zn(1-methylimidazole)$_2$(2-ethylhexanoate)$_2$ + 1-dimethylamino-2-propanol (DMPA)/2-ethylhexanoic acid | 2.0 | 3.0 | 8.5 |
| 6 | Zn(tetramethylguanidine)$_2$(neodecanoate)$_2$ + 1-dimethylamino-2-propanol (DMPA)/neodecanoic acid | 2.0 | 2.5 | 7.0 |
| 7 | Zn(DBU)$_2$(neodecanoate)$_2$ + 1-dimethylamino-2-propanol (DMPA)/neodecanoic acid | 2.0 | 2.5 | 6.5 |
| 8 | Zn(1-methylimidazole)$_2$(2-ethylhexanoate)$_2$ + 2-(dimethylamino)ethanol (DMEA)/2-ethylhexanoic acid | 2.0 | 3.0 | 7.5 |
| 9 | Zn(tetramethylguanidine)$_2$(neodecanoate)$_2$ + 2-(dimethylamino)ethanol (DMEA)/neodecanoic acid | 2.0 | 2.5 | 7.0 |
| 10 | Zn(DBU)$_2$(neodecanoate)$_2$ + 2-(dimethylamino)ethanol (DMEA)/neodecanoic acid | 2.0 | 2.5 | 8.0 |

Examples 1-10 in TABLE 6 demonstrate that the mixtures of zinc amidine complexes (50% by weight) and amine/carboxylic acid salts (50% by weight) are effective catalysts for a dimethoxysilane terminated polyester (DMS) based sealant.

Cure Studies in a Trimethoxysilane Terminated Polyester System

Sealant Preparation: Dispense 30 grams of the uncatalyzed sealant (TMS) described in TABLE 7 from cartridge tube into speed mixer container using a caulk gun. Add catalyst and mix on the speed mixer using Program 3 (30 seconds @ 1500 rpm then 2 minutes @ 2200 rpm). Use adjustable doctor blade to apply 3 mm of the blend onto a paper substrate. Monitor cure time by applying a folded 1"×2" strip of paper onto the casting surface and measuring tack after applying weights onto the folded paper strips. Gauge the degree of cure based on the time needed for the casting to be tack free after application of 20, 50, 100, 200, and 500 gram weights. Allow the weights to remain on the paper for approximately 5 seconds before lifting the paper strip. Touch dry time was determined by passing the weight of 20 grams and through dry time was determined by passing the weight of 500 grams. The formulation is tabulated in TABLE 5. The catalyst levels of dioctyltin diacac (Control) and disclosure catalysts were 0.6% and 2.0% based on total formulation, respectively.

TABLE 7

| Ingredient | % by weight |
| --- | --- |
| Eastman 168 | 23.4 |
| HiPflex 100 | 27.7 |
| Ultra Pflex | 22.2 |
| KRT 12-C TiO2 | 3.3 |
| Ethanox 310 | 0.3 |
| Tinuvin 770 | 0.3 |
| p-TSI | 0.8 |
| Trimethoxysilane (TMS) | 20.5 |
| Aerosil R202 | 1.4 |
| Dioctyltin Diacac (Control) | 0.6 |
| Disclosure Catalyst | 2.0 |

TABLE 8

| Examples | Catalysts | % Catalyst | Touch Dry Hours | Through Dry Hours |
| --- | --- | --- | --- | --- |
| 11 | Dioctyltin Diacac (Control) | 0.6 | 1.0 | 2.0 |
| 12 | Zn(1-methylimidazole)$_2$(2-ethylhexanoate)$_2$ + 3-(diethylamino)propylamine (DMAPA)/2-ethylhexanoic acid | 2.0 | 3.0 | 7.0 |
| 13 | Zn(tetramethylguanidine)$_2$(neodecanoate)$_2$ + 3-(diethylamino)propylamine (DMAPA)/neodecanoic acid | 2.0 | 1.5 | 3.0 |
| 14 | Zn(DBU)$_2$(neodecanoate)$_2$ + 3-(diethylamino)propylamine (DMAPA)/neodecanoic acid | 2.0 | 1.5 | 2.5 |
| 15 | Zn(1-methylimidazole)$_2$(2-ethylhexanoate)$_2$ + 1-dimethylamino-2-propanol (DMPA)/2-ethylhexanoic acid | 2.0 | 3.0 | 7.5 |
| 16 | Zn(tetramethylguanidine)$_2$(neodecanoate)$_2$ + 1-dimethylamino-2-propanol (DMPA)/neodecanoic acid | 2.0 | 2.5 | 4.0 |
| 17 | Zn(DBU)$_2$(neodecanoate)$_2$ + 1-dimethylamino-2-propanol (DMPA)/neodecanoic acid | 2.0 | 2.5 | 4.5 |
| 18 | Zn(1-methylimidazole)$_2$(2-ethylhexanoate)$_2$ + 2-(dimethylamino)ethanol (DMEA)/2-ethylhexanoic acid | 2.0 | 3.0 | 8.0 |
| 19 | Zn(tetramethylguanidine)$_2$(neodecanoate)$_2$ + 2-(dimethylamino)ethanol (DMEA)/neodecanoic acid | 2.0 | 2.5 | 4.0 |
| 20 | Zn(DBU)$_2$(neodecanoate)$_2$ + 2-(dimethylamino)ethanol (DMEA)/neodecanoic acid | 2.0 | 2.5 | 4.5 |

Examples 11-20 in TABLE 8 demonstrate that the mixtures of zinc amidine complexes (50% by weight) and amine/carboxylic acid salts (50% by weight) are effective catalysts for a trimethoxysilane terminated polyester (TMS) based sealant.

Cure Studies in a Diethoxysilane Terminated Polyether Urea System

Sealant Preparation: Dispense 30 grams of the uncatalyzed sealant (DES) described in TABLE 9 from cartridge tube into speed mixer container using a caulk gun. Add catalyst and mix on the speed mixer using Program 3 (30 seconds @ 1500 rpm then 2 minutes @ 2200 rpm). Use adjustable doctor blade to apply 3 mm of the blend onto a paper substrate. Monitor cure time by applying a folded 1"×2" strip of paper onto the casting surface and measuring tack after applying weights onto the folded paper strips. Gauge the degree of cure based on the time needed for the casting to be tack free after application of 20, 50, 100, 200, and 500 gram weights. Allow the weights to remain on the paper for approximately 5 seconds before lifting the paper strip. Touch dry time was determined by passing the weight of 20 grams and through dry time was determined by passing the weight of 500 grams. The formulation is tabulated in TABLE 9. The catalyst levels of dioctyltin diacac (Control) and disclosure catalysts were 0.6% and 2.0% based on total formulation, respectively.

TABLE 9

| Ingredient | % by weight |
|---|---|
| Eastman 168 | 23.4 |
| HiPflex 100 | 27.7 |
| Ultra Pflex | 22.2 |
| KRT 12-C TiO2 | 3.3 |
| Ethanox 310 | 0.3 |
| Tinuvin 770 | 0.3 |
| p-TSI | 0.8 |
| Diethoxysilane (DES) | 20.5 |
| Aerosil R202 | 1.4 |
| Dioctyltin Diacac (Control) | 0.6 |
| Disclosure Catalyst | 2.0 |

TABLE 10

| Examples | Catalysts | % Catalyst | Touch Dry Hours | Through Dry Hours |
|---|---|---|---|---|
| 21 | Dioctyltin Diacac (Control) | 0.6 | 120+ | 120+ |
| 22 | Zn(1-methylimidazole)$_2$(2-ethylhexanoate)$_2$ + 3-(diethylamino)propylamine (DMAPA)/2-ethylhexanoic acid | 2.0 | 8 | 24 |
| 23 | Zn(tetramethylguanidine)$_2$(neodecanoate)$_2$ + 3-(diethylamino)propylamine (DMAPA)/neodecanoic acid | 2.0 | 3 | 8 |
| 24 | Zn(DBU)$_2$(neodecanoate)$_2$ + 3-(diethylamino)propylamine (DMAPA)/neodecanoic acid | 2.0 | 3 | 8 |
| 25 | Zn(1-methylimidazole)$_2$(2-ethylhexanoate)$_2$ + 1-dimethylamino-2-propanol (DMPA)/2-ethylhexanoic acid | 2.0 | 8 | 32 |
| 26 | Zn(tetramethylguanidine)$_2$(neodecanoate)$_2$ + 1-dimethylamino-2-propanol (DMPA)/neodecanoic acid | 2.0 | 6 | 16 |
| 27 | Zn(DBU)$_2$(neodecanoate)$_2$ + 1-dimethylamino-2-propanol (DMPA)/neodecanoic acid | 2.0 | 5 | 16 |
| 28 | Zn(1-methylimidazole)$_2$(2-ethylhexanoate)$_2$ + 2-(dimethylamino)ethanol (DMEA)/2-ethylhexanoic acid | 2.0 | 8 | 32 |
| 29 | Zn(tetramethylguanidine)$_2$(neodecanoate)$_2$ + 2-(dimethylamino)ethanol (DMEA)/neodecanoic acid | 2.0 | 7 | 16 |
| 30 | Zn(DBU)$_2$(neodecanoate)$_2$ + 2-(dimethylamino)ethanol (DMEA)/neodecanoic acid | 2.0 | 6 | 16 |

Examples 21-30 in TABLE 10 demonstrate that the mixtures of zinc amidine complexes (50% by weight) and amine/carboxylic acid salts (50% by weight) are effective catalysts for a diethoxysilane terminated polyether urea (DES) based sealant.

What is claimed is:
1. A tin-free curable composition, comprising:
(A) one or more organic polymers having a reactive-silicon-containing group, wherein at least one polymer has a main chain skeleton selected from the group consisting of polyoxyalkylene polymers, saturated hydrocarbon polymers, and (meth)acrylic acid ester polymers;
(B) from 0.001 to 20 parts by weight for 100 parts by weight of the organic polymer(s) (A) of a silanol condensation catalyst consisting of one or more metal amidine complexes and one or more amine carboxylate salts,
(C) a crosslinker or chain extender chosen from an alkoxylate, an alkoxysiloxane, an oximosilane, an oximosiloxane, an epoxysilane, an epoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane, an alkoxycarbamatosiloxane, and combinations of two or more thereof;
(D) at least one adhesion promoter chosen from a silane or siloxane other than the compounds listed under (C);
(E) optionally, a filler component; and
(F) optionally, at least one acidic compound chosen from a phosphate ester, a phosphonate, a phosphite, a phosphine, a sulfite, a pseudohalogenide, a branched alkyl carboxylic acid, and a combination of two or more thereof;

wherein at least one part of the reactive-silicon-containing group(s) of the organic polymer(s) (A) is represented by general formula I

wherein each $R^1$ independently represents a substituted or unsubstituted hydrocarbon group having 1 to 20 carbon atoms, or a triorganosiloxy group represented by $(R')_3$SiO— wherein R's are each a substituted or unsubstituted hydrocarbon group having 1 to 20 carbon atoms, and R's may be the same or different, each $R^2$ are independently a hydrogen atom, or a substituted or unsubstituted hydrocarbon group having 1 to 10 carbon atoms, each X are independently a hydroxyl group, or a hydrolyzable group, a is 0, 1 or 2, and m is 0 or an integer of from 1 to 19, or general formula

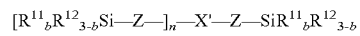

wherein X' is chosen from a polyurethane; a polyester; a polyether; a polycarbonate, a polyolefin, a polypropylene, a polyesterether; and a polyorganosiloxane having units of $R^3SiO_{1/2}$, $R^2SiO$, $RSiO_{3/2}$, and/or $SiO_{4/2}$, n is 0 to 100, b is 0 to 2, R and $R^{11}$ can be identical or different at the same Si-atom and chosen from a $C_1$-$C_{10}$-alkyl, a $C_1$-$C_{10}$ alkyl substituted with one or more of Cl, F, N, O or S, a phenyl, a $C_7$-$C_{16}$ alkylaryl, a $C_7$-$C_{16}$ arylalkyl, a $C_2$-$C_4$ polyalkylene ether, or a combination of two or more thereof, $R^{12}$ is chosen from OH, a $C_1$-$C_8$-alkoxy, a $C_2$-$C_{18}$-alkoxyalkyl, an oximoalkyl, an enoxyalkyl, an aminoalkyl, a carboxyalkyl, an amidoalkyl, an amidoaryl, a carbamatoalkyl, or a combination of two or more thereof, and Z is a bond, a divalent unit selected from the group of a $C_1$-$C_8$ alkylene, or O;

wherein the one or more amine carboxylate salts is derived from a phenyl guanidine represented by formulae

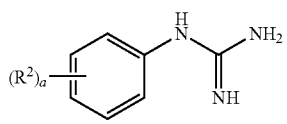

wherein the each $R^2$ independently is hydrogen, halogen, hydroxyl, an amino group, a nitro group, a cyano group, a sulfonic acid group, or an organic group; and a is an integer of 0 to 5.

2. The tin-free curable composition according to claim 1, wherein X is an alkoxy group.

3. The tin-free curable composition according to claim 2, wherein the alkoxy group is a methoxy group.

4. The tin-free curable composition according to claim 2, wherein the alkoxy group is an ethoxy group.

5. The tin-free curable composition according to claim 1, wherein the ratio of the organic polymer having the group represented by the general formula (I) in the organic polymer(s) of the component (A) is 10% or more by weight.

6. The tin-free curable composition according to claim 1, wherein the polyoxyalkylene polymers are polyoxypropylene polymers.

7. The tin-free curable composition according to claim 1, wherein a silane coupling agent (C) is contained in an amount of 0.01 to 20 parts by weight for 100 parts by weight of the organic polymer(s) (A).

8. A one-part type curable composition comprising the tin-free curable composition according to claim 1.

9. A sealant comprising the tin-free curable composition according to claim 1.

10. An adhesive comprising the tin-free curable composition according to claim 1.

11. The tin-free curable composition of claim 1, wherein the metal amidine complex is of the chemical formula M(amidine)$_w$(carboxylate)$_2$, wherein w is an integer from 1 to 4.

12. The tin-free curable composition of claim 1, wherein the metal of the metal amidine complex is zinc, lithium, sodium, magnesium, barium, potassium, calcium, bismuth, cadmium, aluminum, zirconium, hafnium, titanium, lanthanum, vanadium, niobium, tantalum, tellurium, molybdenum, tungsten, or cesium.

13. The tin-free curable composition of claim 11, wherein the metal of the metal amidine complex is zinc, lithium, sodium, magnesium, barium, potassium, calcium, bismuth, cadmium, aluminum, zirconium, hafnium, titanium, lanthanum, vanadium, niobium, tantalum, tellurium, molybdenum, tungsten, or cesium.

14. The tin-free curable composition of claim 1, wherein the amidine of the metal amidine complex is an amidine of formulae I-VIII

(I)

(II)

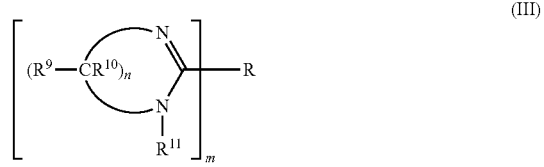

(III)

(IV)

(V)

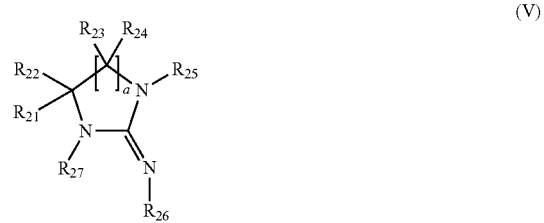

(VI)

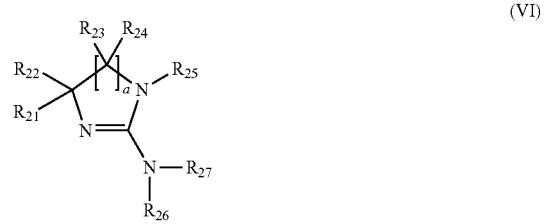

(VII)

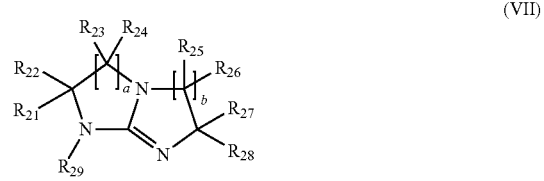

-continued

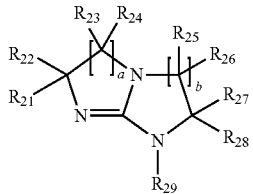
(VIII)

wherein $R^1$ is hydrogen, $C_1$-$C_{36}$ alkyl, $C_2$-$C_{25}$ alkyl interrupted by oxygen or sulfur, $C_2$-$C_{24}$ alkenyl, $C_4$-$C_{15}$ cycloalkyl which is unsubstituted or substituted by $C_1$-$C_4$ allyl and/or carboxyl, $C_5$-$C_{15}$ cycloalkenyl which is unsubstituted or substituted by $C_1$-$C_4$ alkyl and/or carboxyl, $C_{13}$-$C_{26}$ polycycloalkyl, $C_7$-$C_9$ phenylalkyl which is unsubstituted or substituted on the phenyl ring by $C_1$-$C_4$ alkyl, an amine group which is optionally substituted, or a hydroxyl group which is optionally etherified with a hydrocarbyl group having up to 8 carbon atoms;
$R^2$ and $R^3$ are each independently hydrogen or $C_1$-$C_{25}$ alkyl, $C_2$-$C_{25}$ alkyl interrupted by oxygen or sulfur, $C_2$-$C_{24}$ alkenyl, $C_4$-$C_{15}$ cycloalkyl which is unsubstituted or substituted by $C_1$-$C_4$ allyl and/or carboxyl, $C_5$-$C_{15}$ cycloalkenyl which is unsubstituted or substituted by $C_1$-$C_4$ alkyl and/or carboxyl, $C_{13}$-$C_{26}$ polycycloalkyl, $C_7$-$C_9$ phenylalkyl which is unsubstituted or substituted on the phenyl ring by $C_1$-$C_4$ alkyl, or $R^2$ and $R^3$ are joined to one another by an N=C—N linkage to form a heterocyclic ring or a fused bicyclic ring with one or more heteroatoms;
$R^4$ is hydrogen, or $C_1$-$C_{36}$ alkyl, $C_1$-$C_{36}$ alkyl interrupted by oxygen or sulfur, $C_2$-$C_{24}$ alkenyl, $C_4$-$C_{15}$ cycloalkyl which is unsubstituted or substituted by $C_1$-$C_4$ allyl and/or carboxyl, $C_5$-$C_{15}$ cycloalkenyl which is unsubstituted or substituted by $C_1$-$C_4$ alkyl and/or carboxyl, $C_{13}$-$C_{26}$ polycycloalkyl, $C_7$-$C_9$ phenylalkyl which is unsubstituted or substituted on the phenyl ring by $C_1$-$C_4$ alkyl or a hydroxyl group which can be optionally etherified with a hydrocarbyl group having up to 8 carbon atoms;
$R^5$, $R^6$, $R^7$, and $R^8$ are independently hydrogen, alkyl, substituted alkyl, hydroxyalkyl, aryl, aralkyl, cycloalkyl, heterocyclics, ether, thioether, halogen, —N(R)$_2$, polyethylene polyamines, nitro groups, keto groups, ester groups, or carbonamide groups optionally substituted with alkyl, substituted alkyl, aryl, aralkyl, cycloalkyl, heterocycles, ether, thioether, halogen, —N(R)$_2$, polyethylene polyamines, nitro groups, keto groups or ester groups;
$R^9$, $R^{10}$ and $R^{11}$ are independently hydrogen, alkyl, alkenyl or alkoxy of 1 to 36 carbons, cycloalkyl of 6 to 32 carbons, alkylamino of 1 to 36 carbon atoms, cycloalkyl of 5 to 12 carbon atoms, phenyl, hydroxyalkyl, hydroxycycloalkyl of 1 to 20 carbon atoms, methoxyalkyl of 1 to 20 carbon atoms, aralkyl of 7 to 9 carbon atoms wherein the aryl group of the aralkyl is optionally further substituted by alkyl of 1 to 36 carbon atoms, ether, thioether, halogen, —N(R")$_2$, polyethylene polyamines, nitro groups, keto groups, ester groups, or carbonamide groups, and wherein the alkyl group of the aralkyl is optionally substituted with alkyl, substituted alkyl, aryl, aralkyl, cycloalkyl, heterocyclics, ether, thioether, halogen, —N(R")$_2$, polyethylene polyamines, nitro groups, keto groups or ester groups, wherein R" of —N(R")$_2$ is alkyl, alkylene, aryl, aralkyl, cycloalkyl or heterocyclic radical, optionally substituted with halogen, nitro, alkyl, alkoxy or amino, and, m=1 or 2; wherein when m=1, R is hydrogen or a plurality of radicals optionally joined by hetero atoms O, N or S; n=2 or 3;
$R_{21}$-$R_{29}$ are independently hydrogen, alkyl, cycloalkyl, aryl, aromatic, organometallic, a polymeric structure or together can form a cycloalkyl, aryl, or an aromatic structure;
a is 1, 2 or 3; and
b is 1, 2 or 3.

15. The tin-free curable composition of claim 13, wherein the metal of the metal amidine complex is zinc or bismuth.

16. The tin-free curable composition of claim 14, wherein the amidine of the metal amidine complex is an amidine of formula II or IV.

17. The tin-free curable composition of claim 16, wherein the amidine is 1,1,3,3-tetramethyl guanidine or 1-methylimidazole.

18. The tin-free curable composition of claim 14, wherein the carboxylate of the metal amidine complex is heptanoate, hexanoate, laurate, oleate, versatate, octoate, neodecanoate, naphthenate, stearate, or oxalate.

19. The tin-free curable composition of claim 1, wherein the metal amidine complex is of the chemical formula metal (amidine)$_2$(carboxylate)x, wherein x is the oxidation state of the metal.

20. The tin-free curable composition according to claim 14 wherein the amidine is at least one member selected from the group consisting of 1,2-dimethyl-1,4,5,6-tetrahydropyrimidine, 1-ethyl-2-methyl-1,4,5,6-tetrahydropyrimidine, 1,2-diethyl-1,4,5,6-tetrahydropyrimidine, 1-n-propyl-2-methyl-1,4,5,6-tetrahydropyrimidine, 1-isopropyl-2-methyl-1,4,5,6-tetrahydropyrimidine, 1-ethyl-2-n-propyl-1,4,5,6-tetrahydropyrim idine and 1-ethyl-2-isopropyl-1,4,5,6-tetrahydropyrimidine.

21. The tin-free curable composition according to claim 14 wherein the amidine is at least one guanidine compound selected from the group consisting of 7-methyl-1,5,7-triazabicyclo[4.4.0]dec-5-ene, 7-ethyl-1,5,7-triazabicyclo[4.4.0]dec-5-ene, 7-n-propyl-1,5,7-triazabicyclo[4.4.0]dec-5-ene, 7-isopropyl-1,5,7-triazabicyclo[4.4.0]dec-5-ene, 7-n-butyl-1,5,7-triazabicyclo[4.4.0]dec-5-ene, 7-isobutyl-1,5,7-triazabicyclo[4.4.0]dec-5-ene, 7-tert-butyl-1,5,7-triazabicyclo[4.4.0]dec-5-ene, 7-cyclohexyl-1,5,7-triazabicyclo[4.4.0]dec-5-ene, 7-n-octyl-1,5,7-triazabicyclo[4.4.0]dec-5-ene, 7-2-ethylhexyl-1,5,7-triazabicyclo[4.4.0]dec-5-ene and 7-decyl-1,5,7-triazabicyclo[4.4.0]dec-5-ene.

22. The tin-free curable composition of claim 1, wherein the one or more organic polymers having a reactive-silicon-containing group has the formula [$R^1_a R^2_{3-a}$Si—Z—]$_n$—X—Z—Si$R^1_a R^2_{3-a}$.

23. The tin-free curable composition of claim 1, wherein the crosslinker component (C) is chosen from tetraethylorthosilicate (TEOS), a polycondensate of TEOS; methyltrimethoxysilane (MTMS); vinyl-trimethoxysilane; methylvinyldimethoxysilane; dimethyldiethoxysilane; vinyltriethoxysilane; tetra-n-propylorthosilicate; vinyltris(methylethylketoxime)silane; methyltris(methylethylketoxime)silane; trisacetamidomethylsilane; bisacetamidodimethylsilane; tris(N-methyl-acetamido)methylsilane; bis(N-methylacetamido)dimethylsilane; (N-methyl-acetamido)methyldialkoxysilane; trisbenzamidomethylsilane; trispropenoxymethylsilane; alkyldialkoxyamidosilanes; alkylalkoxybisamidosilanes; $CH_3Si(OC_2H_5)_{1-2}$(NHCOR)$_{2-1}$; (CH3Si(OC$_2$H$_5$)(NCH$_3$COC$_6$H$_5$)$_2$; $CH_3Si$ (OC$_2$H$_5$)—(NHCOC$_6$H$_5$)$_2$; methyldimethoxy(ethylmethylketoximo)silane; methylmethoxybis-(ethylmethylketoximo)silane; methyldimethoxy(acetaldoximo)silane; methyldimethoxy(N-methylcarbamato)silane; ethyldimethoxy(N-methylcarbamato)silane; methyldimethoxyisopropenoxysilane; trimethoxyisopropenoxysilane; methyltri-isopropenoxysilane; methyldimethoxy(but-2-ene-2-oxy)silane; methyldimethoxy(1-phenylethenoxy)silane; methyldimethoxy-2(1-carboethoxypropenoxy)silane; methylmethoxydi-N-methylaminosilane; vinyldimethoxymethylaminosilane; tetra-N,N-diethylaminosilane; methyldimethoxymethylaminosilane; methyltricyclohexylaminosilane; methyldimethoxyethylaminosilane; dimethyldi-N,N-dimethylaminosilane; methyldimethoxyisopropylaminosilane; dimethyldi-N,N-diethylaminosilane; ethyldimethoxy(N-ethylpropionamido)silane; methyldimethoxy(N-methylacetamido)silane; methyltris(N-methylacetamido)silane; ethyldimethoxy(N-methylacetamido)silane; methyltris(N-methylbenzamido)silane; methylmethoxybis(N-methylacetamido)silane; methyldimethoxy(caprolactamo)silane; trimethoxy(N-methylacetamido)silane; methyldimethoxyethylacetimidatosilane; methyldimethoxypropylacetimidatosilane; methyldimethoxy(N,N',N',N'-trimethylureido)silane; methyldimethoxy(N-allyl-N',N',N'-dimethylureido)silane; methyldimethoxy(N-phenyl-N',N'-dimethylureido)silane; methyldimethoxyisocyanatosilane; dimethoxydiisocyanatosilane; methyldimethoxythioisocyanatosilane; methylmethoxydithioisocyanatosilane, or a combination of two or more thereof.

24. The tin-free curable composition of claim 1, wherein the adhesion promoter component (D) is chosen from an aminoalkyltrialkoxysilane, an aminoalkylalkyldialkoxysilane, a bis(alkyltrialkoxysilyl)amine, a tris(alkyltrialkoxysilyl)amine, a tris(alkyltrialkoxysilyl)cyanuarate, and a tris (alkyltrialkoxysilyl)isocyanuarate, or a combination of two or more thereof.

25. The tin-free curable composition of claim 1, wherein the silanol condensation catalyst is present at from about 0.01 to about 7 parts by weight per 100 parts by weight of the one or more organic polymers having a reactive-silicon-containing group.

26. The tin-free curable composition of claim 1, wherein the silanol condensation catalyst is present at from about 0.05 to about 5 parts by weight per 100 parts by weight of the one or more organic polymers having a reactive-silicon-containing group.

27. The tin-free curable composition of claim 1, wherein the amine carboxylate salt has a molar ratio of from about 1.0 to 10.0 of carboxylic acid per mole of amine.

28. The tin-free curable composition of claim 27, wherein the amine carboxylate salt has a molar ratio of from about 1.0 to 4.0 of carboxylic acid per mole of amine.

29. A tin-free curable composition, comprising:
(A) one or more organic polymers having a reactive-silicon-containing group, wherein at least one polymer has a main chain skeleton selected from the group consisting of polyoxyalkylene polymers, saturated hydrocarbon polymers, and (meth)acrylic acid ester polymers;
(B) from 0.001 to 20 parts by weight for 100 parts by weight of the organic polymer(s) (A) of a silanol condensation catalyst consisting of one or more metal amidine complexes and one or more amine carboxylate salts,
(C) a crosslinker or chain extender chosen from an alkoxylate, an alkoxysiloxane, an oximosilane, an oximosiloxane, an epoxysilane, an epoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane, an alkoxycarbamatosiloxane, and combinations of two or more thereof;
(D) at least one adhesion promoter chosen from a silane or siloxane other than the compounds listed under (C);
(E) optionally, a filler component; and
(F) optionally, at least one acidic compound chosen from a phosphate ester, a phosphonate, a phosphite, a phosphine, a sulfite, a pseudohalogenide, a branched alkyl carboxylic acid, and a combination of two or more thereof;
wherein at least one part of the reactive-silicon-containing group(s) of the organic polymer(s) (A) is represented by general formula I

wherein each $R^1$ independently represents a substituted or unsubstituted hydrocarbon group having 1 to 20 carbon atoms, or a triorganosiloxy group represented by (R')$_3$SiO— wherein R's are each a substituted or unsubstituted hydrocarbon group having 1 to 20 carbon atoms, and R's may be the same or different, each $R^2$ are independently a hydrogen atom, or a substituted or unsubstituted hydrocarbon group having 1 to 10 carbon atoms, each X are independently a hydroxyl group, or a hydrolyzable group, a is 0, 1 or 2, and m is 0 or an integer of from 1 to 19,
or general formula

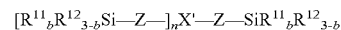

wherein X' is chosen from a polyurethane; a polyester; a polyether; a polycarbonate, a polyolefin, a polypropylene, a polyesterether; and a polyorganosiloxane having units of $R^3SiO_{1/2}$, $R^2SiO$, $RSiO_{3/2}$, and/or $SiO_{4/2}$, n is 0 to 100, b is 0 to 2, R and $R^{11}$ can be identical or different at the same Si-atom and chosen from a $C_1$-$C_{10}$-alkyl, a $C_1$-$C_{10}$ alkyl substituted with one or more of Cl, F, N, O or S, a phenyl, a $C_7$-$C_{16}$ alkylaryl, a $C_7$-$C_{16}$ arylalkyl, a $C_2$-$C_4$ polyalkylene ether, or a combination of two or more thereof, $R^{12}$ is chosen from OH, a $C_1$-$C_8$-alkoxy, a $C_2$-$C_{18}$-alkoxyalkyl, an oximoalkyl, an enoxyalkyl, an aminoalkyl, a carboxyalkyl, an amidoalkyl, an amidoaryl, a carbamatoalkyl, or a combination of two or more thereof, and Z is a bond, a divalent unit selected from the group of a $C_1$-$C_8$ alkylene, or O;
wherein the one or more amine carboxylate salts is derived from an amine compound selected from monoethanolamine, 3-hydroxypropylamine, 2-(2-aminoethylamino)ethanol, 1-dimethylamino-2-propanol, diethylamino-2-propanol, 2-(dimethylamino)ethanol, 2-(diethylamino)ethanol, 2-dimethylamino-2-methyl-1-propanol, ethylenediamine, N-methylethylenediamine, 1,3-propanediamine, N-methyl-1,3-propanediamine, N,N'-dimethyl-1,3-propanediamine, 3-(diethylamino)propyl amine, 3-(dimethylamino)propyl amine and diethylenetriamine.

30. The tin-free curable composition according to claim 29, wherein X is an alkoxy group.

31. The tin-free curable composition according to claim 29, wherein the ratio of the organic polymer having the group represented by the general formula (I) in the organic polymer(s) of the component (A) is 10% or more by weight.

32. The tin-free curable composition according to claim 29, wherein the polyoxyalkylene polymers are polyoxypropylene polymers.

33. The tin-free curable composition according to claim 29, wherein a silane coupling agent (C) is contained in an amount of 0.01 to 20 parts by weight for 100 parts by weight of the organic polymer(s) (A).

34. A one-part type curable composition comprising the tin-free curable composition according to claim 29.

35. A sealant comprising the tin-free curable composition according to claim 29.

36. An adhesive comprising the tin-free curable composition according to claim 29.

37. The tin-free curable composition of claim 29, wherein the metal amidine complex is of the chemical formula M(amidine)$_w$(carboxylate)$_2$, wherein w is an integer from 1 to 4.

38. The tin-free curable composition of claim 29, wherein the metal of the metal amidine complex is zinc, lithium, sodium, magnesium, barium, potassium, calcium, bismuth, cadmium, aluminum, zirconium, hafnium, titanium, lanthanum, vanadium, niobium, tantalum, tellurium, molybdenum, tungsten, or cesium.

39. The tin-free curable composition of claim 29, wherein the amidine of the metal amidine complex is an amidine of formulae I-VIII

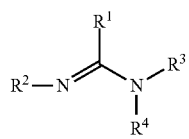 (I)

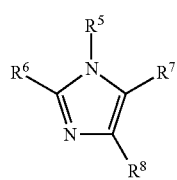 (II)

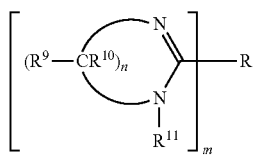 (III)

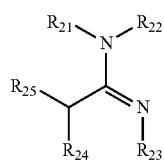 (IV)

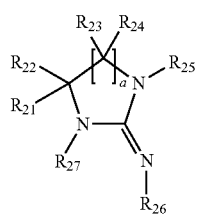 (V)

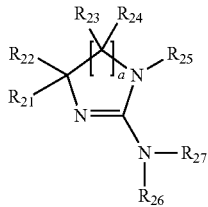 (VI)

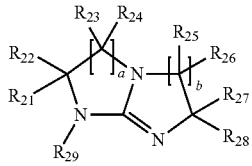 (VII)

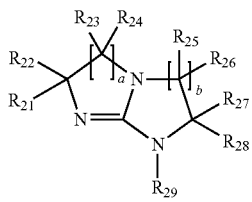 (VIII)

wherein $R^1$ is hydrogen, $C_1$-$C_{36}$ alkyl, $C_2$-$C_{25}$ alkyl interrupted by oxygen or sulfur, $C_2$-$C_{24}$ alkenyl, $C_4$-$C_{15}$ cycloalkyl which is unsubstituted or substituted by $C_1$-$C_4$ allyl and/or carboxyl, $C_5$-$C_{15}$ cycloalkenyl which is unsubstituted or substituted by $C_1$-$C_4$ alkyl and/or carboxyl, $C_{13}$-$C_{26}$ polycycloalkyl, $C_7$-$C_9$ phenylalkyl which is unsubstituted or substituted on the phenyl ring by $C_1$-$C_4$ alkyl, an amine group which is optionally substituted, or a hydroxyl group which is optionally etherified with a hydrocarbyl group having up to 8 carbon atoms;

$R^2$ and $R^3$ are each independently hydrogen or $C_1$-$C_{25}$ alkyl, $C_2$-$C_{25}$ alkyl interrupted by oxygen or sulfur, $C_2$-$C_{24}$ alkenyl, $C_4$-$C_{15}$ cycloalkyl which is unsubstituted or substituted by $C_1$-$C_4$ allyl and/or carboxyl, $C_5$-$C_{15}$ cycloalkenyl which is unsubstituted or substituted by $C_1$-$C_4$ alkyl and/or carboxyl, $C_{13}$-$C_{26}$ polycycloalkyl, $C_7$-$C_9$ phenylalkyl which is unsubstituted or substituted on the phenyl ring by $C_1$-$C_4$ alkyl, or $R^2$ and $R^3$ are joined to one another by an N=C—N linkage to form a heterocyclic ring or a fused bicyclic ring with one or more heteroatoms;

$R^4$ is hydrogen, or $C_1$-$C_{36}$ alkyl, $C_1$-$C_{36}$ alkyl interrupted by oxygen or sulfur, $C_2$-$C_{24}$ alkenyl, $C_4$-$C_{15}$ cycloalkyl which is unsubstituted or substituted by $C_1$-$C_4$ allyl and/or carboxyl, $C_5$-$C_{15}$ cycloalkenyl which is unsubstituted or substituted by $C_1$-$C_4$ alkyl and/or carboxyl, $C_{13}$-$C_{26}$ polycycloalkyl, $C_7$-$C_9$ phenylalkyl which is unsubstituted or substituted on the phenyl ring by $C_1$-$C_4$ alkyl or a hydroxyl group which can be optionally etherified with a hydrocarbyl group having up to 8 carbon atoms;

$R^5$, $R^6$, $R^7$, and $R^8$ are independently hydrogen, alkyl, substituted alkyl, hydroxyalkyl, aryl, aralkyl, cycloalkyl, heterocyclics, ether, thioether, halogen, —N(R)$_2$, polyethylene polyamines, nitro groups, keto groups, ester groups, or carbonamide groups optionally substituted with alkyl, substituted alkyl, aryl, aralkyl, cycloalkyl, heterocycles, ether, thioether, halogen, —N(R)$_2$, polyethylene polyamines, nitro groups, keto groups or ester groups;

R⁹, R¹⁰ and R¹¹ are independently hydrogen, alkyl, alkenyl or alkoxy of 1 to 36 carbons, cycloalkyl of 6 to 32 carbons, alkylamino of 1 to 36 carbon atoms, cycloalkyl of 5 to 12 carbon atoms, phenyl, hydroxyalkyl, hydroxycycloalkyl of 1 to 20 carbon atoms, methoxyalkyl of 1 to 20 carbon atoms, aralkyl of 7 to 9 carbon atoms wherein the aryl group of the aralkyl is optionally further substituted by alkyl of 1 to 36 carbon atoms, ether, thioether, halogen, —N(R")$_2$, polyethylene polyamines, nitro groups, keto groups, ester groups, or carbonamide groups, and wherein the alkyl group of the aralkyl is optionally substituted with alkyl, substituted alkyl, aryl, aralkyl, cycloalkyl, heterocyclics, ether, thioether, halogen, —N(R")$_2$, polyethylene polyamines, nitro groups, keto groups or ester groups, wherein R" of —N(R")$_2$ is alkyl, alkylene, aryl, aralkyl, cycloalkyl or heterocyclic radical, optionally substituted with halogen, nitro, alkyl, alkoxy or amino, and, m=1 or 2; wherein when m=1, R is hydrogen or a plurality of radicals optionally joined by hetero atoms O, N or S; n=2 or 3;

R$_{21}$-R$_{29}$ are independently hydrogen, alkyl, cycloalkyl, aryl, aromatic, organometallic, a polymeric structure or together can form a cycloalkyl, aryl, or an aromatic structure;

a is 1, 2 or 3; and b is 1, 2 or 3.

40. The tin-free curable composition of claim 38, wherein the metal of the metal amidine complex is zinc or bismuth.

41. The tin-free curable composition of claim 39, wherein the amidine of the metal amidine complex is an amidine of formula II or IV.

42. The tin-free curable composition of claim 41, wherein the amidine is 1,1,3,3-tetramethyl guanidine or 1-methylimidazole.

43. The tin-free curable composition of claim 39, wherein the carboxylate of the metal amidine complex is heptanoate, hexanoate, laurate, oleate, versatate, octoate, neodecanoate, naphthenate, stearate, or oxalate.

44. The tin-free curable composition of claim 29, wherein the metal amidine complex is of the chemical formula metal (amidine)$_2$(carboxylate)x, wherein x is the oxidation state of the metal.

45. The tin-free curable composition according to claim 39 wherein the amidine is at least one member selected from the group consisting of 1,2-dimethyl-1,4,5,6-tetrahydropyrimidine, 1-ethyl-2-methyl-1,4,5,6-tetrahydropyrimidine, 1,2-diethyl-1,4,5,6-tetrahydropyrimidine, 1-n-propyl-2-methyl-1,4,5,6-tetrahydropyrimidine, 1-isopropyl-2-methyl-1,4,5,6-tetrahydropyrimidine, 1-ethyl-2-n-propyl-1,4,5,6-tetrahydropyrimidine and 1-ethyl-2-isopropyl-1,4,5,6-tetrahydropyrimidine.

46. The tin-free curable composition according to claim 39, wherein the amidine is at least one guanidine compound selected from the group consisting of 7-methyl-1,5,7-triazabicyclo[4.4.0]dec-5-ene, 7-ethyl-1,5,7-triazabicyclo[4.4.0]dec-5-ene, 7-n-propyl-1,5,7-triazabicyclo[4.4.0]dec-5-ene, 7-isopropyl-1,5,7-triazabicyclo[4.4.0]dec-5-ene, 7-n-butyl-1,5,7-triazabicyclo[4.4.0]dec-5-ene, 7-isobutyl-1,5,7-triazabicyclo[4.4.0]dec-5-ene, 7-tert-butyl-1,5,7-triazabicyclo[4.4.0]dec-5-ene, 7-cyclohexyl-1,5,7-triazabicyclo[4.4.0]dec-5-ene, 7-n-octyl-1,5,7-triazabicyclo[4.4.0]dec-5-ene, 7-2-ethylhexyl-1,5,7-triazabicyclo[4.4.0]dec-5-ene and 7-decyl-1,5,7-triazabicyclo[4.4.0]dec-5-ene.

47. The tin-free curable composition of claim 29, wherein the one or more organic polymers having a reactive-silicon-containing group has the formula [R¹$_a$R²$_{3-a}$Si—Z—]$_n$—X—Z—SiR¹$_a$R²$_{3-a}$.

48. The tin-free curable composition of claim 29, wherein the crosslinker component (C) is chosen from tetraethylorthosilicate (TEOS), a polycondensate of TEOS; methyltrimethoxysilane (MTMS); vinyl-trimethoxysilane; methylvinyldimethoxysilane; dimethyldiethoxysilane; vinyltriethoxysilane; tetra-n-propylorthosilicate; vinyltris (methylethylketoxime)silane; methyltris(methylethylketoxime)silane; trisacetamidomethylsilane; bisacetamidodimethylsilane; tris(N-methyl-acetamido)methylsilane; bis(N-methylacetamido) dimethylsilane; (N-methyl-acetamido) methyldialkoxysilane; trisbenzamidomethylsilane; trispropenoxymethylsilane; alkyldialkoxyamidosilanes; alkylalkoxybisamidosilanes; CH$_3$Si(OC$_2$H$_5$)$_{1-2}$(NHCOR)$_{2-1}$; (CH3Si(OC$_2$H$_5$)(NCH$_3$COC$_6$H$_5$)$_2$; CH$_3$Si(OC$_2$H$_5$)—(NHCOC$_6$H$_5$)$_2$; methyldimethoxy(ethylmethylketoximo)silane; methylmethoxybis-(ethylmethylketoxime)silane; methyldimethoxy(acetaldoxime)silane; methyldimethoxy(N-methylcarbamato)silane; ethyldimethoxy(N-methylcarbamato)silane; methyldimethoxyisopropenoxysilane; trimethoxyisopropenoxysilane; methyltri-iso-propenoxysilane; methyldimethoxy(but-2-ene-2-oxy)silane; methyldimethoxy(1-phenylethenoxy)silane; methyldimethoxy-2 (1-carboethoxypropenoxy)silane; methylmethoxydi-N-methylaminosilane; vinyldimethoxymethylaminosilane; tetra-N,N-diethylaminosilane; methyldimethoxymethylaminosilane; methyltricyclohexylaminosilane; methyldimethoxyethylaminosilane; dimethyldi-N,N-dimethylaminosilane; methyldimethoxyisopropylaminosilane; dimethyldi-N,N-diethylaminosilane; ethyldimethoxy(N-ethylpropionamido)silane; methyldimethoxy(N-methylacetamido)silane; methyltris(N-methylacetamido) silane; ethyldimethoxy(N-methylacetamido)silane; methyltris(N-methylbenzamido)silane; methylmethoxybis (N-methylacetamido)silane; methyldimethoxy(caprolactamo)silane; trimethoxy(N-methylacetamido)silane; methyldimethoxyethylacetimidatosilane; methyldimethoxypropylacetimidatosilane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxythioisocyanatosilane; methylmethoxydithioisocyanatosilane, or a combination of two or more thereof.

49. The tin-free curable composition of claim 29, wherein the adhesion promoter component (D) is chosen from an aminoalkyltrialkoxysilane, an aminoalkylalkyldialkoxysilane, a bis(alkyltrialkoxysilyl)amine, a tris(alkyltrialkoxysilyl)amine, a tris(alkyltrialkoxysilyl)cyanuarate, and a tris (alkyltrialkoxysilyl)isocyanuarate, or a combination of two or more thereof.

50. The tin-free curable composition of claim 29, wherein the silanol condensation catalyst is present from about 0.01 to about 7 parts by weight per 100 parts by weight of the one or more organic polymers having a reactive-silicon-containing group.

51. The tin-free curable composition of claim 29, wherein the amine carboxylate salt has a molar ratio of from about 1.0 to 10.0 of carboxylic acid per mole of amine.

52. A tin-free curable composition, comprising:
(A) one or more organic polymers having a reactive-silicon-containing group, wherein at least one polymer has a main chain skeleton selected from the group consisting of polyoxyalkylene polymers, saturated hydrocarbon polymers, and (meth)acrylic acid ester polymers;

(B) from 0.001 to 20 parts by weight for 100 parts by weight of the organic polymer(s) (A) of a silanol condensation catalyst consisting of one or more metal amidine complexes and one or more amine carboxylate salts, (C) a crosslinker or chain extender chosen from an alkoxylate, an alkoxysiloxane, an oximosilane, an oximosiloxane, an epoxysilane, an epoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane, an alkoxycarbamatosiloxane, and combinations of two or more thereof;

(D) at least one adhesion promoter chosen from a silane or siloxane other than the compounds listed under (C);

(E) optionally, a filler component; and (F) optionally, at least one acidic compound chosen from a phosphate ester, a phosphonate, a phosphite, a phosphine, a sulfite, a pseudohalogenide, a branched alkyl carboxylic acid, and a combination of two or more thereof;

wherein at least one part of the reactive-silicon-containing group(s) of the organic polymer(s) (A) is represented by general formula I

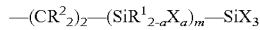
—(CR$^2_2$)$_2$—(SiR$^1_{2-a}$X$_a$)$_m$—SiX$_3$ wherein each R$^1$ independently represents a substituted or unsubstituted hydrocarbon group having 1 to 20 carbon atoms, or a triorganosiloxy group represented by (R')$_3$SiO— wherein R's are each a substituted or unsubstituted hydrocarbon group having 1 to 20 carbon atoms, and R's may be the same or different, each R$^2$ are independently a hydrogen atom, or a substituted or unsubstituted hydrocarbon group having 1 to 10 carbon atoms, each X are independently a hydroxyl group, or a hydrolyzable group, a is 0, 1 or 2, and m is 0 or an integer of from 1 to 19, or general formula

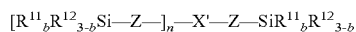
[R$^{11}_b$R$^{12}_{3-b}$Si—Z—]$_n$—X'—Z—SiR$^{11}_b$R$^{12}_{3-b}$ wherein X' is chosen from a polyurethane; a polyester; a polyether; a polycarbonate, a polyolefin, a polypropylene, a polyesterether; and a polyorganosiloxane having units of R$^3$SiO$_{1/2}$, R$^2$SiO, RSiO$_{3/2}$, and/or SiO$_{4/2}$, n is 0 to 100, b is 0 to 2, R and R$^{11}$ can be identical or different at the same Si-atom and chosen from a C$_1$-C$_{10}$-alkyl, a C$_1$-C$_{10}$ alkyl substituted with one or more of Cl, F, N, O or S, a phenyl, a C$_7$-C$_{16}$ alkylaryl, a C$_7$-C$_{16}$ arylalkyl, a C$_2$-C$_4$ polyalkylene ether, or a combination of two or more thereof, R$^{12}$ is chosen from OH, a C$_1$-C$_8$-alkoxy, a C$_2$-C$_{18}$-alkoxyalkyl, an oximoalkyl, an enoxyalkyl, an aminoalkyl, a carboxyalkyl, an amidoalkyl, an amidoaryl, a carbamatoalkyl, or a combination of two or more thereof, and Z is a bond, a divalent unit selected from the group of a C$_1$-C$_8$ alkylene, or O;

wherein the one or more amine carboxylate salts is derived from a carboxylic acid in which the α-carbon atom of the carboxyl group is a quaternary carbon atom.

53. The tin-free curable composition according to claim 52, wherein X is an alkoxy group.

54. The tin-free curable composition according to claim 52, wherein the ratio of the organic polymer having the group represented by the general formula (I) in the organic polymer(s) of the component (A) is 10% or more by weight.

55. The tin-free curable composition according to claim 52, wherein the polyoxyalkylene polymers are polyoxypropylene polymers.

56. The tin-free curable composition according to claim 52, wherein a silane coupling agent (C) is contained in an amount of 0.01 to 20 parts by weight for 100 parts by weight of the organic polymer(s) (A).

57. A one-part type curable composition comprising the tin-free curable composition according to claim 52.

58. A sealant comprising the tin-free curable composition according to claim 52.

59. An adhesive comprising the tin-free curable composition according to claim 52.

60. The tin-free curable composition of claim 52, wherein the metal amidine complex is of the chemical formula M(amidine)$_w$(carboxylate)$_2$, wherein w is an integer from 1 to 4.

61. The tin-free curable composition of claim 52, wherein the metal of the metal amidine complex is zinc, lithium, sodium, magnesium, barium, potassium, calcium, bismuth, cadmium, aluminum, zirconium, hafnium, titanium, lanthanum, vanadium, niobium, tantalum, tellurium, molybdenum, tungsten, or cesium.

62. The tin-free curable composition of claim 52, wherein the amidine of the metal amidine complex is an amidine of formulae I-VIII

(I)

(II)

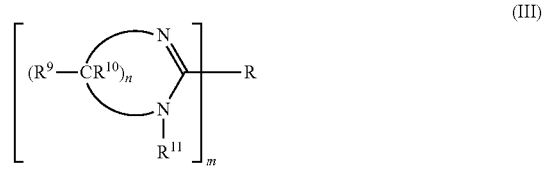
(III)

(IV)

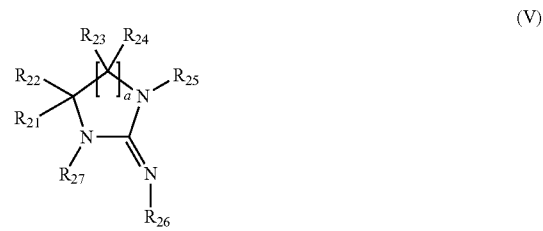
(V)

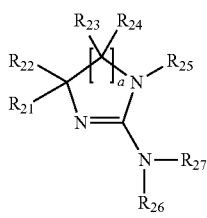
(VI)

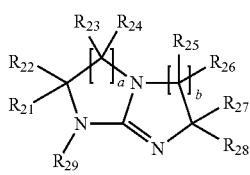
(VII)

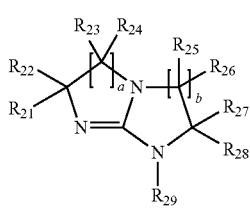
(VIII)

wherein R¹ is hydrogen, $C_1$-$C_{36}$ alkyl, $C_2$-$C_{25}$ alkyl interrupted by oxygen or sulfur, $C_2$-$C_{24}$ alkenyl, $C_4$-$C_{15}$ cycloalkyl which is unsubstituted or substituted by $C_1$-$C_4$ allyl and/or carboxyl, $C_5$-$C_{15}$ cycloalkenyl which is unsubstituted or substituted by $C_1$-$C_4$ alkyl and/or carboxyl, $C_{13}$-$C_{26}$ polycycloalkyl, $C_7$-$C_9$ phenylalkyl which is unsubstituted or substituted on the phenyl ring by $C_1$-$C_4$ alkyl, an amine group which is optionally substituted, or a hydroxyl group which is optionally etherified with a hydrocarbyl group having up to 8 carbon atoms;

$R^2$ and $R^3$ are each independently hydrogen or $C_1$-$C_{25}$ alkyl, $C_2$-$C_{25}$ alkyl interrupted by oxygen or sulfur, $C_2$-$C_{24}$ alkenyl, $C_4$-$C_{15}$ cycloalkyl which is unsubstituted or substituted by $C_1$-$C_4$ allyl and/or carboxyl, $C_5$-$C_{15}$ cycloalkenyl which is unsubstituted or substituted by $C_1$-$C_4$ alkyl and/or carboxyl, $C_{13}$-$C_{26}$ polycycloalkyl, $C_7$-$C_9$ phenylalkyl which is unsubstituted or substituted on the phenyl ring by $C_1$-$C_4$ alkyl, or $R^2$ and $R^3$ are joined to one another by an N=C—N linkage to form a heterocyclic ring or a fused bicyclic ring with one or more heteroatoms;

$R^4$ is hydrogen, or $C_1$-$C_{36}$ alkyl, $C_1$-$C_{36}$ alkyl interrupted by oxygen or sulfur, $C_2$-$C_{24}$ alkenyl, $C_4$-$C_{15}$ cycloalkyl which is unsubstituted or substituted by $C_1$-$C_4$ allyl and/or carboxyl, $C_5$-$C_{15}$ cycloalkenyl which is unsubstituted or substituted by $C_1$-$C_4$ alkyl and/or carboxyl, $C_{13}$-$C_{26}$ polycycloalkyl, $C_7$-$C_9$ phenylalkyl which is unsubstituted or substituted on the phenyl ring by $C_1$-$C_4$ alkyl or a hydroxyl group which can be optionally etherified with a hydrocarbyl group having up to 8 carbon atoms;

$R^5$, $R^6$, $R^7$, and $R^8$ are independently hydrogen, alkyl, substituted alkyl, hydroxyalkyl, aryl, aralkyl, cycloalkyl, heterocyclics, ether, thioether, halogen, —N(R)₂, polyethylene polyamines, nitro groups, keto groups, ester groups, or carbonamide groups optionally substituted with alkyl, substituted alkyl, aryl, aralkyl, cycloalkyl, heterocycles, ether, thioether, halogen, —N(R)₂, polyethylene polyamines, nitro groups, keto groups or ester groups;

$R^9$, $R^{10}$ and $R^{11}$ are independently hydrogen, alkyl, alkenyl or alkoxy of 1 to 36 carbons, cycloalkyl of 6 to 32 carbons, alkylamino of 1 to 36 carbon atoms, cycloalkyl of 5 to 12 carbon atoms, phenyl, hydroxyalkyl, hydroxycycloalkyl of 1 to 20 carbon atoms, methoxyalkyl of 1 to 20 carbon atoms, aralkyl of 7 to 9 carbon atoms wherein the aryl group of the aralkyl is optionally further substituted by alkyl of 1 to 36 carbon atoms, ether, thioether, halogen, —N(R")₂, polyethylene polyamines, nitro groups, keto groups, ester groups, or carbonamide groups, and wherein the alkyl group of the aralkyl is optionally substituted with alkyl, substituted alkyl, aryl, aralkyl, cycloalkyl, heterocyclics, ether, thioether, halogen, —N(R")₂, polyethylene polyamines, nitro groups, keto groups or ester groups, wherein R" of —N(R")₂ is alkyl, alkylene, aryl, aralkyl, cycloalkyl or heterocyclic radical, optionally substituted with halogen, nitro, alkyl, alkoxy or amino, and, m=1 or 2; wherein when m=1, R is hydrogen or a plurality of radicals optionally joined by hetero atoms O, N or S;

n=2 or 3;

$R_{21}$-$R_{29}$ are independently hydrogen, alkyl, cycloalkyl, aryl, aromatic, organometallic, a polymeric structure or together can form a cycloalkyl, aryl, or an aromatic structure;

a is 1, 2 or 3; and b is 1, 2 or 3.

63. The tin-free curable composition of claim 61, wherein the metal of the metal amidine complex is zinc or bismuth.

64. The tin-free curable composition of claim 62, wherein the amidine of the metal amidine complex is an amidine of formula II or IV.

65. The tin-free curable composition of claim 64, wherein the amidine is 1,1,3,3-tetramethyl guanidine or 1-methylimidazole.

66. The tin-free curable composition of claim 62, wherein the carboxylate of the metal amidine complex is heptanoate, hexanoate, laurate, oleate, versatate, octoate, neodecanoate, naphthenate, stearate, or oxalate.

67. The tin-free curable composition of claim 52, wherein the metal amidine complex is of the chemical formula metal (amidine)₂(carboxylate)x, wherein x is the oxidation state of the metal.

68. The tin-free curable composition according to claim 62 wherein the amidine is at least one member selected from the group consisting of 1,2-dimethyl-1,4,5,6-tetrahydropyrimidine, 1-ethyl-2-methyl-1,4,5,6-tetrahydropyrimidine, 1,2-diethyl-1,4,5,6-tetrahydropyrimidine, 1-n-propyl-2-methyl-1,4,5,6-tetrahydropyrimidine, 1-isopropyl-2-methyl-1,4,5,6-tetrahydropyrimidine, 1-ethyl-2-n-propyl-1,4,5,6-tetrahydropyrimidine and 1-ethyl-2-isopropyl-1,4,5,6-tetrahydropyrimidine.

69. The tin-free curable composition according to claim 52, wherein the amidine is at least one guanidine compound selected from the group consisting of 7-methyl-1,5,7-triazabicyclo[4.4.0]dec-5-ene, 7-ethyl-1,5,7-triazabicyclo[4.4.0]dec-5-ene, 7-n-propyl-1,5,7-triazabicyclo[4.4.0]dec-5-ene, 7-isopropyl-1,5,7-triazabicyclo[4.4.0]dec-5-ene, 7-n-butyl-1,5,7-triazabicyclo[4.4.0]dec-5-ene, 7-isobutyl-1,5,7-triazabicyclo[4.4.0]dec-5-ene, 7-tert-butyl-1,5,7-triazabicyclo[4.4.0]dec-5-ene, 7-cyclohexyl-1,5,7-triazabicyclo[4.4.0]dec-5-ene, 7-n-octyl-1,5,7-triazabicyclo[4.4.0]dec-5-ene, 7-2-ethylhexyl-1,5,7-triazabicyclo[4.4.0]dec-5-ene and 7-decyl-1,5,7-triazabicyclo[4.4.0]dec-5-ene.

70. The tin-free curable composition of claim 52, wherein the one or more organic polymers having a reactive-silicon-containing group has the formula $[R^1_aR^2_{3-a}Si-Z-]_n-X-Z-SiR^1_aR^2_{3-a}$.

71. The tin-free curable composition of claim 52, wherein the crosslinker component (C) is chosen from tetraethylorthosilicate (TEOS), a polycondensate of TEOS; methyltrimethoxysilane (MTMS); vinyl-trimethoxysilane; methylvinyldimethoxysilane; dimethyldiethoxysilane; vinyltriethoxysilane; tetra-n-propylorthosilicate; vinyltris(methylethylketoxime)silane; methyltris(methylethylketoxime)silane; trisacetamidomethylsilane; bisacetamidodimethylsilane; tris(N-methyl-acetamido)methylsilane; bis(N-methylacetamido)dimethylsilane; (N-methyl-acetamido)methyldialkoxysilane; trisbenzamidomethylsilane; trispropenoxymethylsilane; alkyldialkoxyamidosilanes; alkylalkoxybisamidosilanes; $CH_3Si(OC_2H_5)_{1-2}(NHCOR)_{2-1}$; $(CH3Si(OC_2H_5)(NCH_3COC_6H_5)_2)$; $CH_3Si(OC_2H_5)$—$(NHCOC_6H_5)_2$; methyldimethoxy(ethylmethylketoximo)silane; methylmethoxybis-(ethylmethylketoximo)silane; methyldimethoxy(acetaldoximo)silane; methyldimethoxy(N-methylcarbamato)silane; ethyldimethoxy(N-methylcarbamato)silane; methyldimethoxyisopropenoxysilane; trimethoxyisopropenoxysilane; methyltri-iso-propenoxysilane; methyldimethoxy(but-2-ene-2-oxy)silane; methyldimethoxy(1-phenylethenoxy)silane; methyldimethoxy-2(1-carboethoxypropenoxy)silane; methylmethoxydi-N-methylaminosilane; vinyldimethoxymethylaminosilane; tetra-N,N-diethylaminosilane; methyldimethoxymethylaminosilane; methyltricyclohexylaminosilane; methyldimethoxyethylaminosilane; dimethyldi-N,N-dimethylaminosilane; methyldimethoxyisopropylaminosilane; dimethyldi-N,N-diethylaminosilane; ethyldimethoxy(N-ethylpropionamido)silane; methyldimethoxy(N-methylacetamido)silane; methyltris(N-methylacetamido)silane; ethyldimethoxy(N-methylacetamido)silane; methyltris(N-methylbenzamido)silane; methylmethoxybis(N-methylacetamido)silane; methyldimethoxy(caprolactamo)silane; trimethoxy(N-methylacetamido)silane; methyldimethoxyethylacetimidatosilane; methyldimethoxypropylacetimidatosilane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxythioisocyanatosilane; methylmethoxydithioisocyanatosilane, or a combination of two or more thereof.

72. The tin-free curable composition of claim 52, wherein the adhesion promoter component (D) is chosen from an aminoalkyltrialkoxysilane, an aminoalkylalkyldialkoxysilane, a bis(alkyltrialkoxysilyl)amine, a tris(alkyltrialkoxysilyl)amine, a tris(alkyltrialkoxysilyl)cyanuarate, and a tris(alkyltrialkoxysilyl)isocyanuarate, or a combination of two or more thereof.

73. The tin-free curable composition of claim 52, wherein the silanol condensation catalyst is present at from about 0.01 to about 7 parts by weight per 100 parts by weight of the one or more organic polymers having a reactive-silicon-containing group.

74. The tin-free curable composition of claim 52, wherein the amine carboxylate salt has a molar ratio of from about 1.0 to 10.0 of carboxylic acid per mole of amine.

* * * * *